United States Patent
Elhoushi et al.

(10) Patent No.: US 10,126,134 B2
(45) Date of Patent: Nov. 13, 2018

(54) METHOD AND SYSTEM FOR ESTIMATING UNCERTAINTY FOR OFFLINE MAP INFORMATION AIDED ENHANCED PORTABLE NAVIGATION

(71) Applicant: INVENSENSE, INC., San Jose, CA (US)

(72) Inventors: Mostafa Elhoushi, Calgary (CA); Anas Mahmoud, Calgary (CA); Sheng Mao, Calgary (CA); Tao Li, Calgary (CA); Jacques Georgy, Calgary (CA)

(73) Assignee: InvenSense, Inc., San Jose, CA (US)

( * ) Notice: Subject to any disclaimer, the term of this patent is extended or adjusted under 35 U.S.C. 154(b) by 100 days.

(21) Appl. No.: 15/485,639

(22) Filed: Apr. 12, 2017

(65) Prior Publication Data

US 2017/0219359 A1 Aug. 3, 2017

Related U.S. Application Data

(63) Continuation-in-part of application No. 14/976,992, filed on Dec. 21, 2015, now Pat. No. 10,018,474.

(51) Int. Cl.
*G01C 21/30* (2006.01)
*G01S 19/42* (2010.01)
*G01C 21/20* (2006.01)
*G01S 19/01* (2010.01)

(52) U.S. Cl.
CPC ........... *G01C 21/30* (2013.01); *G01C 21/206* (2013.01); *G01S 19/01* (2013.01); *G01S 19/42* (2013.01)

(58) Field of Classification Search
USPC ..... 701/1, 47, 124, 408, 412, 466, 468, 469, 701/533; 702/141, 151; 706/46; 342/357.21, 357.48; 340/903; 715/720
See application file for complete search history.

(56) References Cited

U.S. PATENT DOCUMENTS

| | | | | |
|---|---|---|---|---|
| 2006/0212217 A1* | 9/2006 | Sheha | ................. | G01C 21/005 701/412 |
| 2007/0216540 A1* | 9/2007 | Riley | ................... | G01S 5/0263 340/903 |
| 2009/0248301 A1* | 10/2009 | Judd | ................... | G01O 21/165 701/466 |

(Continued)

*Primary Examiner* — Anne M Antonucci
*Assistant Examiner* — Sanjeev Malhotra
(74) *Attorney, Agent, or Firm* — Bay Area Technology Law Group PC

(57) ABSTRACT

The navigation solution of a portable device may be enhanced using map information. Sensor data for the portable device may be used to derive navigation solutions at a plurality of epochs over a first period of time. Position information for the device may be estimated at a time subsequent to the first period of time using the navigation solutions. Map information for an area encompassing a current location of the portable device may also be obtained. Multiple hypotheses regarding possible positions of the portable device may be generated using the estimated position information and the map information. By managing and processing the hypotheses, estimated position information for at least one epoch during the first period of time may be updated. An enhanced navigation solution for the at least one epoch may be provided using the updated estimated position information and an uncertainty measure may be derived for the enhanced navigation solution.

45 Claims, 32 Drawing Sheets

(56) References Cited

U.S. PATENT DOCUMENTS

| | | | | |
|---|---|---|---|---|
| 2010/0039316 A1* | 2/2010 | Gronemeyer | G01S 19/34 | 342/357.48 |
| 2010/0121537 A1* | 5/2010 | Tanaka | B60R 21/01 | 701/47 |
| 2010/0271259 A1* | 10/2010 | Stafford | G01S 19/28 | 342/357.21 |
| 2011/0125396 A1* | 5/2011 | Sheha | G01C 21/005 | 701/533 |
| 2012/0218145 A1* | 8/2012 | Kee | G01S 19/11 | 342/357.48 |
| 2012/0245839 A1* | 9/2012 | Syed | G01C 21/165 | 701/408 |
| 2013/0211713 A1* | 8/2013 | Georgy | G01S 19/47 | 701/468 |
| 2014/0372026 A1* | 12/2014 | Georgy | G01S 19/47 | 701/469 |
| 2015/0112504 A1* | 4/2015 | Binion | G06Q 40/08 | 701/1 |
| 2015/0121224 A1* | 4/2015 | Krasnahill, Jr. | H04N 21/4147 | 715/720 |
| 2015/0286221 A1* | 10/2015 | Goulding | B62D 57/024 | 701/124 |
| 2015/0354951 A1* | 12/2015 | Ali | G01C 21/16 | 702/141 |
| 2015/0354962 A1* | 12/2015 | Georgy | G01C 21/20 | 702/151 |
| 2016/0034817 A1* | 2/2016 | Ali | H04M 1/72569 | 706/46 |
| 2016/0061605 A1* | 3/2016 | Georgy | G01S 19/42 | |
| 2016/0069690 A1* | 3/2016 | Li | G01C 21/206 | 701/412 |
| 2017/0010098 A1* | 1/2017 | Georgy | G01S 19/42 | |

* cited by examiner

METHOD AND SYSTEM FOR ESTIMATING UNCERTAINTY FOR OFFLINE MAP INFORMATION AIDED ENHANCED PORTABLE NAVIGATION

CROSS REFERENCE TO RELATED APPLICATIONS

This application is a continuation-in-part of U.S. patent application Ser. No. 14/976,992, filed Dec. 21, 2015, entitled "METHOD AND SYSTEM FOR USING OFFLINE MAP INFORMATION AIDED ENHANCED PORTABLE NAVIGATION," which is assigned to the assignee hereof and is incorporated by reference in its entirety.

FIELD OF THE PRESENT DISCLOSURE

The present disclosure relates to a method and system for subsequently enhancing at least one navigation solution derived from sensor data for a device within a platform (such as for example person, vehicle, or vessel) through the use of map aided and/or map constraining to the navigation solution, wherein the device can be strapped or non-strapped to the platform, and wherein in case of non-strapped mobility of the device may be constrained or unconstrained within the platform, and wherein the device can be tilted to any orientation and still provide seamless navigation.

BACKGROUND

Portable electronic devices, such as those configured to be handheld or otherwise associated with a user, are employed in a wide variety of applications and environments. Increasingly, such devices are equipped with one or more sensors or other systems for determining the position or motion of the portable device. Notably, devices such as smartphones, tablets, smart watches or other portable devices may feature Global Navigation Satellite Systems (GNSS) receivers, low cost Micro Electro-Mechanical Systems (MEMS) inertial sensors, barometers and magnetometers. GNSS and multi-sensors can be integrated to provide promising positioning results in most outdoor environments. However, some mass market applications require seamless positioning capabilities in all kinds of environments such as malls, offices or underground parking lots. In the absence of GNSS signals in indoor environments, the conventional strapdown Inertial Navigation System (SINS) that uses low cost inertial sensors, suffers significant performance degradation due to the accumulated sensor drifts and bias. As such, positioning technologies relying solely on motion sensors may not satisfy all requirements for seamless indoor and outdoor navigation applications.

Pedestrian Dead Reckoning (PDR) is an example of portable device indoor/outdoor positioning techniques, and has become the focus of industrial and academic research recently. Similar to the SINS, PDR accumulates successive displacement from a known starting point to derive the position. This displacement (step length) can be estimated with various algorithms within a certain accuracy using the inertial sensor measurements. The position error using step lengths from PDR accumulates much slower than that from the accelerometer derived displacement from SINS. The PDR shows improved performance over SINS without GNSS updates. However, PDR still lacks robustness because of the accumulated heading error. This shortcoming may cause a skewed path over time and produce position estimates that might not be consistent with the building layout. Therefore, the resulting navigation trajectories may cross walls, floors or other obstacles. In order to avoid these types of navigation trajectory and building layout inconsistencies, map information may be used to constrain the PDR solution to areas indicated as possible routes or a determined position may be updated to match an assumed position derived from map information. As used herein, the map aided techniques of this disclosure include either or both of constraining the derived position of a user or updating a derived position to a position determined from map information.

As mentioned, map information can be used to improve both the reliability and positioning accuracy of the navigation system. In order to use map information in a navigation system, various map aided algorithms have been proposed and applied in the prior art. Map aided algorithms can be generally classified into four categories: geometric, topological, probabilistic and other advanced techniques.

Geometric map aided algorithms typically consider only the geometric relationship between a user position and a map. They are widely used in the vehicle navigation application in which spatial road networks are abstracted as node points and curves. The most commonly used geometric map-aided algorithm is a point-to-point aided technique that matches the user position to a closest node point of a road segment. While easy to implement, it is sensitive to the way the road network was digitized. Another geometric map-aided algorithm is point-to-curve aided. Such techniques match user positions to the closet curve of a road. Each of the curves comprises line segments which are piecewise linear. Distance may be calculated from the user position to each of the line segments. The line segment that gives the smallest distance is selected as the matched road. Although it is more efficient than point-to-point aided, it may be unstable in dense road networks. Yet another geometric algorithm is curve-to-curve aided, which matches a short history of a user trajectory to curves of roads and may chose a road curve with the shortest distance to the user trajectory. Unfortunately, this approach is quite sensitive to outliers and often gives unexpected results as a result.

Topological map aided algorithms make use of historical user trajectory information, (which might include the previously identified road segment) and topological information such as link connectivity, road classification, road restriction information (single direction, turn restrictions), in addition to the basic geometric information. Various previous works have applied topological information at different levels. For example, (i) using topological information to identify a set of candidate links, (ii) and to identify correct link from a set of candidate links. Therefore, topological map aided algorithms normally outperform algorithms relying only on geometric techniques. Moreover, a weight-based topological map aided may further improve the match aided performance. Such techniques use the correlation values in network geometry and topology information and positioning information from a GPS/DR integrated system as the weight for different road link candidates. The link with the highest weight score may be selected as the correct road segment. However, the misidentification of a road link in previous epoch may have significant negative effects on the following map aided results.

Conventional probabilistic map aided algorithms use an error elliptical or rectangular region around the user position from the navigator. The error region depends on the variance of the estimated navigation position. The error region is then superimposed on the road network to identify a road segment on which the user is travelling. If an error region contains a number of segments, then the evaluation of candidate segments are carried out using heading, connectivity, and closeness criteria. In order to improve the computation efficiency and system reliability, the error region can be only constructed when the user travels through a junction. This is because the construction of an error region at each epoch may lead to incorrect link identification when other road links are close to the link on which the user is travelling.

Advanced map aided algorithms generally refer to more advanced techniques such as Kalman filters, particle filters, fuzzy logic models or Bayesian inferences. For example, a Kalman filter may be used to propagate the user position either from GPS or GPS/DR and to re-estimate the user position to reduce the along track error by using an orthogonal projected map matched position. Similar concepts may also be used with a particle filter to predict and update the user's position. Further, a fuzzy inference system may be used to derive the matched road link with i) the distance between the user position and candidate links and ii) the difference between the platform direction and the link direction. A still further example is the use of a Multiple Hypothesis Technique (MHT) for map aided, by employing pseudo measurements (projected position and heading) from all possible links within the validation region of the current user's position and a topological analysis of the road networks to derive a set of hypotheses and probabilities.

Despite the variety of conventionally available map aided algorithms, either geometric, topological, probabilistic or advanced methods, all may be considered to be based on the assumption that a user is constrained to the network of roads which can be abstracted as linked points, lines and curves. While this assumption may be sufficiently valid in many outdoor land vehicle navigation applications, a problem may be encountered in complex indoor environments, where the rooms, elevators, corridors and similar structures cannot be simplified as the aforementioned points, lines and curves. Some researchers use particle filters with geometric constraint (walls, inaccessible areas) information from a building floor plan to improve the indoor positioning accuracy, however, a user can enter or exit rooms in a random way and simple geometric constraints are undesirable in these scenarios. Furthermore, such techniques have not accommodated multi-floor situations. In contrast, conventional multi-floor map-aided techniques have relied only on geometric information to identify the location of stairs. Such approaches may not be sufficiently reliable, particularly when drift in the navigation solution occurs. Furthermore, most of the existing map aided algorithms ignore the user motion status information. The user's motion status such as going up/down stairs, standing/walking on escalators, or using elevators is beneficial to validate the candidate matched level change links or objects in the indoor navigation applications. Although the advanced algorithms such as fuzzy logics or particle filters have the potential to offer improved performance, they may not be generally suitable for real-time or causal applications due to the heavy computation burden.

Accordingly, it would be desirable to provide navigation techniques using available map information, particularly indoor maps, to enhance the accuracy and reliability of positioning applications for portable devices and to estimate uncertainty for position determinations made using such techniques. It would similarly be desirable to provide map information aided techniques that operate well with seamless outdoor and indoor transition as well as handling multi-level indoor maps to reliably navigate a user in a complex multi-level indoor environment. It would further be desirable to provide map information aided techniques that may be applied subsequently so as to benefit from post facto information and processing techniques. Moreover, it would be desirable to provide map aided techniques adapted for efficient operation in client and server modes, by enabling a server to use uploaded navigation solutions of a user to subsequently generate map matched results to enhance one or more of the solutions. As will be described in the following materials, this disclosure satisfies these and other needs.

SUMMARY

As will be described in detail below, this disclosure includes a method for estimating uncertainty for an enhanced navigation solution of a portable device and a platform, wherein the mobility of the device is constrained or unconstrained within the platform and wherein the device may be tilted to any orientation. The method may involve obtaining sensor data for the portable device representing motion of the portable device at a plurality of epochs over a first period of time, deriving navigation solutions for the epochs based at least in part on the sensor data, estimating position information for the portable device based at least in part on the plurality of navigation solutions at a time subsequent to the first period of time, obtaining map information for an environment encompassing locations of the portable device during the first period of time, generating multiple hypotheses regarding possible positions of the portable device for at least one epoch during the first period of time based at least in part on the estimated position information and map information, managing the hypotheses based at least in part on the estimated position information and the map information, processing the managed hypotheses to update the estimated position information for the portable device, providing an enhanced navigation solution for the at least one epoch using the updated estimated position information and deriving an uncertainty measure for the enhanced navigation solution.

This disclosure also includes a portable device having an integrated sensor assembly, configured to output sensor data representing motion of the portable device for the portable device at a plurality of epochs over a first period of time, a navigation module configured to derive navigation solutions based at least in part on the sensor data at the epochs and a processor. The processor may be configured to implement a position estimator for providing estimated position information for the portable device based at least in part on the plurality of navigation solutions at a time subsequent to the first period of time, a map handler for obtaining map information for an environment encompassing locations of the portable device during the first period of time, a hypothesis analyzer for generating multiple hypotheses regarding possible positions of the portable device for at least one epoch during the first period of time based at least in part on the estimated position information and map information, for managing the hypotheses based at least in part on the estimated position information and map information, for processing the managed hypotheses to update the estimated position information for the portable device, and for providing an enhanced navigation solution for the at least one epoch using the updated estimated position information and an uncertainty estimator for deriving an uncertainty measure for the enhanced navigation solution.

This disclosure also includes a remote processing resource for estimating uncertainty for an enhanced navigation solution of a portable device and a platform, wherein the mobility of the portable device is constrained or unconstrained within the platform and wherein the portable device may be tilted to any orientation. The remote processing resource may have a communications module for receiving information provided by the portable device, wherein the information corresponds to a plurality of epochs over a first period of time of sensor data representing motion of the portable device and a processor. The processor may be configured to implement a position estimator for providing estimated position information for the portable device based at least in part on the plurality of navigation solutions at a time subsequent to the first period of time, a map handler for obtaining map information for an environment encompassing locations of the portable device during the first period of time, a hypothesis analyzer for generating multiple hypotheses regarding possible positions of the portable device for at least one epoch during the first period of time based at least in part on the estimated position information and map information, for managing the hypotheses based at least in part on the estimated position information and map information, for processing the managed hypotheses to update the estimated position information for the portable device, and for providing an enhanced navigation solution for the at least one epoch using the updated estimated position information and an uncertainty estimator for deriving an uncertainty measure for the enhanced navigation solution.

Still further, this disclosure includes a system for estimating uncertainty for an enhanced navigation solution of a portable device and a platform including a portable device comprising an integrated sensor assembly, configured to output sensor data representing motion of the portable device for the portable device at a plurality of epochs over a first period of time and a communications module for transmitting information corresponding to the epochs and remote processing resources configured to receive the information from the portable device and having a processor. The processor may be configured to implement a position estimator for providing estimated position information for the portable device based at least in part on the plurality of navigation solutions at a time subsequent to the first period of time, a map handler for obtaining map information for an environment encompassing locations of the portable device during the first period of time, a hypothesis analyzer for generating multiple hypotheses regarding possible positions of the portable device for at least one epoch during the first period of time based at least in part on the estimated position information and map information, for managing the hypotheses based at least in part on the estimated position information and map information, for processing the managed hypotheses to update the estimated position information for the portable device, and for providing an enhanced navigation solution for the at least one epoch using the updated estimated position information and an uncertainty estimator for deriving an uncertainty measure for the enhanced navigation solution.

DETAILED DESCRIPTION

Figure 1:
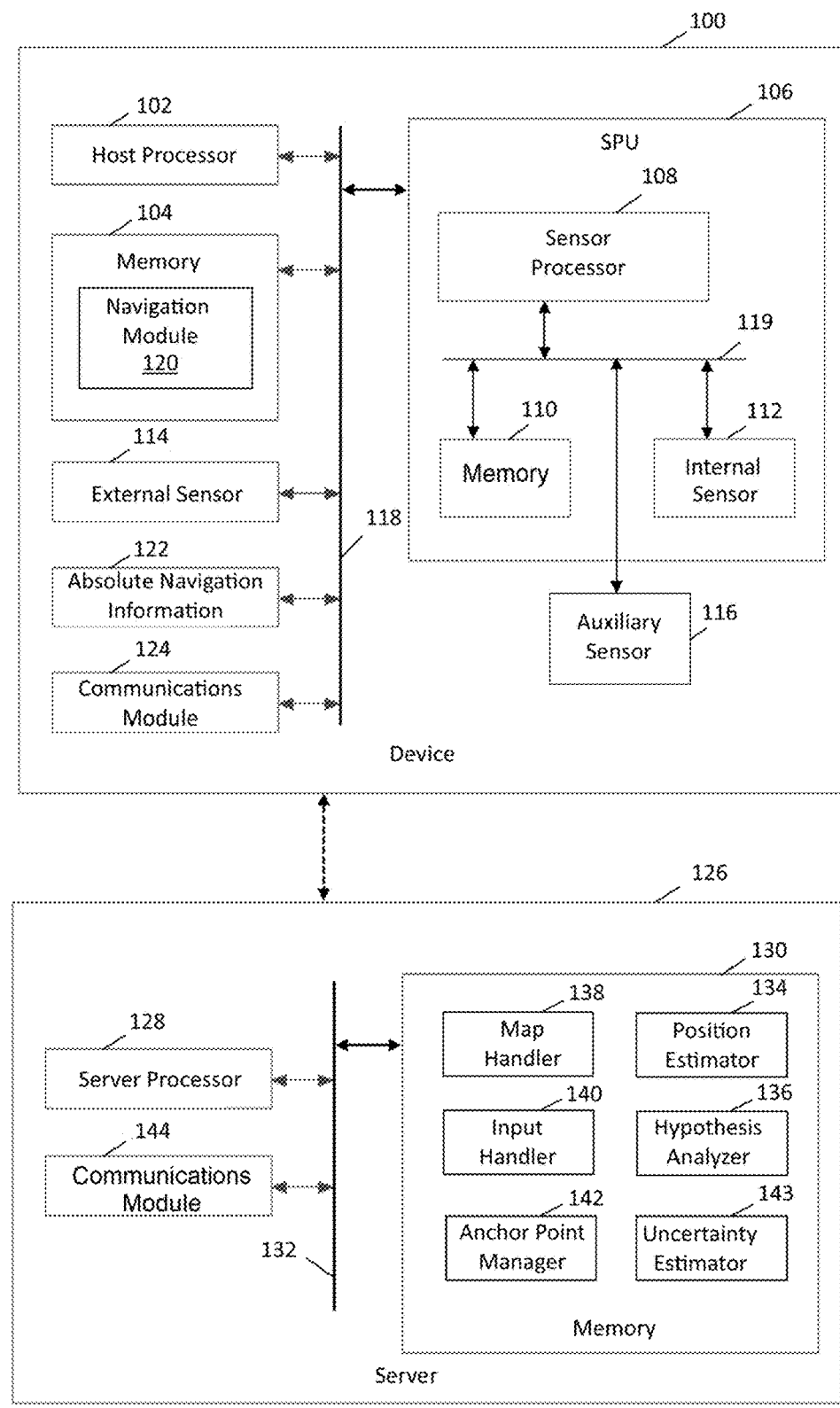
FIG. 1 is schematic diagram of a system for offline enhancement of a navigation solution according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (SPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU and a microprocessor, a plurality of microprocessors, one or more microprocessors in conjunction with an SPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

The techniques of this disclosure are directed to enhancing a navigation solution of a portable device using map information. Often, such portable devices may be associated with a platform that transports the device. The platform may be the user, as in the example of a smartphone being carried as a user walks, runs, swims or otherwise undergoes locomotion. The platform may also be considered a vehicle or vessel that conveys the user and the portable device. Although the portable device generally maybe transported or conveyed in the direction of movement of the platform, its orientation may not be constrained. Returning to the example of the smartphone, it may be held in the user's hand and employed in a variety of orientations or carried in a pocket, holster, bag or other manners. In other examples, the portable device may be strapped to the platform, such as with a vehicle mount, or may be non-strapped. When non-strapped, the mobility of the device may be constrained or unconstrained within the platform and as a result, circumstances may exist such that the device can be tilted to any orientation with respect to the user or platform. The portable device may generate a series of navigation solutions over a given period of time.

As an illustration only and without limitation, a user may be carrying a smartphone while traversing a venue, such as shopping within a store. During this time, the smartphone may derive a number of navigation solutions representing the trajectory of the user through the store. In one aspect, the smartphone may use any suitable real-time technique to generate those navigation solutions, including an inertial navigation routine employing dead reckoning, a reference-based location service utilizing a source of absolute navigation information, a location beaconing system or any other suitable technique, or combinations thereof. Although of substantial benefit, these real-time solutions may nonetheless suffer from inaccuracies or limitations. Again without limitation, an inertial dead reckoning system may be subject to drift over time due to the characteristics of currently-employed sensors or a source of absolute navigation information such as a global navigation satellite system (GNSS) may suffer from poor reception in indoor environments.

Accordingly, the techniques of this disclosure utilize the series of navigation solutions derived over the given time period at a subsequent time to enhance at least one of the navigation solutions by an offline map matching routine. For example, position information for the portable device may be estimated subsequent to the derivation of the navigation solutions. Multiple hypotheses may be generated and managed using the estimated position information and map information for an area corresponding to the area occupied by the user when the navigation solution were derived. Based on the hypotheses, the estimated position information may be updated and used to enhance at least one of the navigation solutions.

As will be described in further detail below, the techniques for enhancing a navigation solution of a portable device and a platform using map information involve obtaining sensor data for the portable device. The portable device derives navigation solutions using the sensor data. Subsequently, the offline map matching routine may be performed to enhance at least one of the navigation solutions. In some embodiments, the portable device may have sufficient processing capabilities and/or other resources available to perform the offline map matching routine locally, such as in the background when greater access to the processing capabilities is available. However, in other embodiments, the portable device may communicate the navigation solutions, which may include any or all of the associated sensor data, to a remote server that may have greater processing capabilities and/or superior access to map information to be used in the offline map matching routine. Following enhancement, the navigation solution may be used for any suitable purpose and need not involve the user directly, such as for the analysis of consumer metrics and behavior. However, the enhanced navigation solution(s) may also be returned to the portable device, also for any suitable purpose, such as to provide the user with more accurate navigation information regarding the trajectory or to help improve future navigation performance of the portable device. In conjunction, an uncertainty may be estimated for the enhanced navigation solution(s), such as by deriving the standard deviation. The uncertainty estimate for the offline map matching may render the output more useful and meaningful for other tasks utilizing that output, such as analytics applications or crowd-sourcing applications. In recognition that the map matching solution may be subject to inaccuracies due to the practical realities of sensor errors and the challenges associated with portable navigation, the techniques of this disclosure provide a representative and consistent uncertainty estimate.

To help illustrate these aspects, a representative system for offline map matching is schematically depicted in FIG. 1, with portable device 100 represented by high level schematic blocks. As will be appreciated, device 100 may be implemented as a device or apparatus, such as a handheld device that can be moved in space by a user and its motion, location and/or orientation in space therefore sensed. For example, such a handheld device may be a mobile phone (e.g., smartphone, cellular phone, a phone running on a local network, or any other telephone handset), tablet, personal digital assistant (PDA), video game player, video game controller, navigation device, wearable device (e.g., glasses, watch, belt clip), fitness tracker, virtual or augmented reality equipment, mobile internet device (MID), personal navigation device (PND), digital still camera, digital video camera, binoculars, telephoto lens, portable music, video or media player, remote control, or other handheld device, or a combination of one or more of these devices.

As shown, device 100 includes a host processor 102, which may be one or more microprocessors, central processing units (CPUs), or other processors to run software programs, which may be stored in memory 104, associated with the functions of device 100. Multiple layers of software can be provided in memory 104, which may be any combination of computer readable medium such as electronic memory or other storage medium such as hard disk, optical disk, etc., for use with the host processor 102. For example, an operating system layer can be provided for device 100 to control and manage system resources in real time, enable functions of application software and other layers, and interface application programs with other software and functions of device 100. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 includes at least one sensor assembly, as shown here in the form of integrated sensor processing unit (SPU) 106 featuring sensor processor 108, memory 110 and inertial sensor 112. In some embodiments, the SPU may be a motion processing unit (MPU). Memory 110 may store algorithms, routines or other instructions for processing data output by inertial sensor 112 and/or other sensors as described below using logic or controllers of sensor processor 108, as well as storing raw data and/or motion data output by inertial sensor 112 or other sensors. Inertial sensor 112 may be one or more sensors for measuring motion of device 100 in space. Depending on the configuration, SPU 106 measures one or more axes of rotation and/or one or more axes of acceleration of the device. In one embodiment, inertial sensor 112 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 108, or other processing resources of device 100, combines data from inertial sensor 112 to provide a six axis determination of motion. As desired, inertial sensor 112 may be implemented using Micro Electro Mechanical System (MEMS) to be integrated with SPU 106 in a single package. Exemplary details regarding suitable configurations of host processor 102 and SPU 106 may be found in co-pending, commonly owned U.S. patent application Ser. No. 11/774,488, filed Jul. 6, 2007, and Ser. No. 12/106,921, filed Apr. 11, 2008, which are hereby incorporated by reference in their entirety. Suitable implementations for SPU 106 in device 100 are available from InvenSense, Inc. of Sunnyvale, Calif.

Alternatively or in addition, device 100 may implement a sensor assembly in the form of external sensor 114. This is optional and not required in all embodiments. External sensor may represent one or more sensors as described above, such as an accelerometer and/or a gyroscope, which output data for use in deriving a navigation solution. As used herein, "external" means a sensor that is not integrated with SPU 106 and may be remote or local to device 100. Also alternatively or in addition, SPU 106 may receive data from an auxiliary sensor 116 configured to measure one or more aspects about the environment surrounding device 100. This is optional and not required in all embodiments. For example, a barometer and/or a magnetometer may be used to refine position determinations made using inertial sensor 112. In one embodiment, auxiliary sensor 116 may include a magnetometer measuring along three orthogonal axes and output data to be fused with the gyroscope and accelerometer inertial sensor data to provide a nine axis determination of motion. In another embodiment, auxiliary sensor 116 may also include a barometer to provide an altitude determination that may be fused with the other sensor data to provide a ten axis determination of motion. Although described in the context of one or more sensors being MEMS based, the techniques of this disclosure may be applied to any sensor design or implementation.

In the embodiment shown, host processor 102, memory 104, SPU 106 and other components of device 100 may be coupled through bus 118, while sensor processor 108, memory 110, internal sensor 112 and/or auxiliary sensor 116 may be coupled though bus 119, either of which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between host processor 102 and memory 104.

In one aspect, the various operations of this disclosure used to derive a navigation solution for portable device 100 may be implemented through navigation module 120 as a set of suitable instructions stored in memory 104 that may be read and executed by host processor 102. Navigation module 120 may employ a reference-based strategy, a self-contained strategy, or any combination of strategies to provide any desired degree of location awareness capabilities. For example, navigation module 120 may employ inertial navigation techniques utilizing sensor data, such as from inertial sensor 112 and/or external sensor 114, as obtained for a current sensor epoch to derive a navigation solution for that epoch. Such techniques may involve dead reckoning or the like, and may determine an orientation for device 100, including values such as any roll, pitch, and azimuth (heading) angles. The navigation solutions derived by navigation module 120 represent contemporaneous determinations of position information for portable device 100. Although some transmission, some possible buffering, and processing time may be required, the results are at least near real time (there could be some possible latencies) and may use any information available up until the time the navigation solution is derived. Still further, navigation module 120 may also be configured to determine a motion mode that indicates the user's motion patterns, which may include without limitation, walking, driving, running, going up/down stairs, riding an elevator, walking/standing on an escalator, and other similar motion patterns. In some embodiments, navigation module 120 may employ a real-time map matching routine to aid the derivation of navigation solutions in a causal manner.

Navigation module 120 may also use a source of absolute navigation information 122, such as a Global Navigation Satellite System (GNSS) receiver, including without limitation the Global Positioning System (GPS), the Global Navigation Satellite System (GLONASS), Galileo and/or Beidou, as well as WiFi™ positioning, cellular tower positioning, Bluetooth™ positioning beacons, visual light communication-based positioning or other similar methods when deriving a navigation solution. This is optional and not required in all embodiments. Navigation module 120 may also be configured to use information from a wireless communication protocol to provide a position determination using signal trilateration. Any suitable protocol, including cellular-based and wireless local area network (WLAN) technologies such as Universal Terrestrial Radio Access (UTRA), Code Division Multiple Access (CDMA) networks, Global System for Mobile Communications (GSM), the Institute of Electrical and Electronics Engineers (IEEE) 802.16 (WiMAX), Long Term Evolution (LTE), IEEE 802.11 (WiFi™) and others may be employed. Further, portable device 100 may also have a communications module 124 for transmitting and/or receiving information, including navigation solutions derived by navigation module 120.

Multiple layers of software may be employed as desired and stored in any combination of memory 104, memory 110, or other suitable location. For example, a motion algorithm layer can provide motion algorithms that provide lower-level processing for raw sensor data provided from the motion sensors and other sensors. A sensor device driver layer may provide a software interface to the hardware sensors of device 100. Further, a suitable application program interface (API) may be provided to facilitate communication between host processor 102 and SPU 106, for example, to transmit desired sensor processing tasks.

In this exemplary system, portable device 100 communicates raw sensor data or navigation solutions derived for a plurality of sensor epochs over a first period of time to server 126. Subsequent to the first period of time, server 126 may then perform an offline map matching routine according to the techniques of this disclosure using the navigation solutions from portable device 100 to provide an enhanced navigation solution for at least one of the sensor epochs. One suitable architecture of server 126 is depicted using high level schematic blocks in FIG. 1, and may include server processor 128 that is in communication with memory 130 over bus 132. As will be described in further detail below, server processor 128 may execute instructions stored in memory 130 that are represented as functional blocks, including position estimator 134, hypothesis analyzer 136, map handler 138, input handler 140, anchor point manager 142 and uncertainty estimator 143. Position estimator 134 may use navigation solutions for a plurality of sensor epochs provided by navigation module 120 to estimate position information for portable device 100. The estimated position information may also be updated using information from hypothesis analyzer 136, which may be configured to generate, evaluate and combine multiple hypotheses regarding possible positions of portable device 100 using the estimated position and information from map handler 138. Hypothesis analyzer 136 may also be configured to analyze the navigation solutions and determine a motion mode that indicates the user's motion patterns in a similar manner to that described above with regard to navigational module 120. Either or both navigation module 120 and hypothesis analyzer 136 may determine a motion mode, but hypothesis analyzer 136 may have advantages associated with the availability of both past and future information for motion detection at a given time and/or may have greater processing resources available to perform more sophisticated algorithms, and correspondingly may be give greater weight if conflicting detections exist. In turn, map handler 138 may be configured to access external information regarding an area encompassing a location of portable device 100 when the navigation solutions were derived and present the information in a form usable by hypothesis analyzer 136. Input handler 140 may perform preliminary processing of the navigation solutions derived by navigation module 120, including filtering, categorizing motion segments, and/or detecting motion characteristics. Anchor point manager 142 may identify one or more anchor points having known position information that may be associated with one or more of the navigation solutions. Uncertainty estimator 143 may be used to assess the confidence in any enhanced navigation solution(s) derived from the management of hypotheses by hypothesis analyzer 136, such as updated position information from position estimator 134.

By processing the generated hypotheses, such as combining using appropriate weighting and averaging, electing a selected hypothesis, electing a group of hypotheses and combining only these using appropriate weighting and averaging, or other suitable operations, the output from hypothesis analyzer 136 may be used by position estimator to update the estimated position information. The estimated position information and/or updated estimated position information may include, in addition to position information, velocity and/or heading information, as well as any other information related to the motion or position of device 100, and may also include map entity information. The updated estimated position may then be used as an enhanced navigation solution for at least one sensor epoch or may be fed back to navigation module 120 for use in deriving an enhanced navigation solution for at least one epoch. In some embodiments, values from the updated estimated position information and the navigation solution may be used in the enhanced navigation solution. Correspondingly, uncertainty estimator 143 may assess the confidence associated with one or more of the enhanced navigation solutions. It will be appreciated that confidence may be expressed as a certainty measure, in which the value may increase in relation to confidence in the accuracy of a determination, or as an uncertainty measure in which the value may decrease.

Conversely, the value of an uncertainty measure may increase in relation to ambiguity in a determination, while the value of a certainty measure may decrease. As such, certainty and uncertainty have a generally reciprocal relationship and either may be used to evaluate the accuracy of a given determination as desired or warranted by the context.

Server 126 may also include a communications module 144 to receive raw sensor data or navigation solutions for portable device 100 derived by navigation module 120, and if desired, may transmit information related to the enhanced navigation solution to portable device 100 or to another destination. Communications between portable device 100 and server 126 may employ any suitable protocol. For example, a shorter range, low power communication protocol such as BLUETOOTH®, ZigBee®, ANT or a wired connection may be used or a longer range communication protocol, such as a transmission control protocol, internet protocol (TCP/IP) packet-based communication, accessed using a wireless local area network (WLAN), cell phone protocol or the like may be used. In general, the system depicted in FIG. 1 may embody aspects of a networked or distributed computing environment. Portable devices 100 and server 126 may communicate either directly or indirectly, such as through multiple interconnected networks. As will be appreciated, a variety of systems, components, and network configurations, topologies and infrastructures, such as client/server, peer-to-peer, or hybrid architectures, may be employed to support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

As noted, portable device 100 may derive the navigation solutions and server 126 may perform an offline map matching routine to provide an enhanced navigation solution for at least one of the navigation solutions. However, any or all of the functions described as being performed may be performed by any number of discrete devices in communication with each other, or may be performed by portable device 100 itself in other suitable system architectures. Accordingly, it should be appreciated that any suitable division of processing resources may be employed whether within one device or among a plurality of devices. Further, aspects implemented in software may include but are not limited to, application software, firmware, resident software, microcode, etc., and may take the form of a computer program product accessible from a computer-usable or computer-readable medium providing program code for use by or in connection with a computer or any instruction execution system, such as host processor 102, sensor processor 108, server processor 128, a dedicated processor or any other processing resources of portable device 100, server 126 or other remote processing resources, or may be implemented using any desired combination of software, hardware and firmware.

Figure 27:
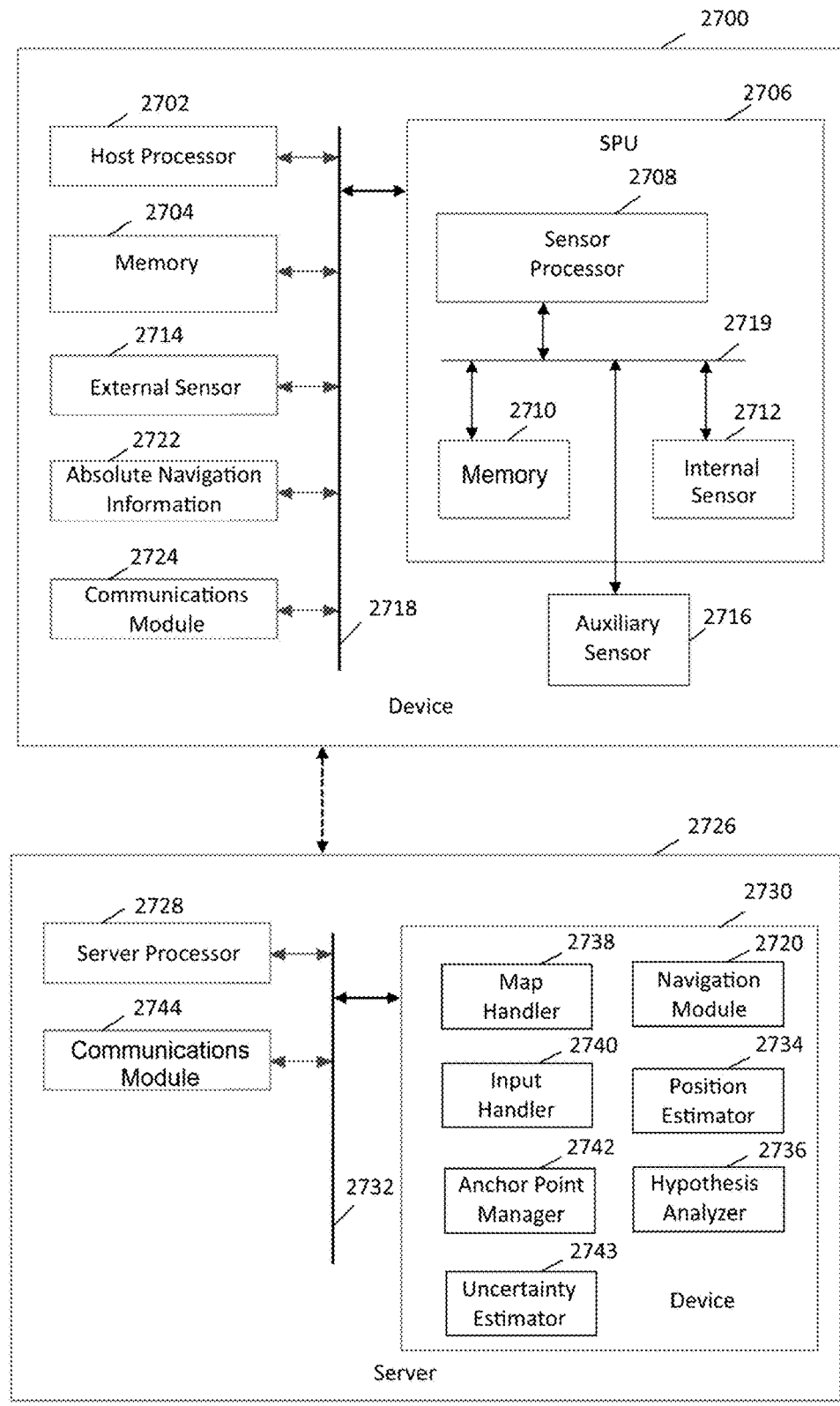
FIG. 27 is schematic diagram of another system for offline enhancement of a navigation solution according to an embodiment.

For example, another embodiment is schematically depicted in FIG. 27. Here, similar components have corresponding reference numbers (such as, portable device 100 of FIG. 1 may correspond to portable device 2700 of FIG. 27). As such, portable device 2700 includes a host processor 2702, which may be one or more microprocessors, central processing units (CPUs), or other processors to run software programs, which may be stored in memory 2704, associated with the functions of device 2700. Multiple layers of software can be provided in memory 2704. Device 2700 includes at least one sensor assembly, as shown here in the form of integrated motion processing unit (SPU™) 2706 featuring sensor processor 2708, memory 2710 and inertial sensor 2712. Memory 2710 may store algorithms, routines or other instructions for processing data output by inertial sensor 2712 and/or other sensors as described below using logic or controllers of sensor processor 2708, as well as storing raw data and/or motion data output by inertial sensor 2712 or other sensors. Inertial sensor 2712 may be one or more sensors for measuring motion of device 2700 in space, such as a gyroscope and/or an accelerometer as described above. Device 2700 may also implement a sensor assembly in the form of external sensor 2714. This is optional and not required in all embodiments. Also alternatively or in addition, SPU 2706 may receive data from an auxiliary sensor 2716 configured to measure one or more aspects about the environment surrounding device 2700. This is optional and not required in all embodiments. In this embodiment, host processor 2702, memory 2704, SPU 2706 and other components of device 2700 may be coupled through bus 2718, while sensor processor 2708, memory 2710, internal sensor 2712 and/or auxiliary sensor 2716 may be coupled though bus 2719, either of which may be any suitable bus or interface as noted above. Device 2700 may also have a source of absolute navigation information 2722, which is optional, and may have a communications module 2724 for transmitting and/or receiving information, including enhanced navigation solutions derived remotely.

In this exemplary system, portable device 2700 communicates raw sensor data for a plurality of sensor epochs over a first period of time to server 2726, which may include a navigation module 2720 to derive a navigation solution for portable device 2700 for the raw sensor data at each epoch. Navigation module 2720 may be implemented as a set of suitable instructions stored in memory 2730 that may be read and executed by server processor 2728. Subsequent to the first period of time, server 2726 may then perform an offline map matching routine according to the techniques of this disclosure using the navigation solutions from navigation module 2720 to provide an enhanced navigation solution for at least one of the sensor epochs. Server processor 2728 may be in communication with memory 2730 over bus 2732 and may execute instructions stored in memory 2730 that are represented as functional blocks, including position estimator 2734, hypothesis analyzer 2736, map handler 2738, input handler 2740, anchor point manager 2742 and uncertainty estimator 2743, using similar techniques. Server 2726 may also include a communications module 2744 to receive raw sensor data for portable device 2700, and if desired, may transmit information related to the enhanced navigation solution to portable device 2700 or to another destination.

Figure 28:
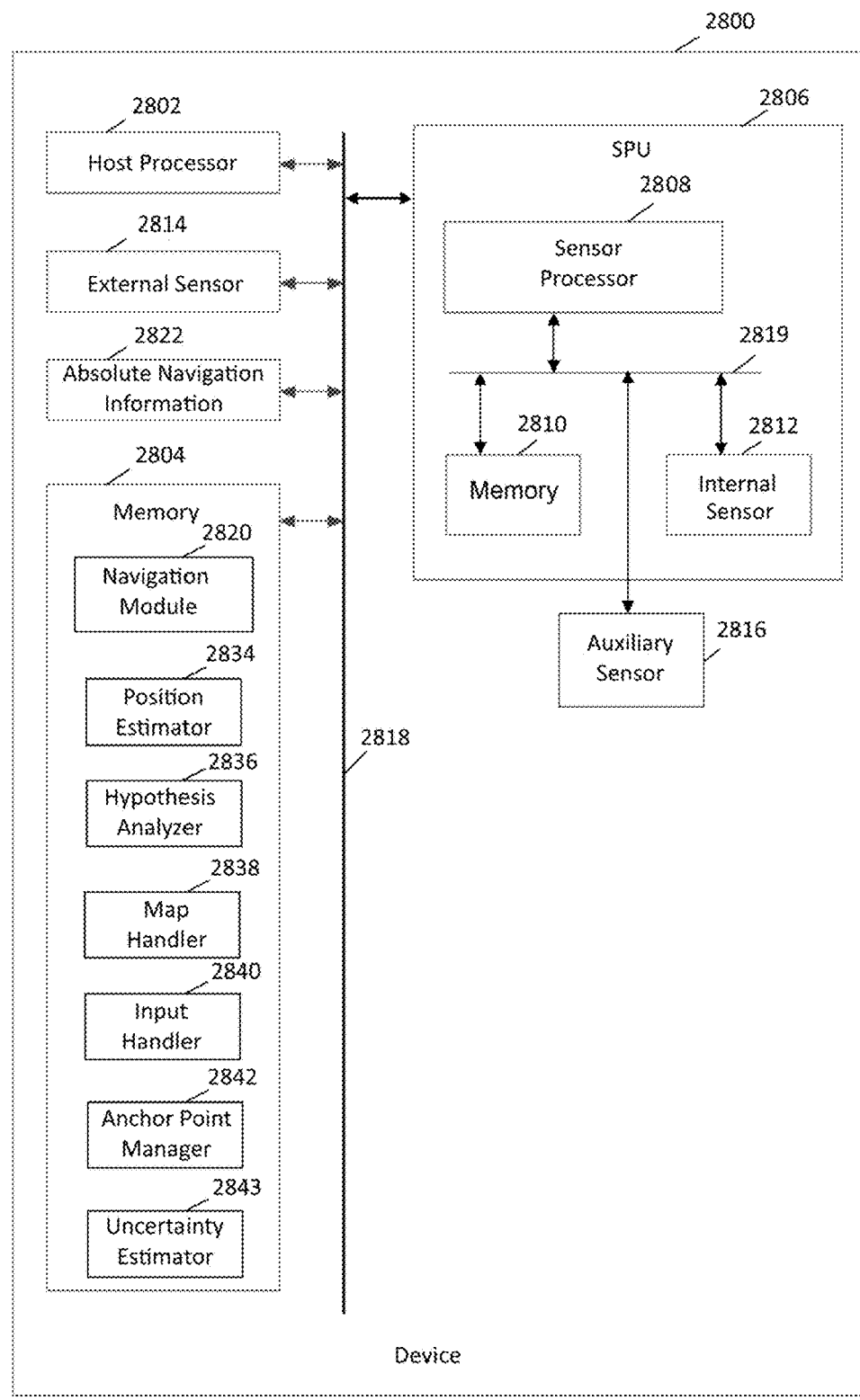
FIG. 28 is schematic diagram of a device for offline enhancement of a navigation solution according to an embodiment.

As another illustrative example, the embodiment schematically depicted in FIG. 28 represents a device in which the offline map matching routine is performed locally. Again, similar components have corresponding reference numbers (such as, portable device 100 of FIG. 1 may correspond to portable device 2800 of FIG. 28). Accordingly, portable device 2800 includes a host processor 2802, which may be one or more microprocessors, central processing units (CPUs), or other processors to run software programs, which may be stored in memory 2804, associated with the functions of device 2800. Multiple layers of software can be provided in memory 2804. Device 2800 includes at least one sensor assembly, as shown here in the form of integrated motion processing unit (SPU™) 2806 featuring sensor processor 2808, memory 2810 and inertial sensor 2812. Memory 2810 may store algorithms, routines or other instructions for processing data output by inertial sensor 2812 and/or other sensors as described below using logic or controllers of sensor processor 2808, as well as storing raw data and/or motion data output by inertial sensor 2812 or other sensors. Inertial sensor 2812 may be one or more sensors for measuring motion of device 2800 in space, such as a gyroscope and/or an accelerometer as described above. Device 2800 may also implement a sensor assembly in the form of external sensor 2814. This is optional and not required in all embodiments. Also alternatively or in addition, SPU 2806 may receive data from an auxiliary sensor 2816 configured to measure one or more aspects about the environment surrounding device 2800. This is optional and not required in all embodiments. In this embodiment, host processor 2802, memory 2804, SPU 2806 and other components of device 2800 may be coupled through bus 2818, while sensor processor 2808, memory 2810, internal sensor 2812 and/or auxiliary sensor 2816 may be coupled though bus 2819, either of which may be any suitable bus or interface as noted above. Device 2800 may also have a source of absolute navigation information 2822, which is optional and not required in all embodiments.

In this embodiment, portable device 2800 includes navigation module 2820, representing instructions stored in memory 2804 for execution by host processor 2802 to derive a navigation solution for portable device 2800 using the sensor data at each epoch. Subsequent to the first period of time, device 2800 may then perform an offline map matching routine according to the techniques of this disclosure using the navigation solutions from navigation module 2820 to provide an enhanced navigation solution for at least one of the sensor epochs. Host processor 2802 may execute instructions that are represented as functional blocks, including position estimator 2834, hypothesis analyzer 2836, map handler 2838, input handler 2840, anchor point manager 2842 and uncertainty estimator 2843, using similar techniques.

Figure 2:
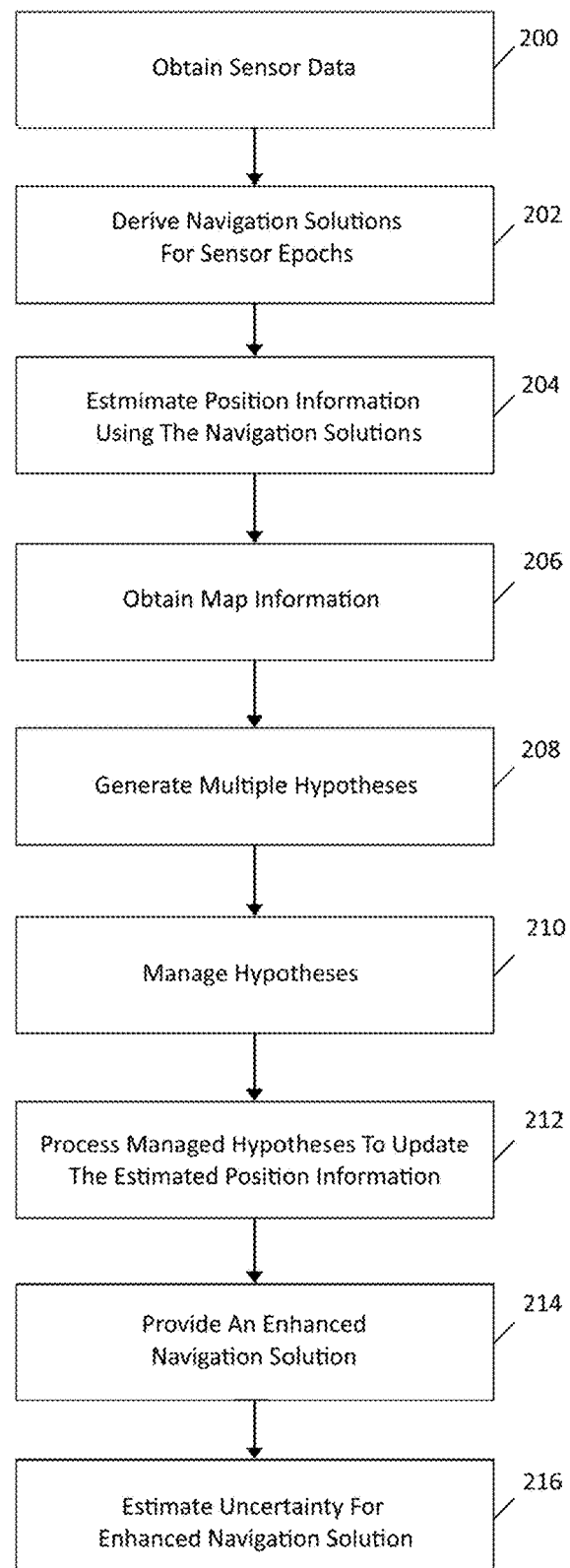
FIG. 2 is a flowchart of a routine for enhancing a navigation solution with offline map information according to an embodiment.

A representative routine involving the techniques of this disclosure is depicted in FIG. 2. Beginning with 200, sensor data may be obtained for a plurality of epochs over a given time period, such as from inertial sensor 112 and/or external sensor 114, for the portable device. Using the sensor data, navigation module 120 may derive a navigation solution at each sensor epoch in 202. In embodiments where offline map matching is performed remotely, either the raw sensor data, the derived navigation solutions or both may be transmitted to remote processing resources, such as server 126. For example, the derivation of navigation solutions for each sensor epoch may be performed by navigation module 120 at portable device 100 or may be performed at server 126 using the raw sensor data for each sensor epoch as transmitted by portable device 100. In other embodiments, portable device 100 may perform the offline map matching locally. Regardless of whether the offline map matching occurs locally or remotely, position information for portable device 100 may be estimated in 204 at a time subsequent to the given time period and map information for a surrounding area may be obtained in 206. Multiple hypotheses may be generated in 208 for at least one of the sensor epochs from the estimated position information and the map information. Next, in 210, the generated hypotheses are managed as described herein and then processed in 212 to update the estimated position information. An enhanced navigation solution for the at least one sensor epoch may then be provided in 214. Uncertainty estimator may assess the confidence (or conversely, the ambiguity) associated for such enhanced navigation solution(s) using the techniques described below, such as by evaluating a standard deviation for the each solution. As will be appreciated, the offline map matching may utilize sensor data when providing the enhanced navigation solution. Correspondingly, the uncertainty estimate may reflect confidence associated with the sensor information as well as factors related to the map matching routine. When additional information is used in deriving the enhanced navigation solution, the uncertainty estimate may also account for the confidence attributable to that information. For example, one or more anchor points may be used as position updates or may be used when generating and/or managing hypotheses, so that the uncertainty estimate may include related components. Likewise, when a source of absolute navigation information is available, the uncertainty estimate may include an associated degree of confidence.

In one aspect, absolute navigation information may be obtained for the portable device, wherein the navigation solution derived for at least one epoch may be based at least in part on the absolute navigation information. The absolute navigation information may be obtained from any one or any combination of the following: (i) a global navigation satellite system (GNSS); (ii) cell-based positioning; (iii) WiFi-based positioning; (iv) Bluetooth-based positioning; (v) other wireless-based positioning; or (vi) visual light communication based positioning.

In one aspect, providing an enhanced navigation solution may include performing a forward processing operation over the first period of time.

In one aspect, providing an enhanced navigation solution may include performing a backward processing operation over the first period of time.

In one aspect, providing an enhanced navigation solution may include performing a forward processing operation and a backward processing operation over the first period of time.

In one aspect, providing an enhanced navigation solution may include a forward processing operation, a backward processing operation over the first period of time, and a combination of the forward processing and backward processing.

In one aspect, providing an enhanced navigation solution may include performing a smoothing operation over the first period of time.

In one aspect, providing an enhanced navigation solution may include performing a backward smoothing operation over the first period of time.

In one aspect, providing an enhanced navigation solution may include performing a multiple pass processing operation over the first period of time.

In one aspect, heading information for the navigation solution of at least one epoch may be filtered. Filtering heading information may include applying a zero-phase low pass filter.

In one aspect, the plurality of navigation solutions may be categorized into straight-line segments and turn segments and may further include detecting a false turn.

In one aspect, period of non-meaningful motion may be characterized within the first period of time, such as a fidgeting period. Misalignment may be tracked corresponding to the fidgeting period. Further, steps detected during the fidgeting period may be compensated.

In one aspect, the map information may be preprocessed. Preprocessing the map information may include extracting map entities. Preprocessing the map information may also include clipping at least one foreground map entity from a background entity. Clipping the background entity may define a traversable area. Still further, preprocessing the map information may include representing a map entity as a relatively complex polygon and decomposing the polygon into a plurality of relatively more simple polygons. Preprocessing the map information may also include generating a grid of connected links and nodes.

In one aspect, the estimated position information may be an error region representing potential positions of the portable device at the at least sensor epoch. At least one of the hypotheses may be generated by projecting the error region onto the map information. A plurality of hypotheses may be generated by projecting the error region onto the map information when an overlap with a plurality of map entities occurs.

In one aspect, the map information may be a polygon based geometric map. Alternatively or in addition, the map information may be a grid map.

In one aspect, the map information may be a grid map and the estimated position information may be based at least in part on a correlation between a determined user trajectory for the at least one instant during the first period time and a topological feature of the grid map. A weighted topological algorithm may be applied.

Managing the hypotheses may include at least one of adding, eliminating and combining hypotheses. An anchor point may be identified that is associated with the navigation solution of at least one epoch and managing the hypotheses may be based at least in part on the identified anchor point. A plurality of ordered anchor points may be identified. A hypothesis may be generated based at least in part on the ordered anchor points. Alternatively or in addition, a plurality of unordered anchor points may be identified, which in some embodiments may be used to prune at least one hypothesis. Still further, one or more improperly ordered anchor points may be identified.

In one aspect, managing the hypotheses may include applying a decision making logic. The decision making logic may be configured for a wall crossing event. The decision making logic may be configured for a level change event.

In one aspect, generated multiple hypotheses for a plurality of sensor epochs may be stored. Storing generated multiple hypotheses may include relating hypotheses to each other. The stored generated multiple hypotheses may be weighted based at least in part on the relations.

In one aspect, the navigation solution may include a motion mode for the user. The estimated position information may be is based at least in part on the motion mode. The hypotheses may be managed based at least in part on the motion mode. Further, a level change event may be based at least in part on the motion mode.

In one aspect, the enhanced navigation solution may include a motion mode for the user detected based at least in part on a map entity associated with the estimated position information.

In one aspect, position information for the portable device may be estimated using at least one of a prediction only Kalman filter, a near constant velocity Kalman filter, a prediction only particle filter and a near constant velocity particle filter.

In one aspect, at least one of deriving the navigation solutions, obtaining map information, generating multiple hypotheses, managing the hypotheses, processing the managed hypotheses to update the estimated position information for the portable device and providing an enhanced navigation solution using the updated estimated position information may be performed remotely.

In one aspect, the method may include deriving an uncertainty measure for the enhanced navigation solution, which may include estimating a standard deviation for a value of the enhanced navigation solution.

At least one of deriving navigation solutions for the epochs and estimating position information based at least in part on the plurality of navigation solutions may include any of the following: (i) a forward processing operation over the first period of time; (ii) a backward processing operation over the first period of time; (iii) a forward processing operation and a backward processing operation over the first period of time; (iv) a forward processing operation, a backward processing operation over the first period of time, and a combination of the forward processing and backward processing; (v) a smoothing operation over the first period of time; (vi) a backward smoothing operation over the first period of time; and (vii) a multiple pass processing operation over the first period of time.

In one aspect, the uncertainty measure for the enhanced navigation solution may be a sensor-based navigation uncertainty. The sensor-based navigation uncertainty may be derived from any one or any combination of the following: (i) state estimation quality; (ii) misalignment quality; (iii) step-length quality; or (iv) stepdetection quality; (v) fidgeting ratio.

In one aspect, the uncertainty measure for the enhanced navigation solution may be a map-matching positioning uncertainty. The map-matching positioning uncertainty may be derived from any one or any combination of the following: (i) a scoring measure for a map-matched segment; (ii) number of the generated multiple hypotheses; or (iii) spatial dispersion of the generated multiple hypotheses.

In one aspect, at least one of managing the multiple hypotheses and processing the managed hypotheses to update the estimated position may include utilizing an anchor point. The anchor point may be derived from a source of absolute navigation information for the portable device and wherein the absolute navigation information is obtained from any one or any combination of the following: (i) a global navigation satellite system (GNSS); (ii) cell-based positioning; (iii) WiFi-based positioning; (iv) Bluetooth-based positioning; (v) other wireless-based positioning; and (vi) visual light communication-based positioning. The anchor point may be derived from point of sale information. Further, the anchor point may be derived from an interaction between the portable device and an item having a known location. The method may include utilizing a plurality of ordered anchor points. Correspondingly, the uncertainty measure for the enhanced navigation solution may also use the plurality of ordered anchor points. The uncertainty measure for the enhanced navigation solution may be an anchor point uncertainty for each anchor point of the ordered plurality of anchor points. The anchor point uncertainty may be based at least in part on performing a local estimation based on at least one of: (i) zero-step length percentage, (ii) candidates spread factor, (iii) candidate density and (iv) time-tag uncertainty. The anchor point uncertainty may be based at least in part on performing an intermediate estimation based on at least one of (i) distances between anchor points associated with a solution path chosen from candidates and the solution path from candidates, (ii) nearest segment ratio, and (iii) adjacent segments. The anchor point uncertainty may be based at least in part on performing a global estimation based on at least one of (i) forward and backward order, (ii) anchor point time-tags, and (iii) merging of forward and backward order.

In one aspect, the anchor point uncertainty may be based at least in part performing a local estimation, an intermediate estimation and a global estimation. The method may also involve assigning a time-tag for at least one of the ordered plurality of anchor points so that the uncertainty measure for the enhanced navigation solution may include a time-tag uncertainty. The time-tag uncertainty may be based at least in part on a factor selected from the group consisting of: (i) whether an anchor point falls on a candidate link and (ii) a relationship of an anchor point to a dwell period.

In one aspect, the uncertainty measure for the enhanced navigation solution may be based at least in part on proximity to the anchor point.

In one aspect, the uncertainty measure for the enhanced navigation solution may include an absolute navigation information uncertainty. The absolute navigation information uncertainty may be based at least on one or any combination of the following: (i) a fingerprinting uncertainty; (ii) a radio frequency identification (RFID) uncertainty; or (iii) trilateration/triangulation uncertainty.

In one aspect, the method may also include deriving user analytics based at least in part on the enhanced navigation solution and the uncertainty measure and/or deriving aggregate user analytics based at least in part on aggregating enhanced navigation solutions and respective uncertainty measures for each for a plurality of enhanced navigation solutions within the environment for the users, wherein each enhanced navigation solution is based at least in part on a distinct set of sensor data. At least one of managing the multiple hypotheses, processing the managed hypotheses to update the estimated position information, providing the enhanced navigation solution, and deriving an uncertainty measure for the enhanced navigation solution may include utilizing an anchor point derived from point of sale information, so that the method also involves declaring at least one unconverted interaction based at least in part on a dwell period correlated with product information and the anchor point derived from point of sale information, wherein the user analytics may be the unconverted interaction. In another aspect, the method may include utilizing an anchor point derived from point of sale information, and further include declaring at least one unconverted interaction based at least in part on: (i) the enhanced navigation solution, (ii) a detection of dwell period correlated with product information, (iii) the uncertainty measure of the enhanced navigation solution at the detected dwell, and (iv) the anchor point derived from point of sale information, wherein the method relates the at least one unconverted interaction to a dwell period that does not correspond to the anchor point derived from point of sale information. An offer may be conveyed to the a user based at least in part on the unconverted interaction.

In one aspect, the method may include crowdsourcing by aggregating enhanced navigation solutions and respective uncertainty measures for the aggregated enhanced navigation solutions for a plurality of enhanced navigation solutions within the environment, wherein each enhanced navigation solution may be based at least in part on a distinct set of sensor data. Sensor measurements may be recorded with the portable device and correlated with at least one location determined from the enhanced navigation solution. A fingerprint map may be built with the recorded sensor measurements.

As noted, the techniques of this disclosure may be implemented using a portable device that includes an integrated sensor assembly that may output sensor data representing motion of the portable device for the portable device at a plurality of epochs over a first period of time, a navigation module configured to derive navigation solutions based at least in part on the sensor data at a plurality of sensor epochs and a processor that may implement a position estimator for providing estimated position information for the portable device based at least in part on the plurality of navigation solutions at a time subsequent to the first period of time, a map handler for obtaining map information for an area encompassing locations of the portable device during the first period of time, a hypothesis analyzer for generating and managing multiple hypotheses regarding possible positions of the portable device for at least one epoch during the first period of time based at least in part on the estimated position information and the map information and an uncertainty estimator, so that the processor may update the estimated position information for the portable device based at least in part on the managed hypotheses to provide an enhanced navigation solution for the at least one epoch using the updated estimated position information and derive an uncertainty measure for the enhanced navigation solution.

In one aspect, the portable device may have a source of absolute navigation information for the portable device, wherein the navigation solution for at least one epoch may be based at least in part on the absolute navigation information. The absolute navigation information may be obtained from any one or any combination of the following: (i) a global navigation satellite system (GNSS); (ii) cell-based positioning; (iii) WiFi-based positioning; (iv) Bluetooth-based positioning; (v) other wireless-based positioning; or (vi) visual light communication based positioning. The portable device may have an integrated sensor assembly that outputs sensor data representing motion of the portable device at the plurality of epochs. The sensor assembly may include an accelerometer and a gyroscope. The sensor assembly may be an inertial sensor implemented as a Micro Electro Mechanical System (MEMS).

This disclosure also includes a remote processing resource for enhancing a navigation solution of a portable device and a platform using map information, wherein the mobility of the portable device is constrained or unconstrained within the platform and wherein the portable device may be tilted to any orientation. The server may include a communications module for receiving information provided by the portable device, wherein the information corresponds to a plurality of epochs over a first period of time of sensor data representing motion of the portable device and a processor that may implement a position estimator for providing estimated position information for the portable device based at least in part on the plurality of navigation solutions at a time subsequent to the first period of time, a map handler for obtaining map information for an area encompassing locations of the portable device during the first period of time, a hypothesis analyzer for generating and managing multiple hypotheses regarding possible positions of the portable device for at least one epoch during the first period of time based at least in part on the estimated position information and the map information and an uncertainty estimator, so that the processor may update the estimated position information for the portable device based at least in part on the managed hypotheses to provide an enhanced navigation solution for the at least one epoch using the updated estimated position information and derive an uncertainty measure for the enhanced navigation solution.

In one aspect, the information received by the communications module may be sensor data for the portable device representing motion of the portable device at the epochs and the processor may derive navigation solutions for the epochs based at least in part on the sensor data.

In one aspect, the information received by the communications module may be navigation solutions derived for the epochs by the portable device.

In one aspect, the communications module may transmit the enhanced navigation solution and/or the derived uncertainty measure to the portable device.

In one aspect, the server may have memory for storing multiple hypotheses generated by the hypotheses analyzer.

Still further, this disclosure includes a system for providing an enhanced navigation solution using map information. The system may have a portable device with an integrated sensor assembly, configured to output sensor data representing motion of the portable device for the portable device at a plurality of epochs over a first period of time and a communications module for transmitting information corresponding to the epochs. The system may also include remote processing resources to receive the information from the portable device and a processor that may implement a position estimator for providing estimated position information for the portable device based at least in part on the plurality of navigation solutions at a time subsequent to the first period of time, a map handler for obtaining map information for an area encompassing locations of the portable device during the first period of time, a hypothesis analyzer for generating and managing multiple hypotheses regarding possible positions of the portable device for at least one epoch during the first period of time based at least in part on the estimated position information and the map information and an uncertainty estimator, so that the processor may update the estimated position information for the portable device based at least in part on the managed hypotheses to provide an enhanced navigation solution for the at least one epoch using the updated estimated position information and derive an uncertainty measure for the enhanced navigation solution.

In one aspect, the information received by the remote processing resources may be sensor data for the portable device and the remote processing resources may derive navigation solutions for the epochs based at least in part on the sensor data.

In one aspect, the portable device may have a navigation module configured to derive navigation solutions based at least in part on the sensor data at the plurality of epochs and the communications module may transmit the navigation solutions.

In one aspect, the remote processing resources may transmit the enhanced navigation solution and/or the derived uncertainty measure to the portable device.

In one aspect, the remote processing resources may have memory for storing multiple hypotheses generated by the hypotheses analyzer.

EXAMPLES

As described above, the techniques of the disclosure involve providing an offline enhanced navigation solution using map information. In some embodiments, operations and/or algorithms related to map matching may be similar to those described in co-pending, commonly-assigned U.S. patent application Ser. No. 14/845,903, filed Sep. 4, 2015, which is entitled "METHOD AND APPARATUS FOR USING MAP INFORMATION AIDED ENHANCED PORTABLE NAVIGATION," which is related to causal map-matching as opposed to offline map-matching and is incorporated by reference in its entirety.

Figure 3:
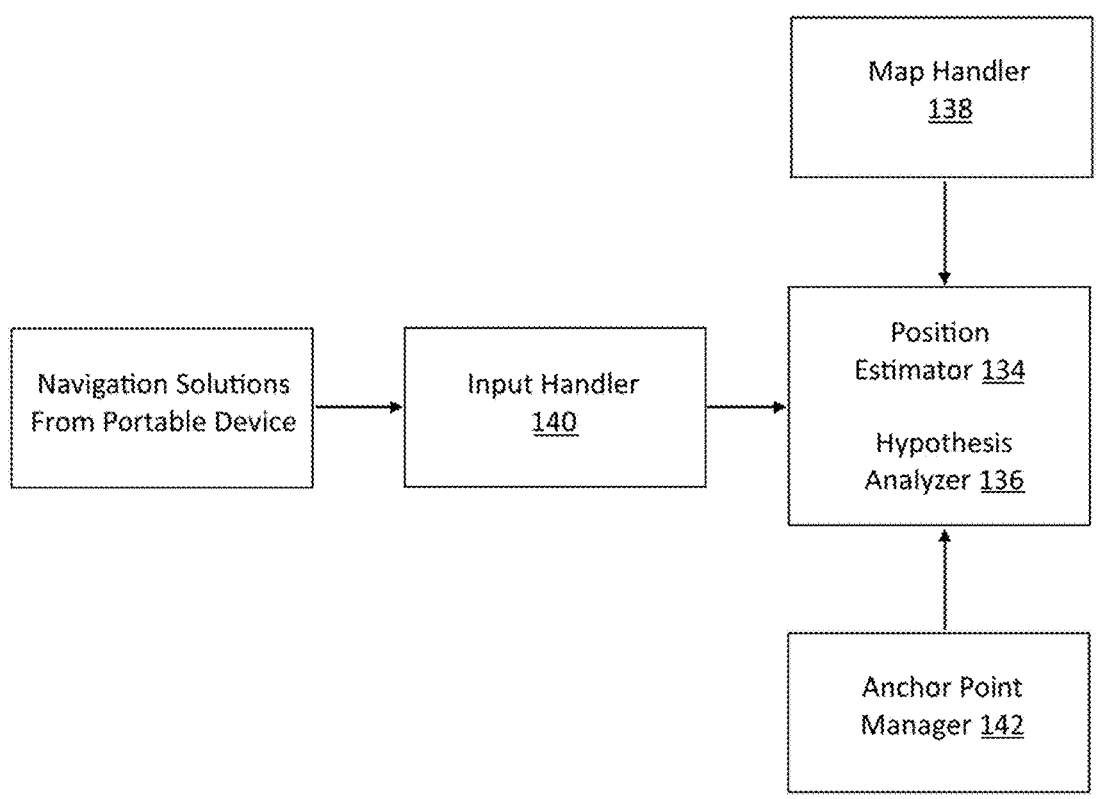
FIG. 3 is a schematic representation of functional blocks for performing offline map matching to enhance a navigation solution of a portable device according to an embodiment.

To illustrate an exemplary embodiment, one suitable relationship between the functional blocks implemented by server 126 is shown in FIG. 3. Navigation solutions derived by navigation module 120 corresponding to a plurality of sensor epochs over a first time period are fed to input hander 140 at subsequent time. Input handler 140 may provide operations on the navigation solutions to facilitate their use by position estimator 134 and/or hypothesis analyzer 136. Map handler 138 may feed map information corresponding to an area corresponding to the navigation solutions to position estimator 134 and/or hypothesis analyzer 136. As will be described below, the map information may be preformatted in a form usable by position estimator 134 and/or hypothesis analyzer 136 or map handler 140 may perform additional operations to organize and/or process map information to present it in a suitable form. Anchor point manager 142 may perform operations to correlate one or more known locations with one or more of the navigation solutions.

Figure 4:
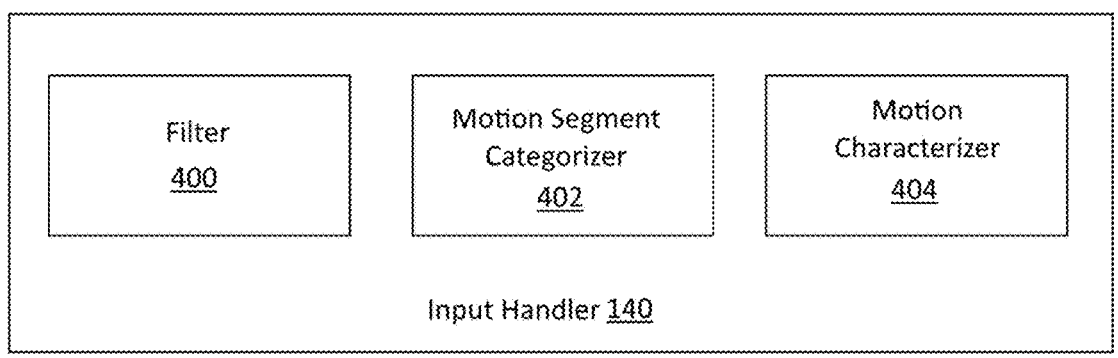
FIG. 4 is a schematic representation of an input handler for performing offline map matching to enhance a navigation solution of a portable device according to an embodiment

Accordingly, the navigation solutions provided by navigation module 120 of portable device 100 may be processed preliminarily to improve their usability during the offline map matching routine, such as by input hander 140. As schematically shown in FIG. 4, input handler 140 may include filter 400, motion segment categorizer 402 and/or motion characterizer 404. Input hander receives the navigation solutions derived by navigation module 120 as inputs.

The input heading from the navigation solution provided by navigation module 120 may be expected to be the platform heading, and may be derived from the difference between the device heading and an estimated misalignment angle. In some situations, this derived platform heading from the navigation solution may exhibit a periodic heading oscillation or a sine-wave like heading undulations, depending on the use case of portable device. The use case is a characterization of the type of interaction between a portable device and the user, and may include whether the user is carrying the device, holding the device with a swinging arm or "dangling," positioning it "on ear" when talking, inputting data or viewing in a navigation or texting operation, carrying the device in a pocket or other container or holder, and other usages of the device that affect its orientation with respect to the user. For example, pocket or dangling use cases may have a periodic motion component. It may be desirable to remove or reduce components of the navigation solutions that may be ascribed to this oscillation. By employing all of the navigation solutions derived over the first time period, a zero-phase low pass filter can be utilized to remove or reduce the effect of the oscillations without introducing unwanted delay into the signals.

In one aspect, it may be desirable to group one or more navigation solutions into similar motion patterns. For example, when the navigation solutions are viewed as representing a trajectory of the user, segments of the trajectory may be categorized as either turns or straight-lines by motion segment categorizer 402. The entrance and exit time of each straight-line and turn segments may be indicated for use by position estimator 134 and/or hypothesis analyzer 136. Further, motion segment categorizer 402 may also determine the shapes of the turn, for example as being U-shaped or L-shaped. Consequently, the turn shape information may be employed by hypothesis analyzer 136 during hypothesis management. Additionally, information from navigation solutions identified as being near a turning period may be taken into consideration to remove false turning induced by fidgeting or short-time misalignment change. Furthermore, if the turn shape cannot be accurately determined due to the occurrence of fidgeting, inaccurate misalignment estimates, gyro drift and etc., an arbitrary turn indicator will be flagged so that the hypothesis analyzer can generate all possible candidates to compensate the uncertainty of the turn shape.

In one aspect, it may desirable to detect one or more navigation solutions that may be associated with a type of motion that may influence the use of the information during offline map matching. For example, motion characterizer 402 may detect patterns of motion that indicate the device is undergoing non-meaningful motion, such as a user fidgeting with the device. Correspondingly, motion characterizer 402 may be used to detect one or more periods during which some or all motion experienced by the device is non-meaningful or the result of fidgeting and identify the navigation solutions corresponding to such periods. For example, the entrance and exit time of a fidgeting period may be provided to by position estimator 134 and/or hypothesis analyzer 136. Further, information before and after each such periods may be used to improve the identification of non-meaningful motion. In some embodiments, a detected non-meaningful motion period may be used for tracking misalignment to isolate an unintended misalignment change during the non-meaningful motion period. In some embodiments, a detected non-meaningful motion period may be used for compensating the detection of steps in pedestrian dead reckoning techniques, in which the non-meaningful motion may result in the incorrect detection of steps.

As noted, position estimator 134 may utilize the navigation solutions from navigation module 120 as well as results from hypothesis analyzer 136 to generate improved map matched positioning estimates. Hypothesis analyzer 136 uses these position estimates to create, eliminate or combine hypotheses for the next epoch. Position estimator 134 maintains all the possible map matched candidates and generates their corresponding positioning estimates. Position estimator 134 may use any one or combination of filters to obtain the position estimates, including without limitation Kalman filters, unscented Kalman filters, particle filters and the like. Different system and measurement models can be also used according to the applications, for example: prediction only, near constant velocity and others. These models may employ different techniques to propagate the position of portable device 100 and to use navigation solution outputs as measurement updates. Representative system and measurement models are described in the following materials, but other variations may be employed. Position estimator 134 may output an updated position, which may also include velocity and/or heading information that is a combination of the hypotheses. For example, the combination may be a weighted average. The weights used in combining the hypotheses may be adaptively tuned according to the empirical or topological models. For example, the weighting can be adjusted based on the number of hypotheses and/or uncertainty of the position estimates. The updated position from the combination of hypotheses represents map aided information and may be used to provide an enhanced navigation solution. Furthermore, map entity information that may be associated with a given navigation solution is also beneficial to improve the motion detection associated with that navigation solution. For example, if it can be determined that the user was/is on stairs, patterns of corresponding sensor data may be associated with that motion mode.

Map information may initially be obtained from any suitable source, such as from on-line map service providers. A necessary, the map information may be preprocessed into a form suitable for use by position estimator 134 and/or hypothesis analyzer 136. For example, the map information may be converted into an internal map data structure, where it may be saved into the local storage for future use without the overhead of downloading and processing it again if desired. Accordingly, preprocessing the map information may include the functions of i) converting map information from various map data providers to a unified data structure, ii) preparing the necessary map data structure suitable for map aided algorithms, and/or iii) storing the map information in local storage, such as memory 130 (for embodiments in which offline map matching is performed remotely) or memory 104 (for embodiments in which offline map matching is performed locally).

On-line indoor/outdoor map service providers may provide web Application Programming Interfaces (APIs) to access their map database. Accordingly, the corresponding APIs from the map provider may be used to obtain map information for an area encompassing the user's trajectory. Particularly notable examples of venues that may have corresponding map information include indoor environments such as retail stores that may also provide point of sale information for determining anchor points. This map information may be processed to facilitate its use, such as by decoding to extract the necessary map data used for techniques of this disclosure using the APIs and converted into a unified format such as the Geographic Javascript Objective Notation (GeoJson) format, although xml files, binary files and others may be used. The converted map data can then be saved in the local storage for the future use. The decoding and conversion may be performed by external resources and delivered in any suitable manner for use during anchor point ordering. Generally, it is desirable to minimize the number of times processing operations are performed for each venue. For example, the map information may be appropriately formatted for a given venue once and distributed to any number of portable devices to be used in the generation of hypotheses for enhancing a navigation solution within that venue. However, another preprocessing operation may be performed when new information becomes available or when changes to the venue occur.

In some embodiments, obtained map information may be transformed into a geometric map. As such, preprocessing the map information may include segregating it into traversable and non-traversable regions. For example, corridors represent an important class of traversable regions in typical indoor environments. As such, a corridor clipping function may be performed to extract corridor shape information from background entities if the corridor information is not available to present the map information as a polygon based geometric map. Many conventional map service providers do not offer corridor shape information which is important in an indoor map aided algorithm. Therefore, a suitable technique for obtaining the shape of corridors that may be present in the venue may include extracting all the other entities from the background entity. The background entity may be a boundary contour that establishes a given building or level of a building or other venue. Foreground entities include all objects such as shops, elevators, escalators, and other obstacles within the boundary contour. The clipping process as used herein refers to the process of cutting away from a set of 2-dimensional geometric shapes those parts that are outside a particular 'clipping' window. This can be achieved by intersecting a subject polygon (background entity) with a clipping polygon (other foreground entities on top of the background entities). The polygons may be defined by a sequence of vertices and any curves may be represented as an appropriate set of line segments.

Figure 5:
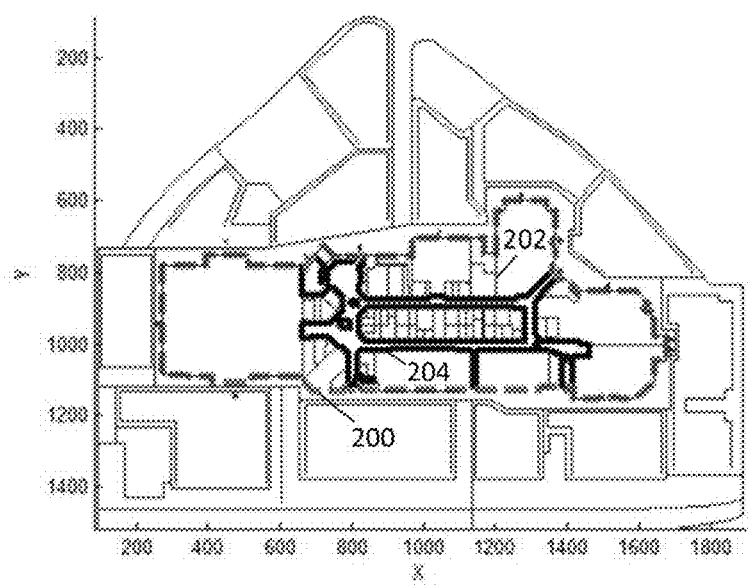
FIG. 5 is a schematic representation of map entity clipping in a geometric map according to an embodiment.

After iteratively clipping all the other entities from the background, the corridor polygon may be obtained. A suitable clipping algorithms may be configured to accommodate relatively complex polygons with holes, for example, the Vatti clipping algorithm. An illustration of the results of a clipping algorithm are shown in FIG. 5 for a representative polygon based geometric indoor map. The background entity 500 for a portion of the map is represented by a dashed line. Foreground entities represented as polygons with fine lines, such as polygon 502 (the other are not labeled to preserve clarity), are clipped on top of background entity 500. The resulting polygon 504, represented by the heavy line, gives the shape of the corridor. The resulting corridor shape may be represented by a complex polygon. A complex polygon used herein is a polygon (without self-intersection) which has one or multiple holes inside.

As will be described below, some map entities may provide inherent position information, such as elevators, escalators, stairs that may be associated with level change scenarios or conveyors that may allow the assumption of heading or other position information. The locations of the entrances and exits to the background map entity, as well as doors or other entrances/exits to foreground entities may also be used. Still further, the direction of the entrances/exits may also be used when generating hypotheses. In a multi-level venue, the height of each level may be used with sensor information indicating changes in elevation to help determine when a level change scenario may exist.

In addition, preprocessing may include decomposing one or more shapes of the map entities into small simpler polygons to improve the computation efficiency when used by position estimator 134 and/or hypothesis analyzer 136. A trapezoid decomposition may be used to depose relatively complex polygons into more simple trapezoids, while a convex decomposition may be used to partition relatively complex polygons into more simple convex polygons. An optimal decomposition algorithms may be applied to generate a reduced number of polygons after the decomposition process. Any one or combination of decomposition methods may be employed.

Figure 6:
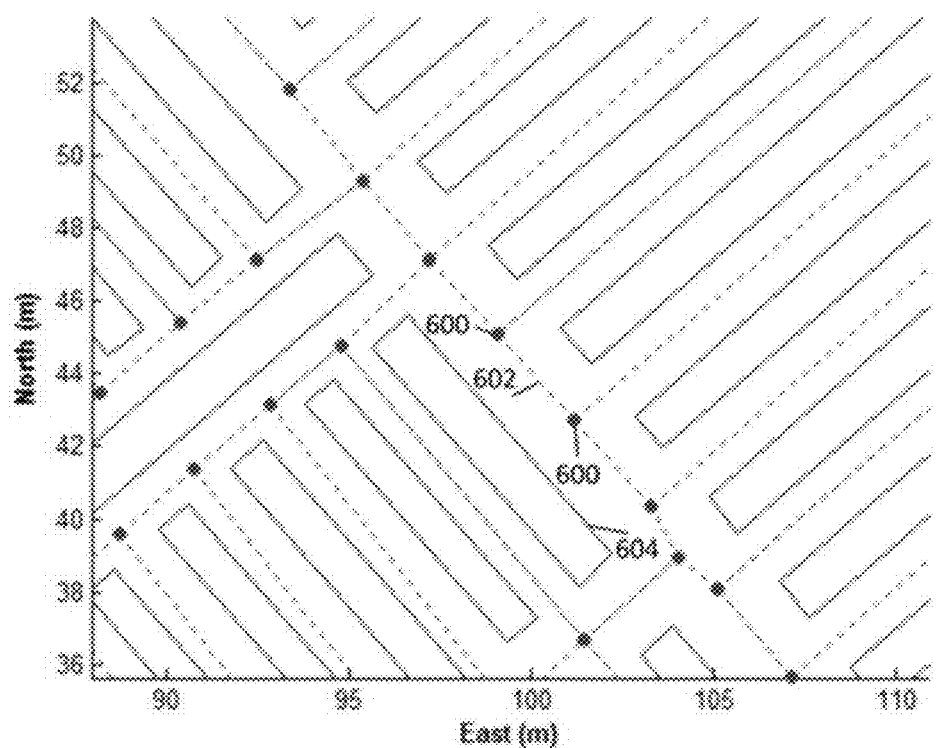
FIG. 6 is a schematic representation of grid map according to an embodiment.

Preprocessing the map information may also include transforming the traversable areas of the indoor maps with connected traces and nodes in a grid map. Connected traces and nodes may contain both the geometric and the topological information of the map. Therefore, the position estimator 134 and/or hypothesis analyzer 136 may benefit from the topological information to improve generation of the updated estimated position information. Any suitable technique may be used to generate the grid map, such as for example by using a voronoi diagram, to represent candidate paths through the venue. An example voronoi diagram is shown in FIG. 6, and includes the characteristic elements of nodes, represented by circles, such as node #196 indicated as element 600 and traces, represented by the connecting lines, such as element 602. A node is any point on the map equidistant to three or more closest objects, the map entities indicated by solid polygons, such as element 604. In this example, the map entities shown are rectangular shelves. To illustrate these concepts, it may be seen that node #196 has three equidistant closest objects, namely the two surrounding shelves and the wall. Similarly, node #100 has four equidistant objects, the four surrounding shelves. Correspondingly, a trace is a set of points (i.e., a line) which is equidistant to only two closest objects. The straight line connecting node #196 and node # 170 is an example of a trace, as each point of the line has only two closest objects. Thus, the grid map shown in FIG. 6 is characteristic of a retail venue with regularly spaced rectangular shelves, with the nodes and tracks representing candidate paths that a user could take around the map entities. Depending on the configuration of the retail venue, the nodes and traces developed from the voronoi diagram may not account for all possible routes, such as routes around objects which are located at the perimeter of open spaces in the retail venue. Additional operations may be performed to complete the possible routes by adding supplemental nodes and traces. The supplemental nodes and traces complete candidate paths around map entities. As with the polygon based geometric maps, the grid map can be preprocessed offline by external processing resources and saved in a map file for subsequent use by position estimator 134 and/or hypothesis analyzer 136 without the need for preprocessing each time updated estimated position information is determined.

Figure 29:
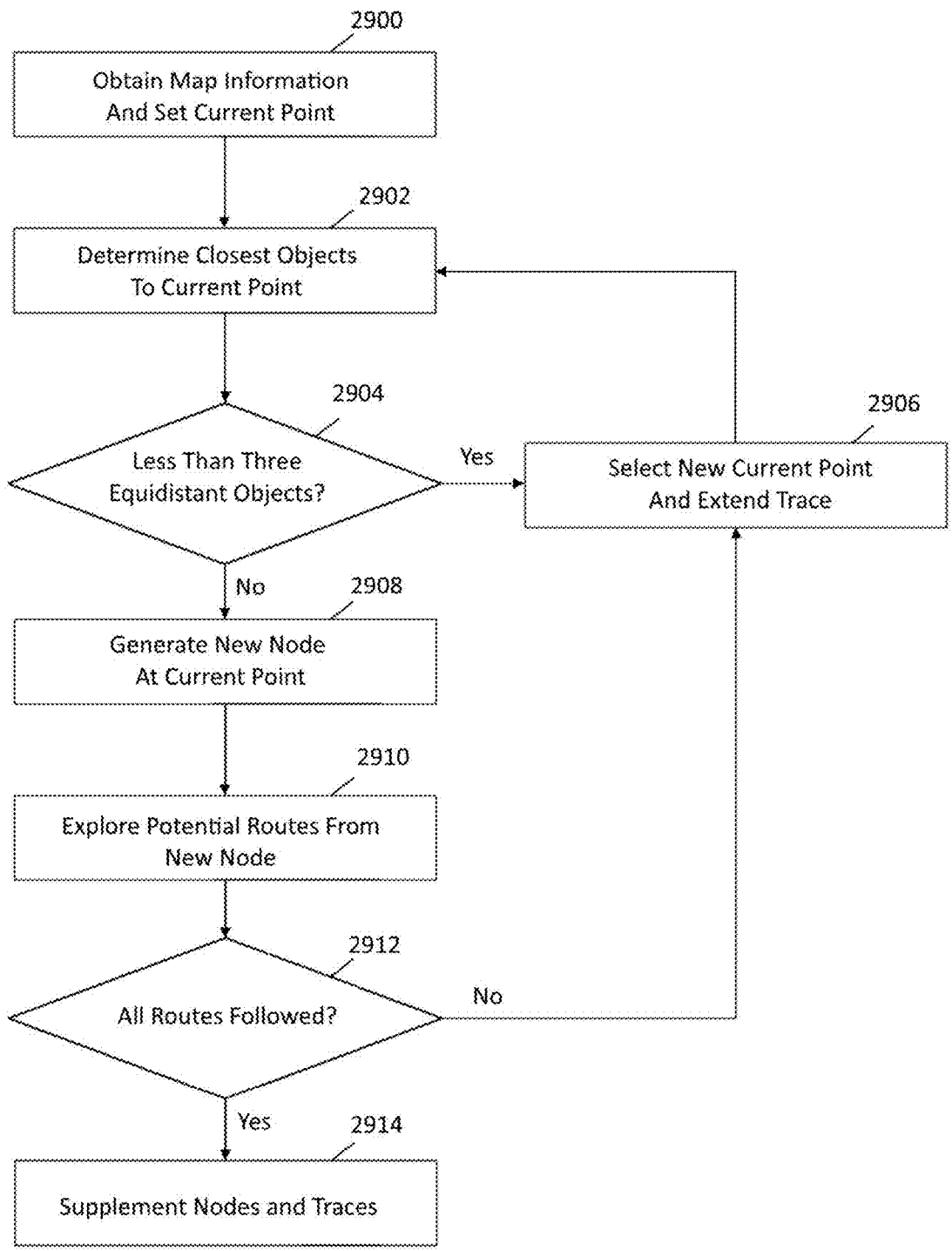
FIG. 29 is a schematic representation of routine for generating a grid map according to an embodiment.

One suitable routine for generating a grid map for use in ordering anchor points is represented by the flowchart shown in FIG. 29. Beginning with 2900, map information for a venue, such as a retail store, may be obtained, with map entities represented by polygons as discussed above. An initial starting position may be selected to as the current point for generation of the voronoi diagram. In 2902, the closest objects to the current point are determined. The routine branches in 2904, depending on the number of closest objects. If less than three closest objects are equidistant, a new current point is selected and a trace is created or continued to the new current point in 2906. The routine then returns to 2902 to determine the closest objects with respect to the new current point. If three or more closest objects are equidistant in 2904, the current point is designated a node in 2908. Next, possible routes starting from the new node are explored in 2910. A determination is made in 2912 if a new route may be started. If so, the routine returns to 2906 and a trace is formed to a new current point along the new route. If it is determined in 2912 that all possible routes have been explored, the routine continues to 2914 to determine whether any supplemental nodes and/or traces are required to complete routes around any of the map entities as described above. The complete set of nodes and traces than may be used to define candidate paths that the user could have traversed through the venue.

In one aspect, a grid map may enhance the geometric aspects of map matching as well as providing topological aspects. The topological information from the indoor map may be also applied to improve the reliability and the accuracy of the map matching algorithm. For example, a retail store map may be readily divided into structured areas and non-structured areas. Non-structured areas, such as open space, isolated booths and the like, may benefit from geometric based map matching algorithms techniques as described above. However, structured areas, such as aligned shelves, booths and similar features may be abstracted as connected links and nodes to be used in a grid based map. Further, when a grid map is available, position estimator 134 may be simplified to accumulate travelled distance along the map links rather than to estimate absolute position. Similarly, hypothesis analyzer 136 may also be simplified to operate based on map links.

Both the polygon based geometric map and grid map can be applied to improve the reliability and the accuracy of the updated estimated position information. For example, a retail store map can be readily divided into structured areas and non-structured areas. At those non-structured areas such as open spaces, isolated booths and the like, geometric based techniques described above may be applied. Alternatively or in addition, at structured areas such as aligned shelves or booths, the geometric and topological information may be represented by a grid map. When a grid map is available, a weighted topological algorithm based on the correlation between the trajectory of the user and the topological features may be applied to improve the map matching performance. A number of conditional tests may be applied to eliminate segments that do not fulfill some pre-defined thresholds, which may be obtained from statistical analysis of field test data. When ambiguities exist, new hypothesis may be created to take the user motion uncertainty into consideration. The user motion uncertainty may include accumulated step length uncertainty and/or user heading uncertainty. Therefore, multiple hypotheses may be running in parallel for certain period of time, with unlikely hypotheses removed upon being assigned low weightings. As noted above, the anchor point information may also be used to remove unlikely hypotheses.

Accordingly, map handler 138 may function to load previously stored, preprocessed map information, which may include clipped and decomposed map information together with the original map information as described above. Map handler 138 may access map information that is already formatted in a manner to facilitate the generation of position hypotheses for portable device 100 and may retrieve the information as needed. From the preprocessed map information, map handler 138 initializes the internal map data structure, which may include the map projection parameters, geometric shapes, identifications (IDs) and type information of all the entities in the map. The projection parameters, for example the six-parameter affine transformation, can be used to transform between the coordinates in the map and in the latitude and longitude. The entity types describe the functions of the particular entities such as background, unit, escalator, elevator, stairs and etc. Both the shape and type information may be used by hypothesis analyzer 136. Map handler 138 may also organize the map geometric information in a spatial database so that an efficient search algorithm may be applied to query a point of interest or range of interest in the map. For example, an R-tree structure may be used for efficient and fast search of map entities. As will be appreciated, an R-tree search algorithm may locate a given point in the map and return a pointer to the corresponding map entity.

Although described in the context of being performed by external processing resources, any or all of the functions associated with preprocessing map information may be performed by map handler 138 as desired.

Outputs from both position estimator 134 and map handler 138 may be fed into hypothesis analyzer 136. Notably, position estimator 134 may provide estimated position information in the form of position and variance estimates used to define an error region. Hypothesis analyzer 136 superimposes or projects the error region on the processed map to identify the possible entities in which the user is travelling. Hypothesis analyzer 136 maintains, creates, eliminates and combines the hypotheses based on any suitable decision making logics, including those described below. Hypothesis analyzer 136 may also assign weights for all currently available hypotheses based on topological and empirical information. Those weights can be used to combine or eliminate hypotheses as well as to combine the hypotheses, such as by generating a weighted average to update the estimated position.

As indicated by FIG. 3, output from anchor point manager 142 may also be fed to hypotheses analyzer 136 for use in generating, deleting and otherwise managing hypotheses. Anchor point manager 142 may identify one or more objects, structural features or other map entities, such as a point of sale, that have a known, fixed location and may be associated with one or more navigation solutions provided by navigation module 120. When relative timing information is available for a plurality of anchor points, they may be considered to be ordered and hypotheses analyzer 136 may constrain hypothesis to those that satisfy the order. When relative timing information is not available, it may be assumed that the user was at the anchor point location, so hypotheses may be validated based upon whether they produce a trajectory incorporating the anchor point. A collection of anchor points without timing information may be considered unordered. For anchor points in which some have timing information and other do not, or when there are timing errors, they may be considered imperfectly ordered. Hypotheses analyzer 136 may use all of these types of anchor points as provided by anchor point manger 142 to different degrees. For example, ordered anchor points may be used to create one or more hypotheses. Additionally, any type of anchor point may be used to prune or assess already generated hypotheses. Hypothesis analyzer 136 may use the position of the anchor point and a predefined uncertainty circle as decision criteria to delete all hypotheses outside the uncertainty circle. In addition, a hypothesis may be corrected with an updated position for hypotheses that may be within the uncertainty circle, but separated by a structure such as a room or corridor. Furthermore, since the anchor point information can be used to efficiently remove the unlikely hypotheses, more hypotheses may be created to accommodate various user motion uncertainties to improve the successful rate of map matching. In certain cases, the ordering of anchor points may contains errors. Therefore, hypothesis analyzer 136 may be configured to identify any outliers and isolate them as incorrectly ordered anchor points. For example, if large discrepancy exists, a trial and error based searching mechanism may be used to reorder the anchor points in a more reasonable way. If ambiguities of the ordering cannot be resolved, they may be excluded from the hypothesis analysis so that they do not have negative impact on the final solution.

The techniques of this disclosure include the use of navigation solutions that were derived over a period of time to subsequently enhance at least one of the navigation solutions. Accordingly, for a given sensor epoch, hypothesis analyzer 136 may have information available from future as well as previous epochs. As will be appreciated, a number of benefits may flow from this feature. Hypotheses analyzer 136 may maintain a history of any or all of the hypotheses history, including generating, trimming or deleting hypotheses allowing management of the hypotheses to be propagated forwards as well as backwards to improve accuracy. Similarly, hypothesis analyzer 136 has access to future navigation solutions, so that management of hypotheses for a given epoch can benefit from future as well as past information. For example, different management strategies may be used for straight-line as opposed to turning segments, but accurate detection of those segments may be significantly improved when considering a trajectory as a whole. Further, since there is no need to provide a "current" navigation solution, no buffer and4 delay mechanism is required. As another example, information over the entire period may be used to adjust step length scale factors based on the various scenario that may be detected for the trajectory. Additionally, hypotheses analyzer 136 may assign weight to hypotheses based on the similarities of the trajectory shapes between the navigation solutions and the enhanced navigation solutions provided through offline map matching.

In one aspect, hypotheses analyzer 136 may use both forward and backward processed data to improve the performance of the system as noted. This may be especially helpful for a long trajectory when the positioning information toward the end of the trajectory is available, such as from an anchor point like a checkout point or store exit. A backward processed enhanced navigation solution may significantly reduce the accumulated error that may otherwise occur. Furthermore, more reliable misalignment estimates may be obtained.

In some embodiments, derivation of the navigation solutions, such as by navigation module 120, may include forward processing of sensor data first to generate a forward navigation solution. An optional pre-run of the sensor data may be applied to obtain sensor bias estimates. Furthermore, the pre-run may also be used to obtain the piecewise misalignment estimates which can be further smoothed and applied in forward and/or backward processes later. As such, the pre-run may improve the overall performance of the forward and backward sensor navigation solution especially during period(s) of fidgeting. Backward processing may use the inverted sensor data as the input and the forward exit point as the initial starting point, enabling the same positioning engine to be applied as in forward processing. Removing any identified initial fidgeting period(s) at the beginning or the end may improve the reliability of the alignment process.

The forward and backward sensor navigation solutions may be used to improve the performance map matching solution in any suitable manner. For example, the offline map matching routine may first process the forward and backward sensor navigation solution respectively. The final map matched navigation solution may be generated using both the forward and backward map matched solutions. During a solution merging process, the overlapping map link history of hypothesis trees from the forward and backward map match processes may be identified first. The common map links in both forward and backward solutions may then be added to the candidate list. Correspondingly, each candidate in the candidate list may be used as a starting point to iterate hypothesis trees. The best candidate branches for the forward and backward respectively may be merged together to provide the final navigation solution. It is noted that a common map link can be either a link on which an anchor point resides or a normal link in the trajectory history.

The forward and backward sensor solutions may also be combined and smoothed first, such as for example using a two filter smoother or a multiple pass smoother. Moreover, a Rauch-Tung-Striebel (RTS) smoother or any other suitable smoothing filter or any backward smoothing technique may be employed. In some embodiments, the offline map matching routines of this disclosure may use the smoothed sensor navigation solution as the input to perform map matching. Alternatively, a simplified smoothing technique using the weighted average of step length estimates from the forward and backward sensor navigation solutions may be used. Since map matching mainly uses the relative positioning information, weighted step length estimates not only reduce the computation load, they also provide significant benefits during smoothing processes. Alternatively, a simplified combining technique for forward and backward using the weighted average of the relative position changes from the forward and backward sensor navigation solutions may be used.

In one aspect, an initial enhanced navigation solution may represent a position gap with respect to navigation solutions from adjacent epochs. Any gaps may be smoothed using suitable techniques, such as by recalculating a determined trajectory. For example, the recalculation may employ an estimated user step-length scale factor. The step length scale factor may updated from segment to segment so that after smoothing, no unreasonable position jumps exist in the map matched enhanced navigation solution(s). While smoothing may not necessarily improve the overall accuracy or success rate, it nevertheless may provide a more useful presentation of the position information.

Hypothesis analyzer 136 as noted maintains, creates, deletes and combines hypotheses. A hypothesis refers to a possible location of user with any desired corresponding attributes, such as position, velocity, heading, motion mode, position variance, occupied map entity and the like. The decision making logic applied to the various hypotheses may be selected based on the user operational scenarios as indicated in the following examples.

Many implementations of a decision making logic for hypothesis management employ the concept of an error region. As will be appreciated, the error region represents an uncertainty of the possible position(s) of portable device 100 determined by position estimator 134. As desired, an error region may define a rectangle, a circle, an ellipse, an arbitrary polygon or any other shape. If the Kalman filter is used with position estimator 134, an "error ellipse" may be used. The parameters of an error ellipse include the semi-major axis length (a) and semi-minor axis length (b), and orientation (a) may be derived from the covariance matrix of the Kalman filter and the predefined confidence level. For example, a 95% confidence level may be used to reasonably cover the position uncertainty, although other values may be employed depending on the desired performance characteristics. Correspondingly, the error ellipse parameters may be given by Equation (1):

$$a = \sqrt{5.991\lambda_1}$$
$$b = \sqrt{5.991\lambda_2}$$
$$\alpha = \tan^{-1}\frac{v_1(y)}{v_1(x)}$$
(1)

where $\lambda_1$ and $\lambda_2$ represent the eigenvalues of the covariance matrix and $v_1$ represents the eigenvector of the covariance matrix with the largest eigenvalue. In order to reduce the computation load, the error ellipse may be approximated by a polygon with several vertices, such as 32 vertices, evenly distributed around the edge of the ellipse.

Figure 7:
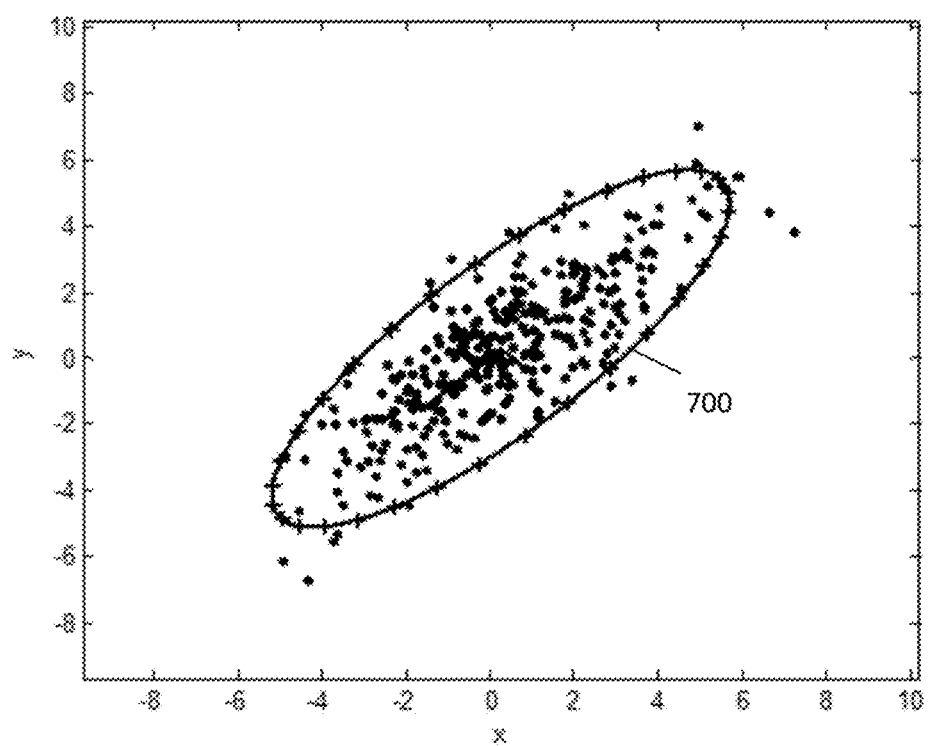
FIG. 7 is a schematic representation of an error ellipse for use in generating hypotheses according to an embodiment.

If the particle filter is used, the samples of the position estimates approximate the error region. However, the error ellipse or other region is still required in hypothesis analyzer 136 to combine and eliminate hypotheses. Therefore, the covariance matrix may be derived from the position sample data. Then the parameters of the error ellipse may be calculated as in the Kalman filter mode. To illustrate, FIG. 7 shows an example of an error ellipse derived from a particle filter using 95% confidence level. The "+" symbols indicate the vertices of the approximated error ellipse 700.

Figure 8:
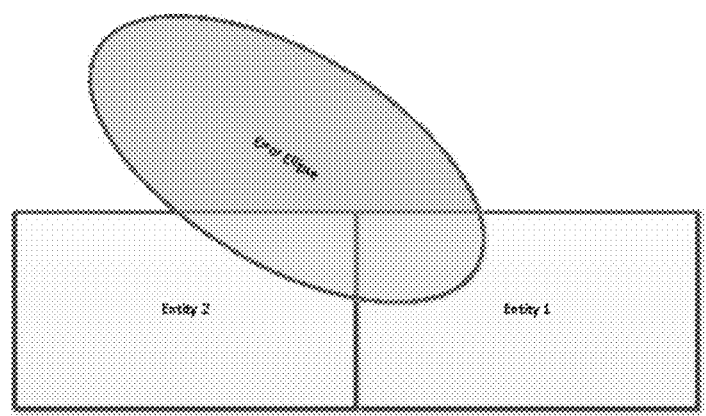
FIG. 8 is a schematic representation of an error ellipse projected onto map entities according to an embodiment.

In reference to the context of an error region, various decision making logic approaches may be applied for managing the hypotheses. A first example corresponds to a scenario with a wall crossing event. Each hypothesis may have its own occupation field to indicate the current map entity associated with portable device 100. As shown in FIG. 8, position estimator 134 uses the error region superimposed on the map layout to obtain the candidate hypotheses. If no overlapping area between the error region and map entities other than the currently occupied entity is detected, hypothesis analyzer 136 need not perform any further operations. However, when the error region intersects with multiple map entities, the attributes of the intersected entities are inserted into an intersection table. The overlapping detection can be fulfilled by iteratively checking the location of vertices from the approximate polygon for the error ellipse. The spatial search algorithm, for example, an R-tree search and point-in-polygon algorithms, may be applied to find the map entity for each vertex of the error ellipse. If all the vertices are on the same map entity as the current hypothesis's occupation, no overlapping is declared. Otherwise, a new hypothesis candidate will be added to the intersection list. It is noted that each hypothesis maintains its own intersection list. The current hypothesis may be called the parent hypothesis whereas all the candidate hypotheses may be called children hypotheses.

If the intersection area is over a suitable threshold, such as approximately 10% of the total area of the error ellipse, the new hypothesis candidate may be subjected to further analysis, otherwise it will be removed from the intersection list. Hypothesis analyzer 136 may then analyze all the candidates in the intersection list different than the occupation of the current hypothesis. The initial position of the new candidate hypothesis is given by the current position estimate from position estimator 134. However, if this point is not in the range of the overlapping polygon, the centroidal moments of the overlapping polygon may be used as the initial position of new hypothesis instead.

Figure 9:
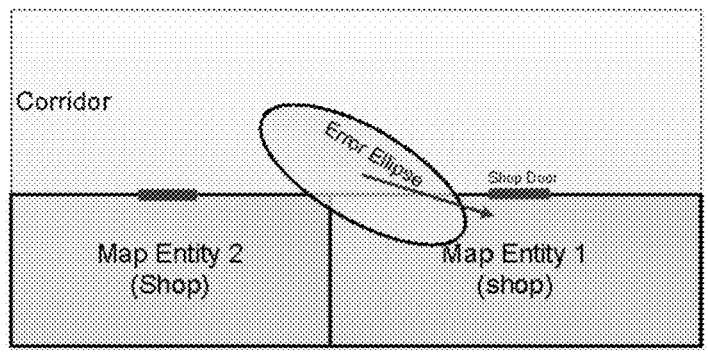
FIG. 9 is a schematic representation of an error ellipse in a corridor scenario with door information according to an embodiment.

Subsequently, a wall crossing detection may be performed. The logics of the wall crossing event are based on whether the room door information is available. If door information is available, the algorithm may evaluate the distance between the candidate hypothesis's initial position and the door's position as schematically indicated in FIG. 9. If the distance is within a predefined threshold, such as 2 meters, a wall crossing event may be declared. The center position of the room door may then be used as the initial position of the new candidate hypothesis. Next, a validation check may be performed to determine whether the initial point of the new hypothesis is within the range of other current available hypotheses. Subsequent operations may be adjusted depending on the particular implementation. When using a particle filter, for example, a new hypothesis may be created with all the particles residing in the new map entity and added to the hypothesis list. All other attributes, except the position of the newly created hypothesis, may be inherited from the parent hypothesis. When using a Kalman filter, for example, no new hypothesis creation and/or eliminate are performed and the position and occupation fields of the parent hypothesis may be updated.

Figure 10:
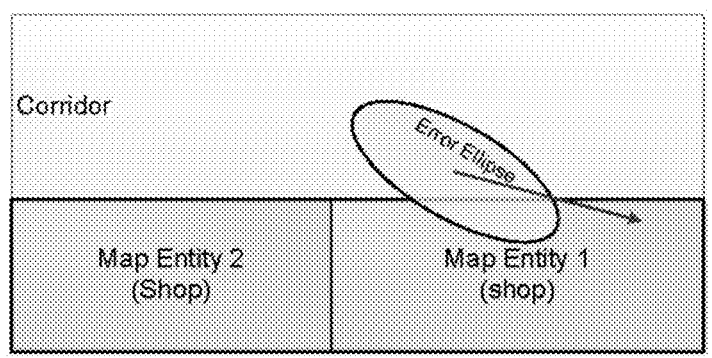
FIG. 10 is a schematic representation of an error ellipse in a corridor scenario without door information according to an embodiment.

If the room door information is not available, the angle between the intersection edge of the error ellipse and the map entity of the interest, and the user's heading may indicate the possibility the user may enter into the new entity as schematically indicated in FIG. 10. If the heading of the current hypothesis is nearly parallel to the edge of the room, this intersection may result from a skewed navigation solution. In this case, if the overlapping area is above a suitable value, such as approximately 45%, a new hypothesis with an offset of a predefined amount, such as approximately 0.5 meter, from the intersection point is created and the parent hypothesis is deleted. On the other hand, if the overlapping area is below the predefined amount (and optionally if the yaw dynamics of the user are small), the orientation of the intersection edge may be used to update the heading of the parent hypothesis. If the heading of the current hypothesis is approximately perpendicular to the edge of the wall, a possible wall-crossing event is declared. Correspondingly, a similar process as when room door information is available may be performed.

Hypothesis analyzer 136 also checks the transition of the occupations of hypotheses. It is assumed that a user can freely enter and exit a corridor. However, between-unit crossing is prohibited or assigned with minimum weight to reflect the fact that it is uncommon to have doors between shops. In addition, hypothesis analyzer 136 may also assign the weights of hypotheses based on this transition model or empirical model.

Another exemplary decision logic for managing hypotheses may be applied when a level change event may be associated with one or more sensor epochs. If a user was/is going up or down stairs, taking an elevator or escalator, navigation module 120 and/or hypothesis analyzer 136 may perform a routine to detect a corresponding motion mode and/or context indicator to identify the current user motion mode/context (such as elevator, stairs, walking, walking on escalator, or standing on escalator). When a level change event was/is detected, hypothesis analyzer 136 may use a navigation solution corresponding to the sensor epoch to search for map entities in the map information, such as stairs, elevator or escalator entrances, that are sufficiently nearby according to the detected mode. For example, if an elevator mode was/is detected from the navigation solution, hypothesis analyzer 136 may search for a nearby elevator entrance on the map. If the entrance is within certain distance from the current user position, hypothesis analyzer 136 may transition from a normal state to a level change state to apply a corresponding decision logic. The distance threshold may be 10 m as a non-limiting example. Further, the selected value can be tuned according to the accuracy of the navigation solution.

In conjunction with detection of a level change event, hypothesis analyzer 136 may transition from a normal state to a level change state to adjust its operation. If desired, a validation process may be performed to avoid a level change false alarm. During the process, hypothesis analyzer 136 may propagate the user position initially using techniques similar to the normal state. The validation process may use a height difference between a given epoch and the epoch when entering the level change state as the metric to verify change in state. If within a certain time, detection of a height difference above a threshold, such as 2.0 m as a non-limiting example, the transition to level change state may be validated. Otherwise, the detection may be treated as a false alarm, resulting in a return to the normal state.

Given successful validation of the level change, hypothesis analyzer 136 may eliminate all hypotheses and create a new hypothesis using the identified level change entrance information. The initial position of the hypothesis and/or heading may be established by the entrance position of the corresponding map entity. Map information corresponding to the new level may then be used, such that the new level is identified by as above or below the previous level according to the sign of the height difference. Subsequently, the state of hypothesis analyzer 136 may transition to a finalizing state. If the validation process failed, the state goes back to the normal state.

Figure 11:
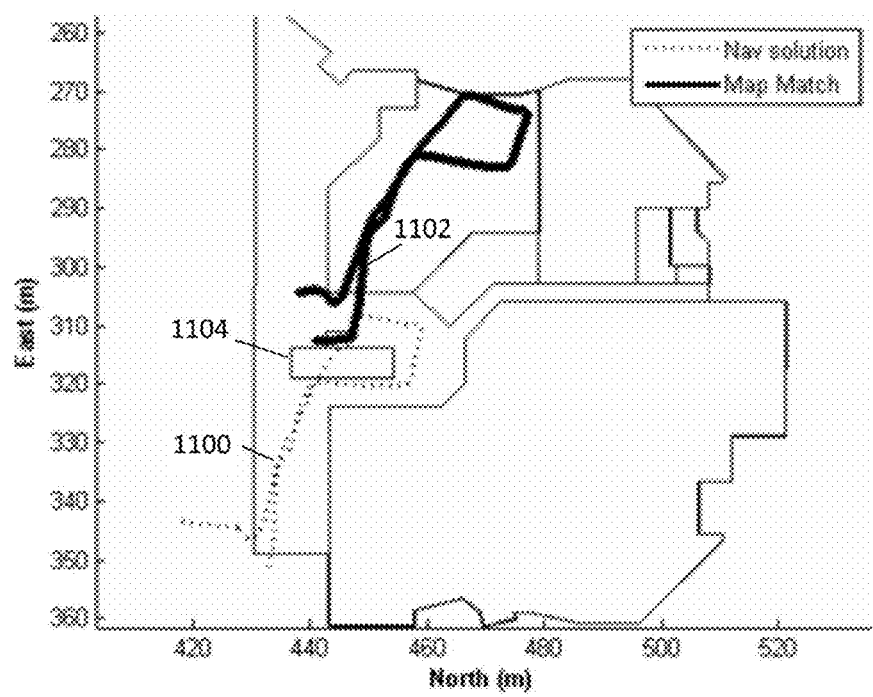
FIG. 11 is a schematic representation comparing navigation solutions in a level change scenario according to an embodiment.

In the finalizing state, hypothesis analyzer 136 may consider whether navigation module 120 detected a motion mode for the associated navigation solution, or whether hypothesis analyzer detected a motion mode. If a walking status was/is detected, hypothesis analyzer 136 may reset the position of the corresponding hypothesis to the exit position of the level change entity and revert to normal state as schematically depicted in FIG. 11. Hypothesis 1100 may correspond to the position estimate provided by the navigation solution, while hypothesis 1102 may reflect the updated position estimate based on the assumption of exiting elevator 1104. Otherwise, hypothesis analyzer 136 may continue propagating the user position. It is noted that the algorithm does not reset the heading of the hypothesis according to the level change entity layout after exiting it. This is because the user heading may already have changed due to the detection delay of the motion mode if relying on a determination from navigation module 120. As shown in FIG. 11, the door of the elevator is on the right side (0°), however, the user heading is around −90° after exiting the elevator.

In addition to the motion modes and/or context awareness scenarios discussed earlier (such as when a user goes up or down stairs, takes elevators or escalators), some other motion modes and/or contexts such as walking or standing on a conveyor (moving walkway), walking near an wireless beacon or other wireless radio frequency (RF) tags and the like may be used to adjust operation of hypothesis analyzer 136. When the system autonomously detects such motion modes or context awareness scenarios, the map information techniques presented herein can relate those to map entities. Benefits of this implementation include: (i) hypothesis analyzer 136 may detect a motion mode/context that relates to a map entity and may enhance the navigation solution (particularly position and optionally heading) to the location of the map entity; (ii) hypothesis analyzer 136 may receive a map entity that implies a motion mode and/or context, which may be used to aid recognition of sensor data patterns associated with the implied motion mode.

For example, when it is determined a user was/is walking/standing on a conveyor, hypothesis analyzer 136 may search for a nearby conveyor in the map information. When a nearby conveyor is found, a new hypothesis may be created with the entrance of the conveyor as the initial position and the orientation of the conveyor as the initial heading, eliminating all the other hypotheses. A similar process to that applied regarding a level change event when a user steps out of the conveyor. This context based 2D position adjustment may reduce the accumulated error from PDR and thus improves the enhanced navigation solution of the offline map matching. On the other hand, when a hypothesis's error region is on top of a particular map entity such as a conveyor, an elevator or an escalator, hypothesis analyzer 136 may base detection of the corresponding motion mode on this information to increase the sensitivity of the particular detection and improve the success rate.

A similar process may be applied to a walking/driving motion mode detection scenario when a user is identified on a parking lot. For example, if the hypothesized position is on top of a parking lot, this information can be fed to the navigation system to improve the sensitivity of the driving/walking detection module.

Another exemplary scenario involves updates from a wireless beacon or RF tags. If the entrance of a shop or information desk is equipped with wireless beacon or RF tags, the portable device may receive the information from these wireless tags when it is sufficiently close. In this case, the position of the shop entrance or information desk can be used to update the position of the hypotheses.

Figure 12:
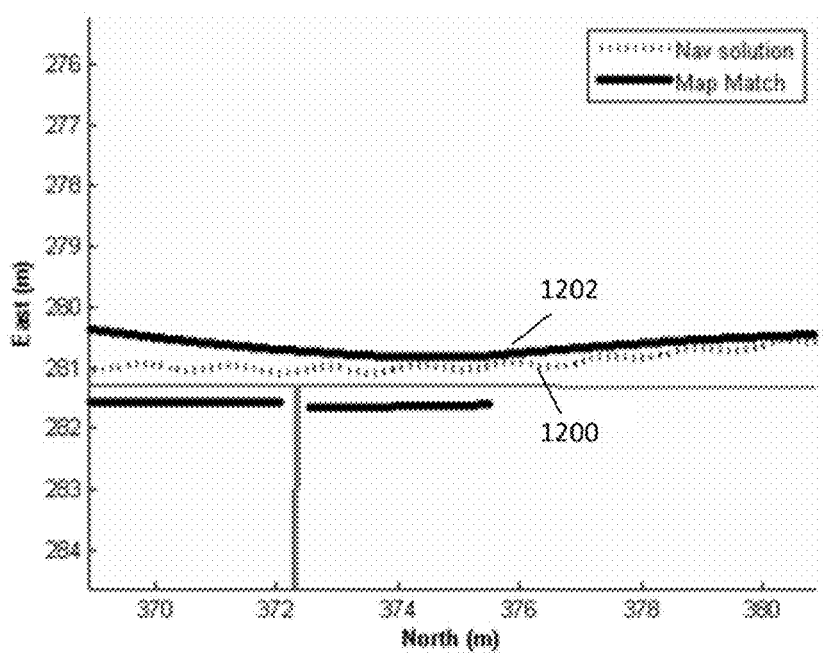
FIG. 12 is a schematic representation comparing navigation solutions following heading oscillation removal according to an embodiment.

The input heading from the navigation solution provided by navigation module 120 may be expected to be the platform heading, and may be derived from the difference between the device heading and an estimated misalignment angle. As noted above, this derived platform heading from the navigation solution may exhibit a periodic heading oscillation, depending on the use case of portable device. When navigation solutions are processed subsequently according to the techniques of this disclosure, a zero-phase low pass filter may be utilized to remove or reduce the effect of the oscillations without introducing unwanted delay into the signals. An exemplary result of removing heading oscillation is schematically illustrated in FIG. 12, with the results of the navigation solution alone indicated by trace 1200 and the enhanced navigation solution following low pass filtering indicted by trace 1202.

As desired, hypotheses generated for one or more sensor epochs may be stored, for example by storing generated multiple hypotheses comprises relating hypotheses to each other. The stored generated multiple hypotheses based at least in part on the relations. For example, to manage the hypotheses in a flexible way, a tree based hypothesis creation, trimming, merging and deleting method may be applied. Each hypothesis may preserve all the history during the first period of sensor epochs. The history may include the positioning information, the hypothesis statistics information and the hypothesis management information. Any or all the may be used to weight the hypothesis. The proposed architecture may also reduce the memory usage of the hypothesis data structure. Since all the history information may be preserved in the hypothesis data structure, a large number of hypotheses is large may represent significant storage requirements. A tree-based architecture may share commonalities of history information and present memory usage efficiencies. As noted, a hypothesis weighting scheme may be used with the tree based architecture. With the ability to trace the parent and children hypotheses, the weighting may be calculated information at the current epoch as well as previous and future information. This may improve the accuracy and reliability of the weighting scheme. A tree-based hypothesis management system may enable manipulating hypotheses in a more flexible way, and may be of particular use for map matching with the anchor points of interest that may be associated with navigation solutions separated from the current epoch. A new hypothesis may be readily created using the anchor points' information with all the history preserved. In one suitable implementation of a tree-based hypothesis data structure, each hypothesis may employ a unique ID, a pointer to its parent hypothesis, and a pointer array to children hypothesis. The root hypothesis may have no parent pointer and the end hypothesis may have no children hypothesis pointers.

At the end of the map matching process, a hypothesis trimming mechanism may be applied to eliminate any unreasonable hypotheses, based on any suitable criteria. For example, the positions of the final hypotheses may be expected to be within a certain range of exit points. Hypotheses which are beyond a given threshold from an exit point may be trimmed, along with any parent branches. Further, when anchor points are available, hypothesis branches that do not pass those anchor points may be removed from the hypothesis tree. Still further, similarity between the sensor based navigation solutions and the enhanced navigation solutions provided by the offline map matching may be also used as a criterion to remove unlikely hypothesis branches.

Due to the uncertainty of the sensor navigation solution, the enhanced navigation solutions may have many routes which pass any identified anchor points. The offline map matching routine may identify an appropriate solution or solutions from any candidates. The final solution may be selected using any combination of criteria, including: 1) the shape of the enhanced navigation solutions trajectory may resemble trajectory of the navigation solutions, such as provided by navigation module 120; and/or 2) the enhanced navigation solutions may pass all anchor points in the correct order. As will be appreciated, a longer trajectory may result in a greater number of possible routes. In order to compensate for exponentially increasing possibilities of routes that may undesirably consume processing and memory resources, a Fast Hypothesis Search algorithm may be applied to optimize the search strategy by properly caching useful search information, and therefore may be able to search for optimized solutions with reduced resource consumption.

As noted above, position estimator 134 may utilize the navigation solutions and the results from hypothesis analyzer 136 to generate the improved positioning estimates aided by map information. Hypothesis analyzer 136 uses these position estimates to create, eliminate or combine hypotheses for another epoch.

Although described primarily in the context of geometric map information, the above techniques may be used, alternatively or in addition, with map information represented as a grid map. For example, the user position may be projected into the connected links and nodes by using the position-to-curve or curve-to-curve matching. The two techniques may be combined to ease implementation and maintenance. The grid map may also be used to assist the hypothesis analyzer 136 to derive more reliable hypotheses by using a weighed topological algorithm based on the correlation between the trajectory of the user and the topological features of the grid map. Any suitable conditional test or tests may be applied to eliminate segments that do not fulfill pre-defined thresholds, which may be obtained from a statistical analysis of field test data. As with the geometric techniques, when ambiguities exist, multiple hypotheses may be generated to take the user motion uncertainty into consideration. For example, user motion uncertainty may be caused by accumulated step length error, user heading error and others. As such, multiple hypotheses may be running in parallel for a certain period of time. The unlikely hypotheses with low weightings may be removed. Furthermore, with the grid map, an improved hypothesis weighting scheme may be employed by analyzing the hypothesis's topological history. An improved uncertainty estimate may be calculated using the weighted average of all the hypotheses' information. Therefore, a more accurate user position uncertainty estimate may be obtained.

Various filters, motion and/or measurement models may be used to update the position of hypotheses according to the techniques of this disclosure. The four exemplary methods described below employ a prediction only Kalman filter, a near constant velocity Kalman filter, a prediction only particle filter and a near constant velocity particle filter, although other filters and/or models may be employed as desired.

As a first example employing a prediction only Kalman filter, outputs from the integrated navigation solution provided by navigation module 120 may be used to predict system states for all currently available hypotheses. Three states may be used as the system states for each hypothesis, including the position error ($\delta x$, $\delta y$) in the map coordinates and the heading error $\delta \psi$. Further, $dX_n$ represents the system states for the n-th hypothesis, the position and heading error may both be modeled as random walk as indicated by Equation (2):

$$dX_n = [\delta x\, \delta y\, \delta \psi]^T \quad (2)$$

As such, one form of the system models can be derived as shown in Equation (3):

$$\begin{bmatrix} \delta \dot{x} \\ \delta \dot{y} \\ \delta \dot{\psi} \end{bmatrix} = \begin{bmatrix} 0 & 0 & -\sin\psi \cdot L \\ 0 & 0 & \cos\psi \cdot L \\ 0 & 0 & 0 \end{bmatrix} \begin{bmatrix} \delta x \\ \delta y \\ \delta \psi \end{bmatrix} + \begin{bmatrix} \cos\psi \cdot w_L \\ \sin\psi \cdot w_L \\ w_\psi \end{bmatrix} \quad (3)$$

where,
$\psi$ is the user heading;
L is the step length, which can be obtained by calculating the displacement between two positions in adjacent epochs from the navigation solution;
$w_L$ is the driving noise of the step length; and
$w_\psi$ is the driving noise of the heading error.

It is noted that the position and step length may be calculated in the map coordinate frame. The position in latitude and longitude may be transformed into the map frame using affine transformation. The transformation matrix has six parameters, which can be obtained from the imported map data. No measurement update need be used in the prediction only method.

Thus, the propagation of the system states may be given by Equation (4):

$$\begin{bmatrix} \tilde{x}_{k+1} \\ \tilde{y}_{k+1} \\ \tilde{\psi}_{k+1} \end{bmatrix} = \begin{bmatrix} \hat{x}_k + \cos\tilde{\psi}_{k+1} \cdot L_{k+1} \\ \hat{x}_k + \sin\tilde{\psi}_{k+1} \cdot L_{k+1} \\ \hat{\psi}_k + \Delta\psi_{k+1} \end{bmatrix} \quad (4)$$

where, k and k+1 represent two consecutive epochs, the "~" represents the predicted value, and "^" represents the best estimated value, the $\Delta\psi_{k+1}$ represents the heading increment from the integrated solution in the current epoch.

As a second example employing a near constant velocity hypothesis model, outputs from navigation module 120 are used as pseudo measurements to update the system states for all the available hypotheses. The system may be modeled as a velocity random walk. The system states for the n-th hypothesis are the same as those in the prediction only model. The velocity error may be modeled as random walk, random constant or a first-order Gaussian-Markov process. An exemplary system model using velocity random walk is given by Equation (5) as follows:

$$\begin{bmatrix} \delta \dot{x} \\ \delta \dot{y} \\ \delta \ddot{x} \\ \delta \ddot{y} \end{bmatrix} = \begin{bmatrix} 0 & 0 & 1 & 0 \\ 0 & 0 & 0 & 1 \\ 0 & 0 & 0 & 0 \\ 0 & 0 & 0 & 0 \end{bmatrix} \begin{bmatrix} \delta x \\ \delta y \\ \delta \dot{x} \\ \delta \dot{y} \end{bmatrix} + \begin{bmatrix} 0 \\ 0 \\ w_{vx} \\ w_{vy} \end{bmatrix} \quad (5)$$

where,
$\delta \dot{x}$ is the velocity error in the x-direction in the map coordinates;

δẏ is the velocity error in the y-direction in the map coordinates;

$w_{vx}$ is the driving noise for the x-axis velocity error;

$w_{vy}$ is the driving noise for the y-axis velocity error.

Correspondingly, the propagation of the system may be given by Equation (6):

$$\begin{bmatrix} \tilde{x}_{k+1} \\ \tilde{y}_{k+1} \\ \tilde{\dot{x}}_{k+1} \\ \tilde{\dot{y}}_{k+1} \end{bmatrix} = \begin{bmatrix} \hat{x}_k + \hat{\dot{x}}_k \\ \hat{y}_k + \hat{\dot{y}}_k \\ \hat{\dot{x}}_k \\ \hat{\dot{y}}_k \end{bmatrix} \quad (6)$$

As will be appreciated, the predicted position may be obtained by the best estimated velocity from the last epoch, and the predicted velocity may be constant from the previous epoch, i.e. a "constant velocity" model.

Since the position from navigation module 120 may be used as the measurement update, the measurement model may be expressed as Equation (7):

$$\delta Z = \begin{bmatrix} \tilde{x} - x_{TPN} \\ \tilde{y} - y_{TPN} \end{bmatrix} = \begin{bmatrix} 1 & 0 & 0 & 0 \\ 0 & 1 & 0 & 0 \end{bmatrix} \begin{bmatrix} \delta x \\ \delta y \\ \delta \dot{x} \\ \delta \dot{y} \end{bmatrix} + \begin{bmatrix} v_x \\ v_y \end{bmatrix} \quad (7)$$

where,

δZ is the measurement misclosure;

x̃ and ỹ are the propagated position;

$x_{TPN}$ and $y_{TPN}$ are the projected position updates from the navigation solution; and $v_x$ and $v_y$ are the measurement noise.

It is noted that the measurement noise may be adaptively tuned based on the position accuracy and the user's dynamics from the navigation solution. For example, when a user is walking in a straight line (small yaw dynamics), the measurement noise can be tuned higher so that the system relies more on the prediction and when turning, the measurement noise may be tuned lower to place more weight on the measurement.

A third example employing a prediction only particle filter may use a set of sample states or particles $\{x_t^{[r]}\}$ to approximate the posterior density functions (pdfs) of the states of interest. Here, each $x_t^{[i]}$ is a concrete state sample for index i ranging from 1 to M, the size of the particle filter. Thus example may be used for non-Gaussian, multi-model pdfs. Its multi-hypothesis nature makes it also suitable for indoor navigation with map aiding. Similar to the Kalman filters, a particle filter also has prediction and update states. The prediction only particle filter need only employ a prediction state.

The state of the prediction only particle filter may be the position and heading of the user. During an initialization process, the M random samples are drawn according to the navigation solution's position and variance. The prediction is performed by the system model as indicated by Equation (8):

$$\begin{bmatrix} x_{k+1}^i \\ y_{k+1}^i \\ \psi_{k+1}^i \end{bmatrix} = \begin{bmatrix} x_k^i \\ y_k^i \\ \psi_k^i \end{bmatrix} + \begin{bmatrix} L_{k+1}\cos\psi_k^i \\ L_{k+1}\sin\psi_k^i \\ \Delta\psi_{k+1} \end{bmatrix} + \begin{bmatrix} v_L^i\cos\psi_k^i \\ v_L^i\sin\psi_k^i \\ v_\psi^i \end{bmatrix} \quad (8)$$

where $v_L$ is the driving noise of step length, which can be modeled as Gaussian noise with the variance of $\sigma_L^2$; and $v_\psi$ is the driving noise of the user heading, which can be also modeled as Gaussian noise with the variance of $\sigma_L^2$.

It is noted that when new hypothesis is created by hypothesis analyzer 136, new samples will be added to the current sample set according to the uncertainty of the created new hypothesis. Similarly, when a particular hypothesis is eliminated, its corresponding samples may be removed from the sample set.

A fourth example employing a near constant velocity particle filter may use a similar concept as the near constant velocity multi-hypothesis Kalman filter, with system states corresponding to the user position and velocity. An exemplary system model is given by Equation (9):

$$\begin{bmatrix} x_{k+1}^i \\ y_{k+1}^i \\ \dot{x}_{k+1}^i \\ \dot{y}_{k+1}^i \end{bmatrix} = \begin{bmatrix} x_k^i \\ y_k^i \\ \dot{x}_k^i \\ \dot{y}_k^i \end{bmatrix} + \begin{bmatrix} \dot{x}_{k+1}^i \\ \dot{y}_{k+1}^i \\ 0 \\ 0 \end{bmatrix} + \begin{bmatrix} 0 \\ 0 \\ w_x^i \\ w_y^i \end{bmatrix} \quad (9)$$

where the driving noise of the velocity can be modeled as Gaussian noise with the variance of $\sigma_v^2$. The measurement equation may be the same as that for the near constant velocity multi-hypothesis Kalman filter.

In one aspect, the positioning accuracy of the enhanced navigation solution provided by the offline map matching techniques of this disclosure may be expressed as a user position uncertainty, such as by an error ellipse. A variety of factors may be used to determine the uncertainty, including user motion uncertainty from the navigation solutions, the number of the hypotheses created for the epoch of the enhanced navigation solutions, the status of the hypothesis at that epoch, relative proximity of anchor points, map entities corresponding to the enhanced navigation solution or others. For example, the user motion uncertainty may be obtained directly from navigation solution of navigation module 120. Further, uncertainty may be seen to have a direct correlation with the number of active associated hypotheses. When determining uncertainty, hypothesis status may include age, weighting and the like. As noted above, techniques using a grid map may facilitate determining appropriate weights for hypotheses, allowing an uncertainty estimate to be calculated using the weighted average of all the hypotheses' information.

In one aspect, the uncertainty may be inversely related to the hypothesis age such that a newer hypothesis may be considered more uncertain than an older hypothesis that presumably has survived management operations.

To help illustrate benefits of the techniques of this disclosure, field tests were performed to evaluate the performance of enhancing a navigation solution with offline map information. During the field test, smartphones were used in various use cases, including handheld mode and pocket mode, and used to derive navigation solutions over varying periods of time. Subsequently, the offline map matching techniques of this disclosure were applied to provide enhanced navigation solutions. The navigation solutions derived in real time by the analog of navigation module 120 are represented as outlined trajectories, the enhanced navigation solutions provided by the offline map matching are represented as black trajectories and the actual paths taken by the users are represented by cross hatched trajectories.

The pins indicate anchor points, with an order given in parentheses. The tests were conducted at a retail venue for FIGS. 13-26.

Figure 13:
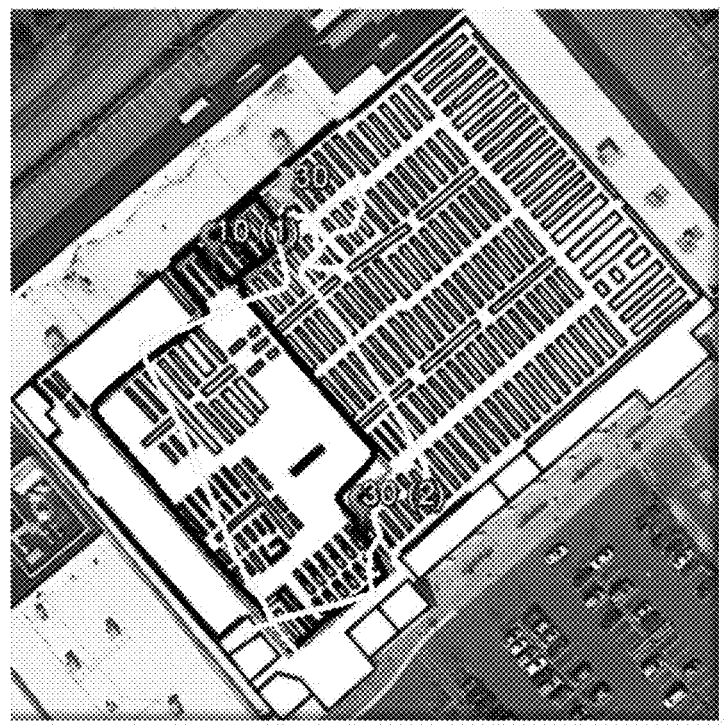
FIGS. 13-17 are schematic representations comparing trajectories developed from navigation solutions and enhanced navigation solutions in a retail venue according to an embodiment.
Figure 14:
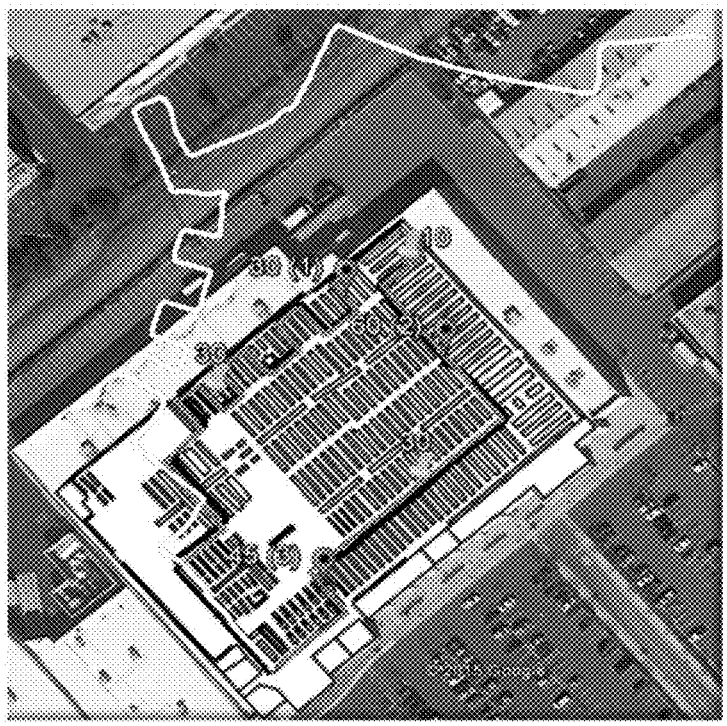
Figure 15:
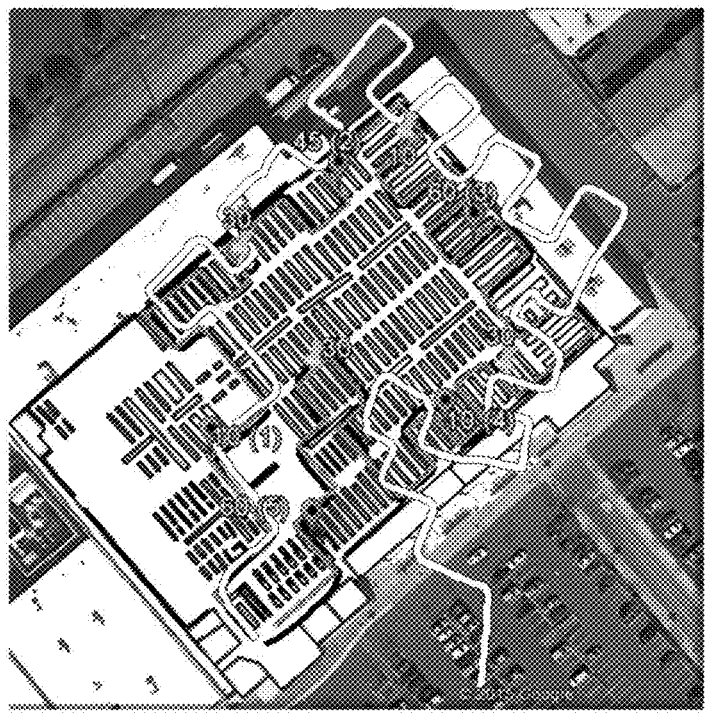
Figure 16:
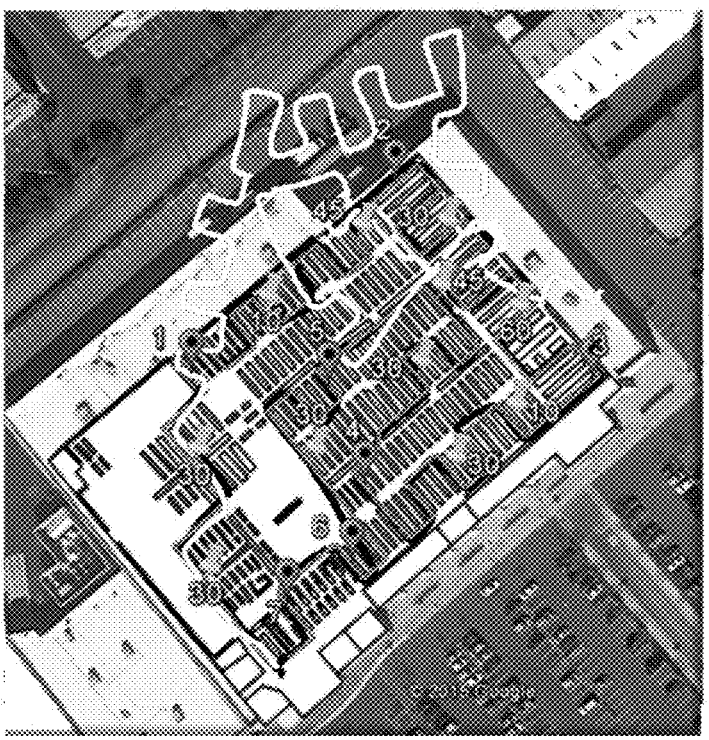
Figure 17:
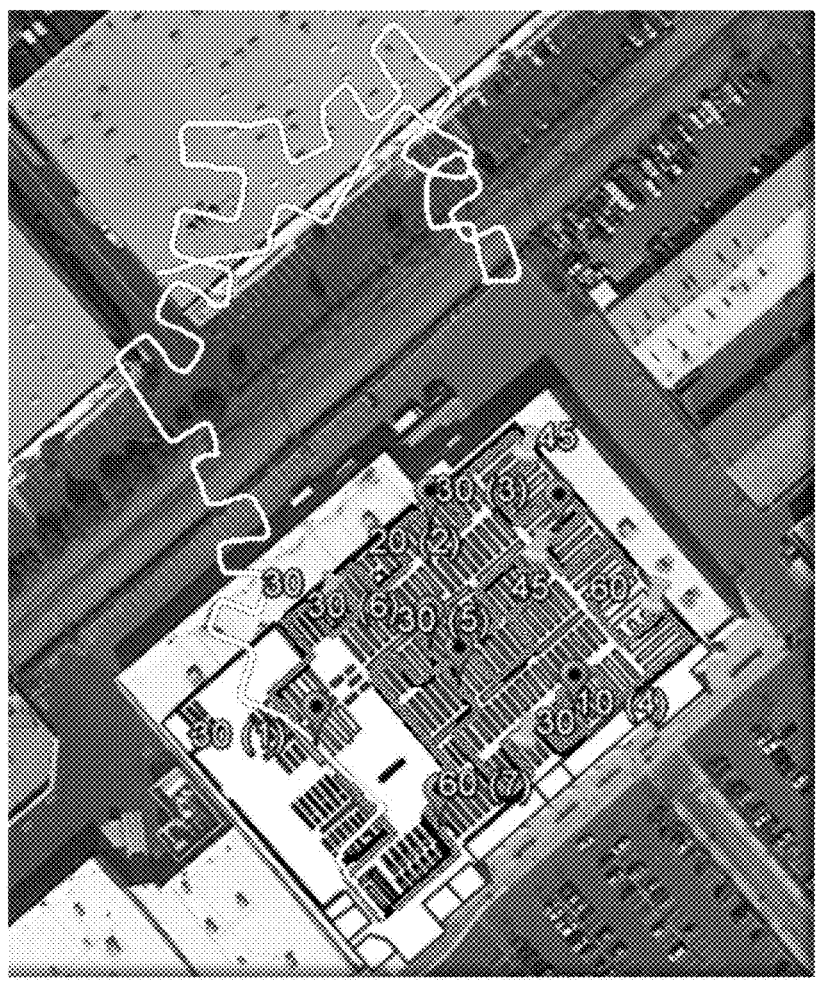

In FIG. 13, the smartphone was handheld and the trajectory obtained over a five minute period. In this depiction, the enhanced navigation solution trajectory overlays the reference trajectory, so that deviations are indicated by the cross hatched portions. In FIG. 14, the smartphone was handheld and the trajectory obtained over a ten minute period. In this depiction, the reference trajectory overlays the enhanced navigation solution trajectory, so that deviations are indicated by the black portions. In FIG. 15, the smartphone was handheld and the trajectory obtained over a fifteen minute period. In this depiction, the reference trajectory overlays the enhanced navigation solution trajectory, so that deviations are indicated by the black portions. In FIG. 16, the smartphone was in pocket mode and the trajectory obtained over a twenty minute period. In this depiction, the reference trajectory overlays the enhanced navigation solution trajectory, so that deviations are indicated by the black portions. In FIG. 17, the smartphone was handheld and the trajectory obtained over a twenty minute period. In this depiction, the reference trajectory overlays the enhanced navigation solution trajectory, so that deviations are indicated by the black portions. As will be appreciated, the trajectory corresponding to the enhanced navigation solutions more accurately reflected the true trajectory of the user. Further, for greater time periods, such as indicated by FIGS. 14-17, the trajectory corresponding to the navigation solutions was subject to increasing deviation, reflecting the inherent drift of inertial sensors and clearly demonstrating the utility of this disclosure's techniques.

Figure 18:
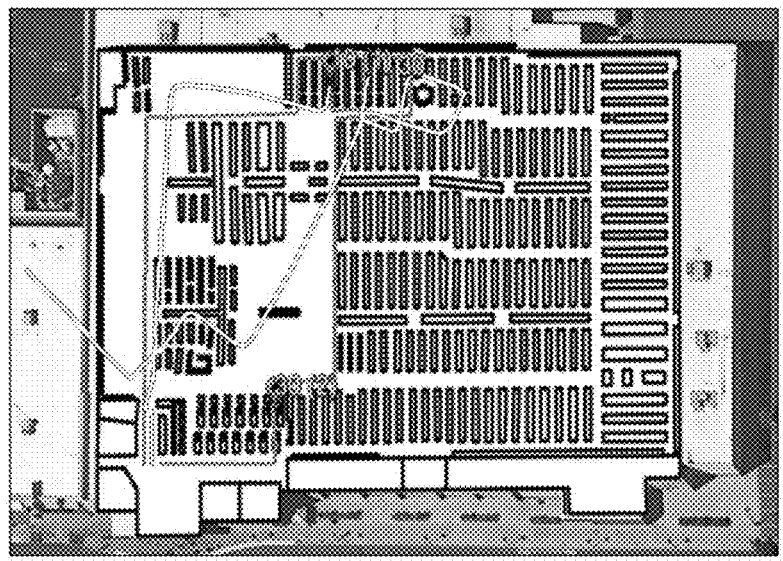
FIGS. 18-26 are schematic representations of the use of forward and backward processing to provide enhanced navigation solutions in the retail venue according to an embodiment.
Figure 19:
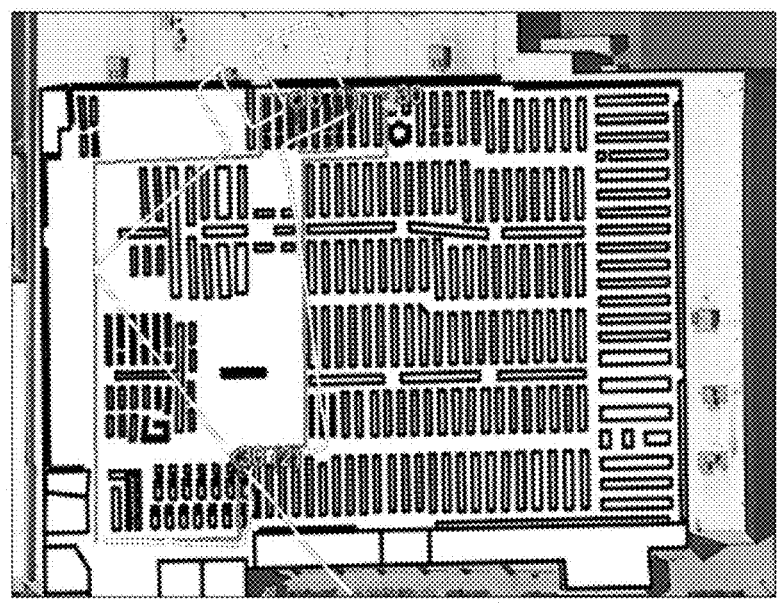
Figure 20:
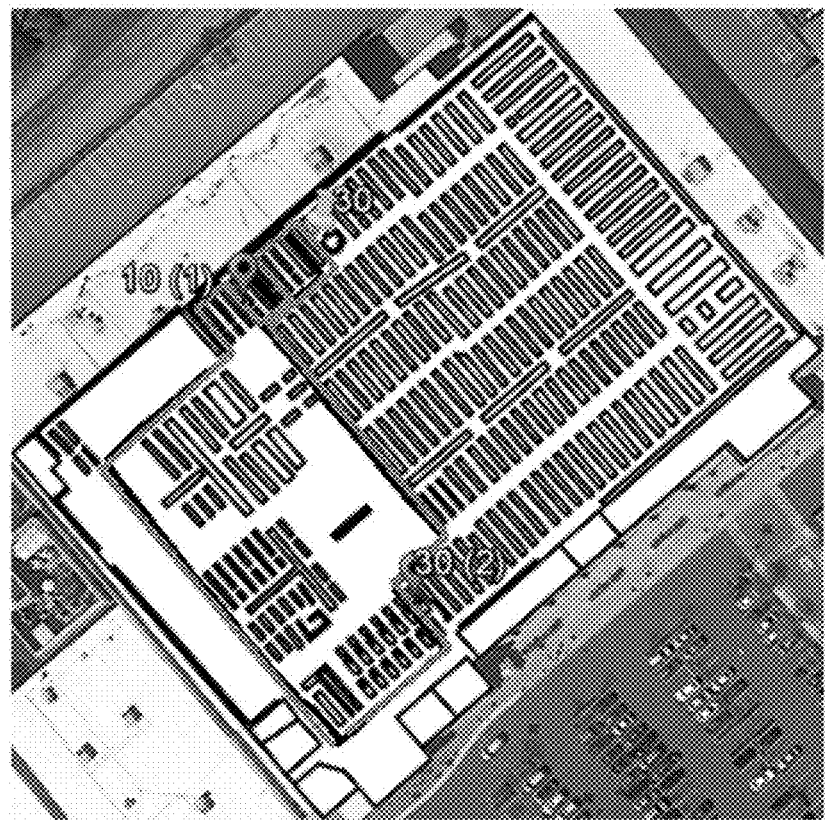
Figure 21:
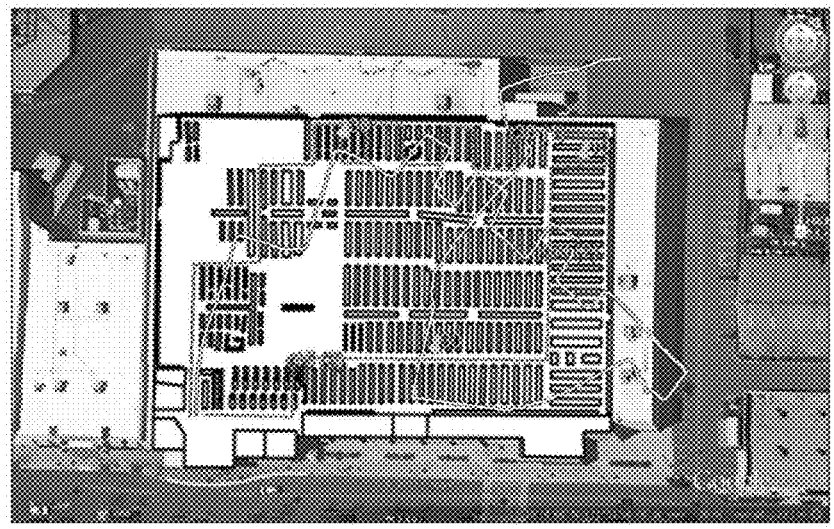
Figure 22:
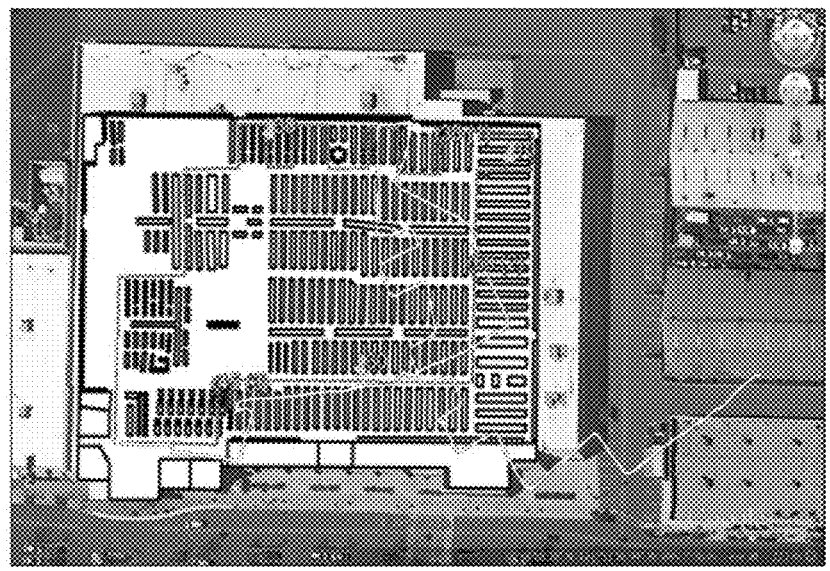
Figure 23:
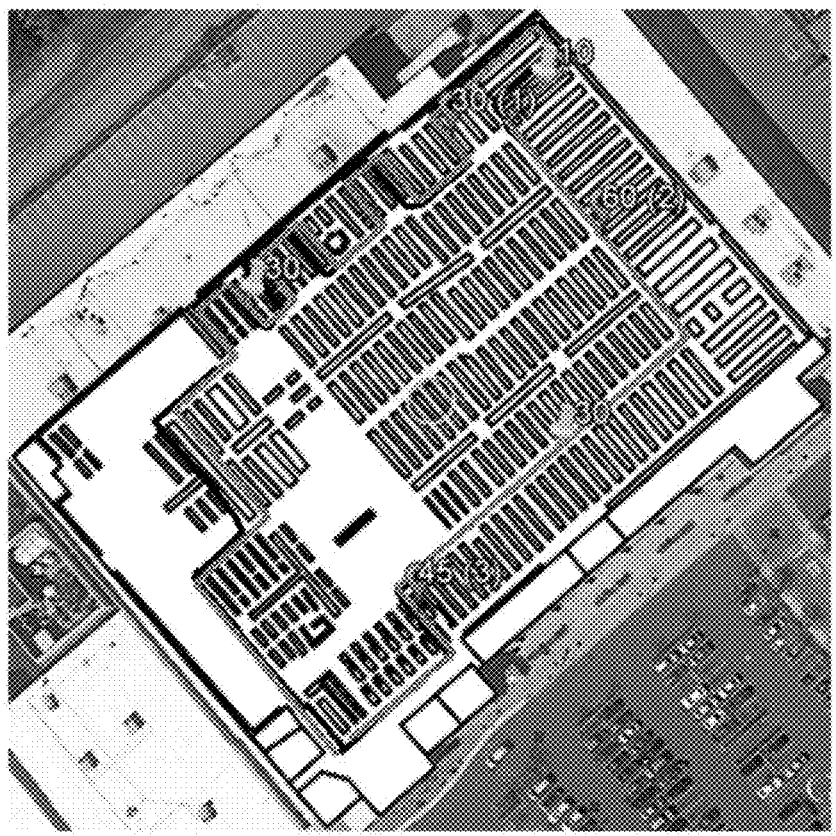
Figure 24:
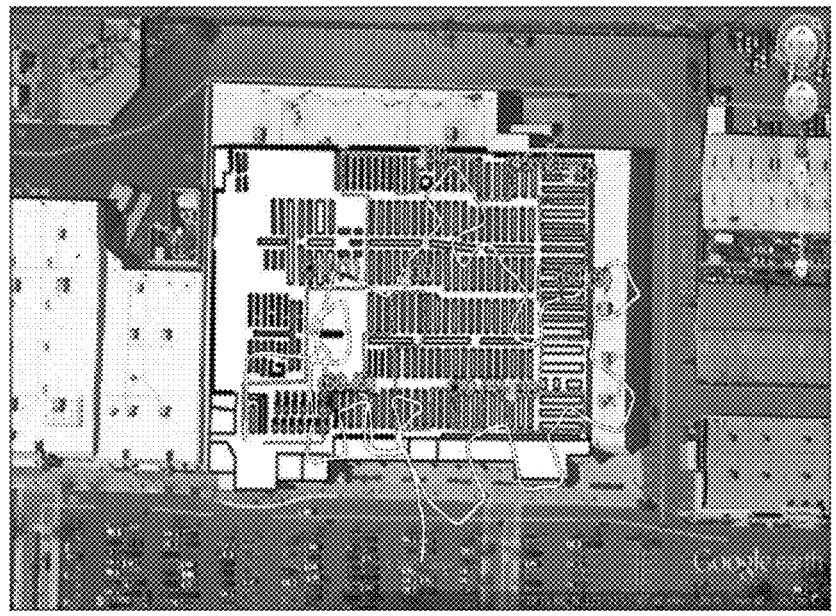
Figure 25:
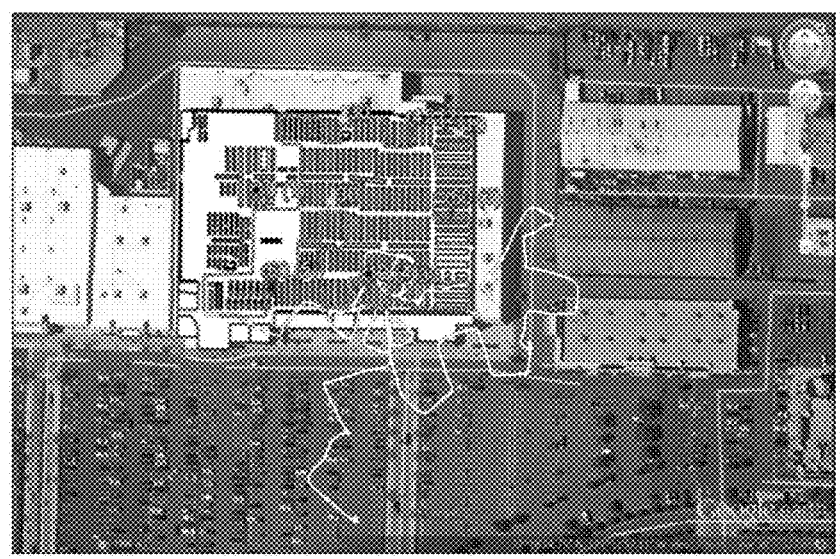
Figure 26:
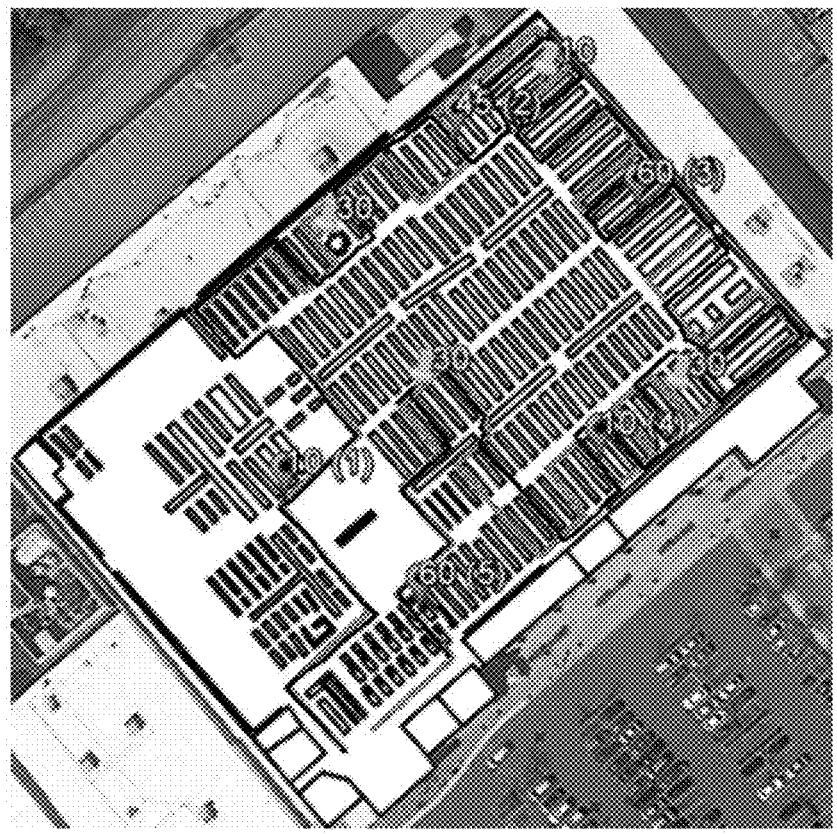

Next, the tests represented by FIGS. 18-26 were also conducted at the same retail venue and demonstrate the results obtained using forward and backward processing of the sensor data to derive navigation solutions followed by apply the offline map matching techniques of this disclosure. In FIGS. 18 and 19, the smartphone was handheld and the trajectory obtained over a five minute period. In both depictions, the reference trajectories are cross hatched, with the forward processed navigation solutions shown in outline in FIG. 18 and the backward processed navigation solutions shown in outline in FIG. 19. The offline map matching techniques of this disclosure were applied to these navigation solutions to provide the enhanced navigation solutions shown in FIG. 20, with two anchor points established by point of sale locations. Here, the cross hatched reference trajectory overlays the enhanced navigation solution trajectory, so that deviations are indicated by the black portions. In FIGS. 21 and 22, the smartphone was dangling (i.e., held by a swinging arm as the user walked) and the trajectory obtained over a ten minute period. In both depictions, the reference trajectories are cross hatched, with the forward processed navigation solutions shown in outline in FIG. 21 and the backward processed navigation solutions shown in outline in FIG. 22. The offline map matching techniques of this disclosure were applied to these navigation solutions to provide the enhanced navigation solutions shown in FIG. 23, with three anchor points established by point of sale locations. Again, the cross hatched reference trajectory overlays the enhanced navigation solution trajectory, so that deviations are indicated by the black portions. Finally, in FIGS. 24 and 25, the smartphone was carried in the user's pocket and the trajectory obtained over a fifteen minute period. In both depictions, the reference trajectories are cross hatched, with the forward processed navigation solutions shown in outline in FIG. 24 and the backward processed navigation solutions shown in outline in FIG. 25. The offline map matching techniques of this disclosure were applied to these navigation solutions to provide the enhanced navigation solutions shown in FIG. 26, with five anchor points established by point of sale locations. Once more, the cross hatched reference trajectory overlays the enhanced navigation solution trajectory, so that deviations are indicated by the black portions. These tests show that very accurate trajectories may be obtained from the enhanced navigation solutions.

Figure 30:
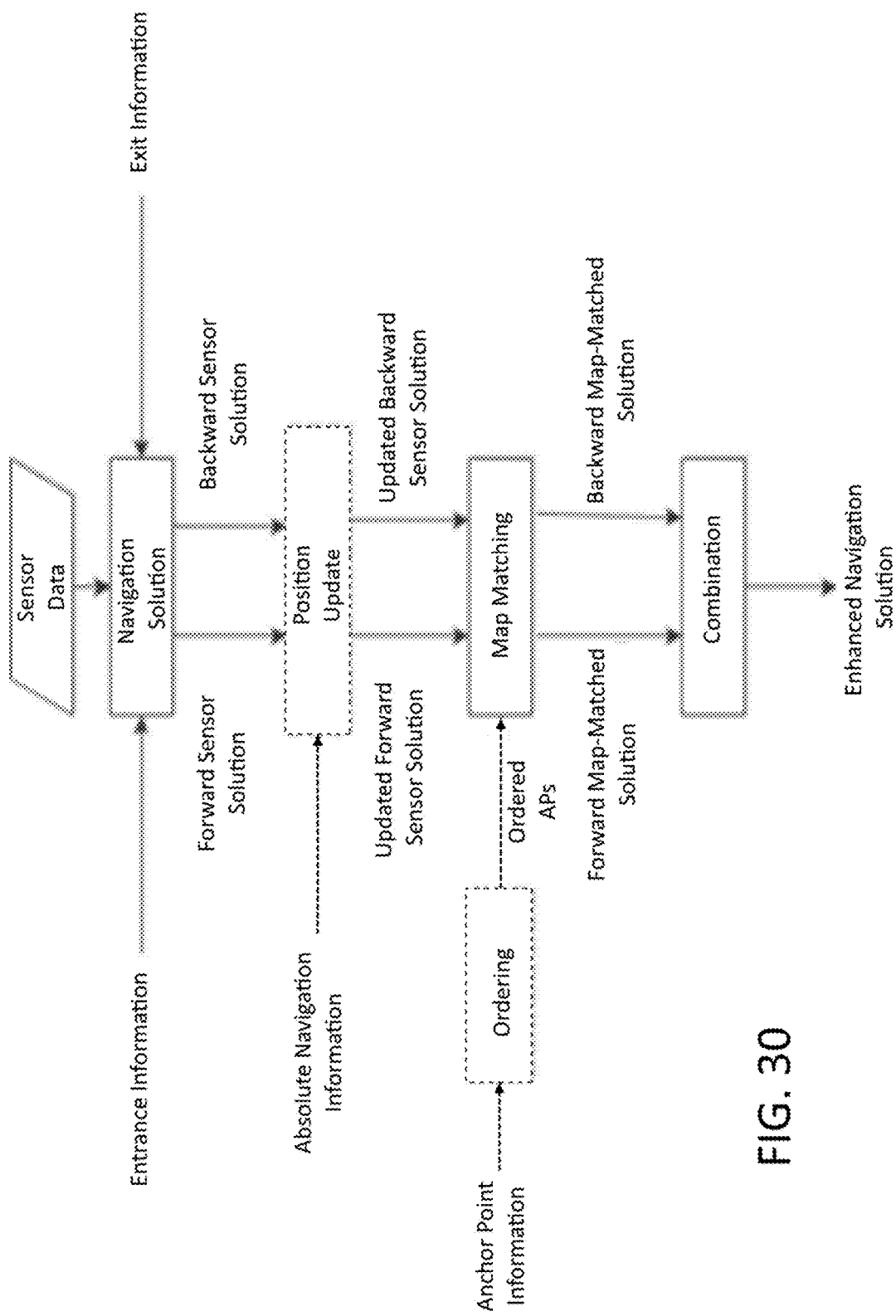
FIG. 30 is a schematic representation of a system for map-matching according to an embodiment.

In the context of the above discussion, one exemplary embodiment of an offline map matching architecture is depicted in FIG. 30. As indicated, a typical offline indoor map-matching solution processes the sensor data, which typically includes measurements from a triaxial accelerometer and a triaxial gyroscope. If available, additional sensor information may also be employed, such as from a triaxial magnetometer and/or a barometer. The sensor data may be forward and backward processed, such as by navigation module 120, to derive forward and backward navigation solutions. If the system is appropriately configured and if the information is available, a source of absolute navigation information may provide one or more position updates that may optionally be used to provide updated forward and backward sensor solutions as indicated. As discussed above, any one or more suitable sources of information may be used, including as a Global Navigation Satellite System (GNSS) receiver, including without limitation the Global Positioning System (GPS), the Global Navigation Satellite System (GLONASS), Galileo and/or Beidou, as well as WiFi™ positioning, cellular tower positioning, Bluetooth™ positioning beacons, visual light communication-based positioning or other similar methods. Thus, the forward and backward solutions, with the optional absolute navigation information updates, are fed to an offline map matching routine as discussed above. Also optionally, one or more anchor points may be identified and potentially ordered. For example, details regarding the use of such anchor points may be found in co-pending, commonly owned U.S. patent application Ser. No. 15/167,036, filed May 27, 2016, and Ser. No. 15/429,475, filed Feb. 10, 2017, both of which are assigned to the assignee hereof and are incorporated by reference in their entirety, which are hereby incorporated by reference in their entirety. Notably, the process of ordering anchor points may be used to estimate absolute positioning updates at the associated epochs in the user's trajectory. This optional anchor point information may also be used as an input in the offline map matching routine. Forward and backward map-matched solutions may then be combined in any suitable manner to provide enhanced navigation solutions. For example, the final solution may represent the forward map-matching solution up until a specific epoch $u_{fb}$, as determined by a combination algorithm, and then may switch to the backward map-matching solution. Accordingly, aspect of this disclosure relate to assessing uncertainty for these enhanced navigation solutions. As an illustration, and without limitation, assessing uncertainty may include estimating the standard deviation of the enhanced navigation solution, which may be referred to as the position uncertainty of the final positioning solution.

As will be appreciated, the sensor data may obtained from any portable or wearable device. By employing offline processing after the fact, forward and backward sensors based navigation solutions may be used. These techniques are particularly suitable to situations where map information is available and in which the user's trajectory may be constrained to certain routes through the venue. Notably, a retail venue may be represented using a grid map as discussed above that corresponds to corridors or aisle defined by shelves or similar structures. However, these techniques may be applied to user trajectories in any type of environment, such as indoor or outdoor, such as land-based, areal or underwater suitable map information for the environment that allows map-matching of the positioning/navigation solution to the available information. In addition to a person walking or running indoor in mapped environments such as shopping malls, retail stores, offices, airports, hospitals, museums and other venues a person may be walking, running, cycling or otherwise traversing an environment on mapped trails (i.e. trails for which map information exists). Consequently these techniques may be applied to land-based vehicles (car, bus, train, or others) that operate on streets or other defined pathways for which map information of the street network is available. Map information may also exist for a network of pipelines or other conduits, which may be traversed using a remote vehicle or the like. A still further example applies to airborne vehicles (plane, helicopter, glider, drone, . . . ) that may operate on defined flight paths. Thus, embodiments may be discussed in the context of an indoor environments such as a retail store, but these should be considered as an illustration only. In addition to the source(s) of absolute navigation information discussed above, anchor points may also be used if available.

According to the discussion above, the following terminology may be used when describing the embodiments of this disclosure:

At a given epoch u, there may be an associated time value $t_u$.

The forward solution may represent a default positioning solution whether a sensor-only solution, a solution updated using a source of absolute navigation information, a map-matched solution, or a solution using (un)ordered anchor points extending between boundary points, such as a start and an end of the trajectory. As such, the subscript f may refer to a forward solution, $p_{f_{sensor}}[u]$ is the forward sensor-only solution at epoch u.

The backward solution may therefore represent a positioning solution that begins from the end of the trajectory till its start, using the reversed values of its acceleration and gyroscope measurements. Similarly, the sensor-only solution, the solution updated using a source of absolute navigation information, the map-matched solution, or the solution using (un)ordered anchor points extending between boundary points may all have backward solution versions. As such, the subscript b refers to the backward solution, e.g., $p_{b_{sensor}}[u]$ is the backward sensor-only solution at epoch u.

A sensor-only solution may be a navigation solution based on motion sensors such as accelerometers, gyroscopes, and optionally magnetometers or barometers. The sensor solution may be derived using inertial navigation system (INS) algorithms, pedestrian dead reckoning (PDR) algorithms, or the like.

The value $p_{sensor}[u]$ may be the position of the sensor-only solution at epoch u. In some embodiments, it may be expressed as a vector of x- and y-coordinates: $p_{sensor}[u]=\{x_{sensor}[u] y_{sensor}[u]\}$.

A grid or grid map may refer to the traversable areas inside an indoor venue that constrains the sensor-only solution. A grid may be generated using map information, such as a store map layout, and a suitable grid generation algorithm as discussed above.

A map matched solution may refer to the solution that map-matches the sensor-only solution (with optional absolute navigation information updates) to a grid.

The value $p_{mm}[u]$ may be the position of the map-matching solution at epoch u and similarly may be expressed as a vector of x- and y-coordinates: $p_{mm}[u]=\{x_{mm}[u] y_{mm}[u]\}$.

The offline map matching routines discussed above may employ one or more hypotheses, each of which may be an intermediate possible solutions estimated by the map-matching algorithm which may then be managed to provide one or more enhanced navigation solutions. Thus, the value $p_{mmhypo_i}[u]$ may be the position of hypothesis i of the map-matching solution at epoch u and also may be expressed as a vector of x- and y-coordinates: $p_{mmhypo_i}[u]=\{x_{mmhypo_i}[u] y_{mmhypo_i}[u]\}$.

Anchor points may be any position update, such as an anchor point determined from point of sale information, but may also be a wireless positioning anchor point, such as Wi-Fi access points, RFID tags, Bluetooth beacons, visual light communication-based positioning or the like. A point of sale (POS) anchor point may be a positions of a product known to have been purchased by the user, such as from a check out receipt or the like. As described above, a given product may be used as a reference point if its position is known within the venue, such as within an aisle accuracy. Receipts from a retailer may identify products purchased by a specific user along with the corresponding position information for those products. For the sake of generality, a POS anchor points may be referred to simply as an anchor point (AP).

Ordering may refer to any suitable process used to determine the correct order of anchor points to assist the map-matching engine and consequently estimate an enhanced navigation solution as the map-matched solution.

The different possible paths generated during the ordering process by matching the sensor-only solution with the map grid at every iteration may be referred to as candidates. Like the hypotheses in the map-matching process, they may constitute intermediate possible solutions used to evaluate the point of sale anchor point information.

The enhanced navigation solution, or simply positioning solution, may refer to the most refined determination of one or more values including position, velocity and/or attitude for a given epoch. Correspondingly, the position uncertainty may be the estimated confidence assessed for the enhanced navigation solution. In one embodiment, an uncertainty measure may comprise the standard deviation of the error in the enhanced navigation solution. As noted above, position certainty may be a term used interchangeably with position uncertainty, referring to a reciprocal measure.

According to the techniques of this disclosure, assessing the uncertainty of the enhanced navigation solution may be a weighted sum of a number of factors. In one embodiment, the positioning uncertainty measure may be expressed as Equation (10):

$$\sigma_{final}=w_{sensor}\sigma_{sensor}*w_{FP}\sigma_{FP}*w_{mm}\sigma mm*w_{AP}\sigma_{AP}$$

where $\sigma_{sensor}$ represents the sensor-based navigation positioning uncertainty, based upon a standard deviation of the sensor-based navigation without map matching, including misalignment quality, $\sigma_{sensor_{misalignment}}$, fidgeting related factors, $\sigma_{sensor_{fidgeting}}$, such as the time duration of fidgeting, corresponding to an intermittent fidgeting detection, and $w_{sensor}$, which may be the weight of the sensor-only uncertainty on the overall uncertainty. Further, $\sigma_{mm}$ may be the map-matching positioning uncertainty and based at least in part on a number of hypotheses, $n_{hypos}$, a spatial dispersion of hypotheses, $\sigma_{mm_{dhypos}}$, a score of map matched segment, score including a signature matching score function and a comparison of the total length of segment, and total angle change between map-matched solution and sensor only solution. The map-matching position uncertainty may be weighted by $w_{mm}$. Still further, if such information is used in deriving the enhanced navigation solution, $\sigma_{AP}$ may represent the anchor point positioning uncertainty. As such, this may be for anchor points derived from point of sale information or any other suitable position update. The value may be based on a factor representing anchor point proximity from $m^{th}$ anchor point, expressed as $d_{AP}m$, anchor point certainty of the $m^{th}$ anchor point, $c^m$. Correspondingly, $w_{AP}$ may represent the weight of the anchor point uncertainty on the overall uncertainty. The last term in this embodiment is $\sigma_{FP}$, which may represent uncertainty of a positioning update using absolute navigation information, while $w_{FP}$ may be used to weight of this uncertainty when deriving the overall uncertainty, $\sigma_{final}$. Each factor comprising the overall uncertainty, and the weighting factor used in association, may be determined in any suitable manner. The materials below give specific examples, but one of ordinary skill in the art will appreciate that other techniques, as well as other factors, may be employed as warranted. Uncertainty for any other positioning updates may also be accommodated.

With regard to the sensor-based navigation positioning uncertainty factor, $\sigma_{sensor}$, a number of subfactors or other suitable measures may be used when deriving the value. Notably, one measure may correspond to the quality of the state estimation result used to derive the navigation solution, such as $\sigma_{sensor_{Kalman}}$ when integration of a Kalman filter is used for the state estimation. In other embodiments, such as those employing a particle filter, may use a corresponding subfactor. Other subfactors that may be included depend on availability, such as $\sigma_{sensor_{misalignment}}$, which may represent a quality assessment of calculated misalignment in orientation between the portable device and the platform $\sigma_{sensor_{steplength}}$, which may represent a quality assessment of estimated step length used in a PDR technique, $\sigma_{sensor_{stepdetection}}$, which may represent a quality assessment of step detection used in a PDR technique, and $\sigma_{sensor_{fidgeting}}$, which may represent a quality assessment of detecting periods when the user may be moving the portable device in a nonmeaningful manner, such as fidgeting.

Figure 31:
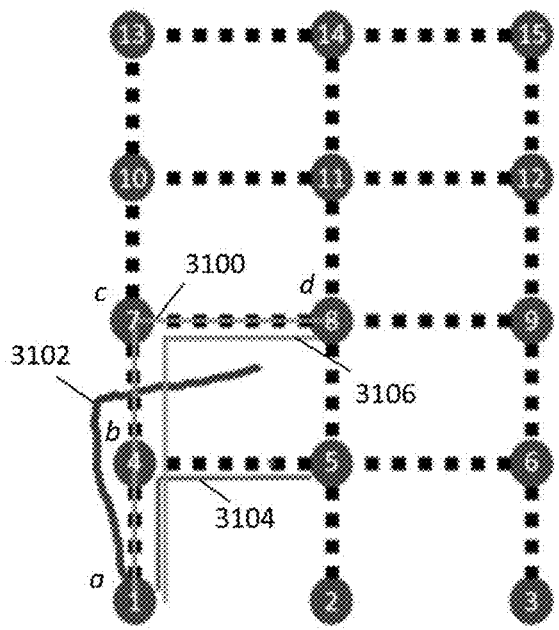
FIG. 31 is a schematic representation of a map-matched enhanced navigation solution superimposed on a grid according to an embodiment.

Correspondingly, the map-matching positioning uncertainty $\sigma_{mm}$ may also be based at least in part on certain subfactors or other suitable measures, including a number of hypotheses, $n_{hypos}$, a spatial dispersion of hypotheses, $\sigma_{mm_{dhypos}}$, a score of map matched segment, score including a signature matching score function and a comparison of the total length of segment, and total angle change between map-matched solution and sensor only solution as noted. To help illustrate, FIG. 31 shows a simplified example of a map-matched solution superimposed on a grid formed by numbered nodes and their connecting traces, indicated by the dashed lines. In this example, the map-matched solution 3100 is shown as starting at epoch a (corresponding to node 1) and ending at epoch d (corresponding to node 8), passing through epochs b and c. Such a typical map-matching solution may start with a sensor-only solution 3102, $p_{sensor}$, which usually does not fit in the expected paths of motions in a specific venue, for example the sensor-only solution may cross untraversable areas like the shelves delineating aisles. As such, one stage of the map-matching process may involve generating different hypotheses representing different possible fixed solutions between epochs a and d in the trajectory. For the example shown in FIG. 31, one hypothesis 3104 passes through nodes 1, 4, and 5, while another hypothesis 3106 passes through nodes 1, 4, 7, and 8. A next stage of the map-matching process may involve using one or more suitable algorithms to select among the potential hypotheses and chose a hypothesis that most likely represents the true path. In this example, the map-matched solution 3100 may be chosen as the hypothesis passing through nodes 1, 4, 7, and 8 and the positioning uncertainty attributable to the map-matching algorithm at epoch u may be expressed using Equation (11):

$$\sigma_{mm}[u] = \frac{n_{hypos}[u] \cdot \sigma_{mm_{dhypos}}[u]}{\text{score}[u]} \tag{11}$$

where $n_{hypos}[u]$ may represent the number of hypotheses of generated by the map-matching process at epoch u, $\sigma_{mm_{dhypos}}[u]$ may represent the spatial dispersion of hypotheses at epoch u, and score[u] may represent the score of the map-matched segment at epoch u. Each of these subfactors may be derived according to any suitable technique, including the following examples.

Figure 32:
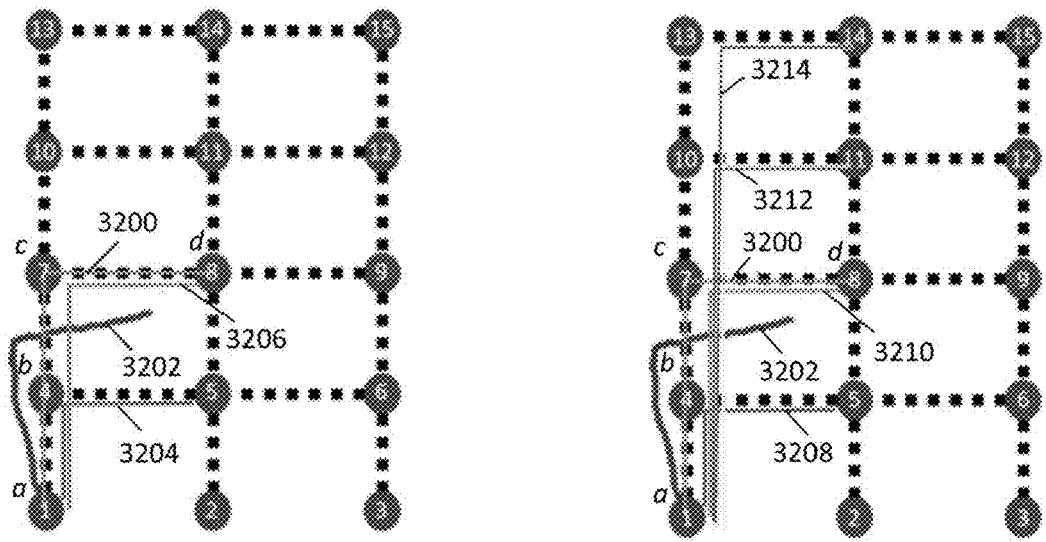
FIG. 32 schematically represents using the number of hypotheses to derive uncertainty according to an embodiment.

The number of hypotheses per epoch, $n_{hypos}[u]$, may be the count of hypotheses of the map-matching solution during epoch u as expressed by Equation (12):

$$n_{hypos}[u] = \Sigma_{\forall i} I\{exists(p_{mmhypo_i}[u])\}$$

where the function exists $(p_{mmhypo_i}[u])$ returns a value of true if there is a hypothesis with label i, and correspondingly I{condition} returns a value 1 if condition is true, and 0 if condition is false. To help illustrate, FIG. 32 schematically depicts the number of hypotheses subfactor with regard to map matching solutions 3200 for the same sensor-only solution 3202. Between epochs a and b, both the left and right map-matching solutions have one hypothesis per epoch. However, between epochs b and d, the left map-matching solution has hypotheses 3204 and 3206 per epoch, while the right map-matching solution has hypotheses 3208, 3210, 3212 and 3214 per epoch. The larger the number of hypotheses per epoch, the more uncertain the positioning solution is, or conversely, the smaller the number of hypotheses per epoch, the more certain the map-matching solution is about where the true position is, and therefore the uncertainty of the positioning solution may be less.

Next, the spatial dispersion of hypotheses per epoch, $\sigma_{hypos}[u]$, may be calculated as the norm of the standard deviation of the x- and y-coordinates of the locations of all the hypotheses at epoch u according to Equation (13):

$$\sigma_{mm_{dhypos}}[u] = \sqrt{\sigma_{mm_{xhypos}[u]}^2 + \sigma_{mm_{yhypos}[u]}^2} \tag{13}$$

where $\sigma_{mm_{xhypo}}[u]$ may be derived using Equation (14), with $\mu_{mm_{xhypos}}[u]$ given as Equation (15)

$$\sigma_{mm_{xhypo}}[u] = \sqrt{\frac{1}{n_{hypos}[u]} \sum_{\forall i} (x_{mmhypo_i}[u] = \mu_{mm_{xhypos}}[u])^2} \tag{14}$$

$$\mu_{mm_{xhypos}}[u] = \frac{1}{n_{hypos}[u]} \sum_{\forall i} x_{mmhypo_i}[u] \tag{15}$$

and where $\sigma_{mm_{yhypo}}[u]$ may be derived using Equation (16), with $\mu_{mm_{yhypos}}[u]$ given as Equation (17)

$$\sigma_{mm_{yhypo}}[u] = \sqrt{\frac{1}{n_{hypos}[u]} \Sigma_{\forall i} (y_{mmhypo_i}[u] - \mu_{mm_{yhypos}}[u])^2} \tag{16}$$

$$\mu_{mm_{yhypos}}[u] = \frac{1}{n_{hypos}[u]} \Sigma_{\forall i} y_{mmhypo_i}[u] \quad (17)$$

Figure 33:
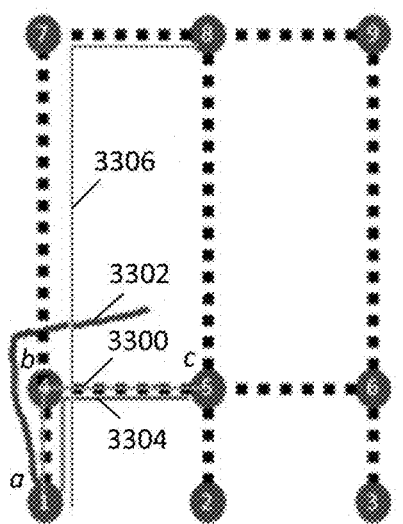
FIG. 33 schematically represents using spatial dispersion to derive uncertainty according to an embodiment.
Figure 33:
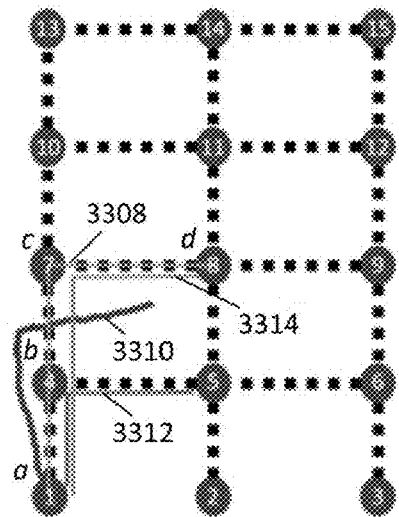

An illustration of the spatial dispersion of hypotheses subfactor is depicted in FIG. 33, giving examples of map matching solutions derived from sensor-only solutions. Between epochs a and b, both the left and right map-matching solutions have zero dispersion, as all the hypotheses in both cases are identical. However, between epochs b and d, the left map-matching solution 3300, derived from sensor-only solution 3302, has been selected from hypotheses 3304 and 3306, which have sparse dispersion (relatively greater distance between them) while the right map-matching solution 3308, derived from sensor-only solution 3310, has been selected from hypotheses 3312 and 3314, which have dense dispersion (relatively smaller distance between them). Generally, when there is more dispersion of hypotheses for a given epoch, the uncertainty may be greater, reflecting that the map-matching solution is uncertain given that the final position could be at different points far apart from the chosen solution. On the other hand, if the spatial dispersion at an epoch is small, the uncertainty may be reduced, as all the possible map-matching solutions are relatively close to the chosen solution.

Further, the score subfactor of the map-matched segment at an epoch u, score[u], may be considered a measure of how similar the map-matched segment, $p_{mm}[u]$, is to the sensor-only solution, $p_{sensor}[u]$. Thus, the closer or more similar they are, the less uncertain the solution is, and vice versa. The score of map-matched segment may be calculated using any of the curve matching (a.k.a shape matching) methods known in literature. Curve matching may require matching two lines or trajectories over a number of epochs. To derive a score at each epoch, the score of map-matched segment at each epoch may be obtained by calculating the curve matching between the map-matching segment and its corresponding sensor-only solution at a window around the epoch. For example, the window may be defined as the current epoch and the previous N-1 epochs, where N is a fixed arbitrary number, as a group of epochs before and after the epoch covering a certain segment of the trajectory, such as between two consecutive turns, or using any other suitable criteria.

Correspondingly, the variable window$_u$ may be the set of epochs of window length N which constitute the chosen window around each epoch u as indicated by Equation (18):

$$\text{window}_u = \{u_0, u_1, u_2, \ldots, u_n, \ldots, u_{N-1}\}$$

where $u_n = u+n$ (e.g., $u_0 = u$ and $u_1 = u+1$). In a typical indoor positioning solution, $p_{sensor}[u]$ may drift with time from the true position, as well as from the estimated map-matching position, and may actually end up being outside the indoor venue while the true solution remains inside it. Therefore, a comparison may be made for the displacement of both $p_{mm}[u]$ and $p_{sensor}[u]$ with respect to their respective positions in the first epoch of the window as indicated by Equations (19) and (20), respectively:

$$\Delta p_{mm}[u] = p_{mm}[u] - p_{mm}[u_0] \quad (19)$$

$$\Delta p_{sensor}[u] = p_{sensor}[u] - p_{sensor}[u_0] \quad (20)$$

As noted above, any suitable curve matching technique may be used when assessing score subfactor of the map-matching uncertainty. One example is a Euclidean Distance Metric, represented by $score_{euclidean}[u]$, and may be the root mean square of the difference between the map-matched solution and the sensor only solution as indicated by Equation (21):

$$score_{euclidean}[u] = \frac{1}{\sqrt{\Sigma_{\forall u_n \in window_u}(\|\Delta p_{mm}[u_n] - \Delta p_{sensor}[u_n]\|)^2}} \quad (19)$$

Another example is a dynamic time warping measure, $score_{DTW}[u]$, which may be derived from an algorithm measuring the similarity between two trajectories, represented as temporal sequences, even if one sequence is faster than the other, or accelerates or decelerates in the middle more than the other. A further example is to evaluate the longest common subsequence, so that $score_{LCS}[u]$ may be the count of the epochs in which both the map-matched solution and sensor-only solution are close within a certain proximity as indicated by Equation (22):

$$score_{LCS}[u] = \frac{1}{\Sigma_{u_n \in window_u} I\{\|\Delta p_{mm}[u_n] - \Delta p_{sensor}[u_n]\| < \text{Threshold}\}} \quad (22)$$

Figure 34:
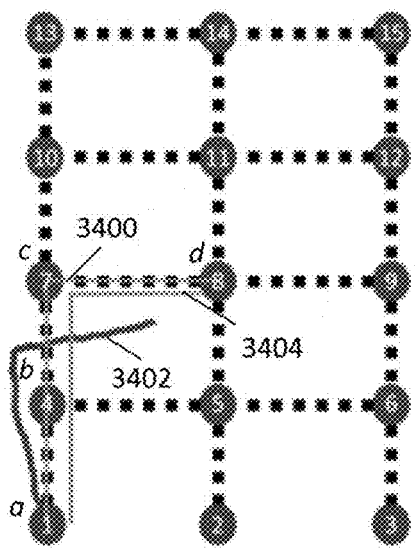
FIG. 34 schematically represents using map-matching scoring to derive uncertainty according to an embodiment.
Figure 34:
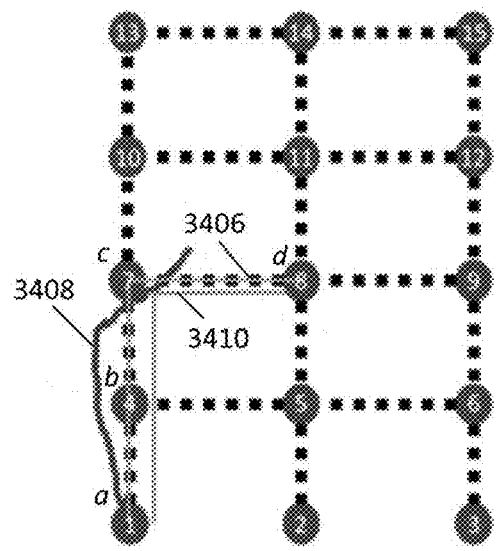
Figure 35:
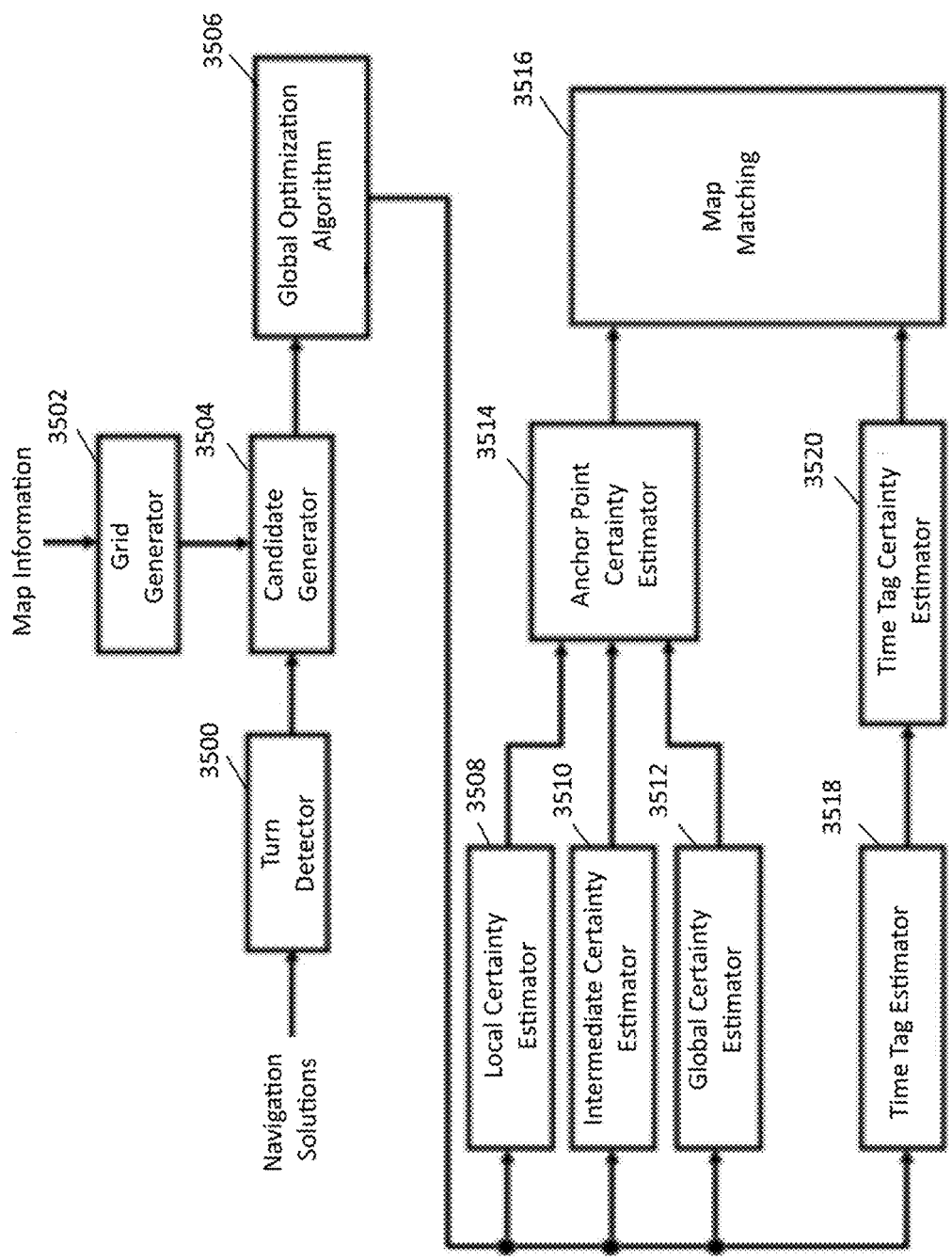
FIG. 35 is a schematic representation of a system for ordering anchor points according to an embodiment.

A schematic illustration of these techniques is given in FIG. 34, which shows two examples of indoor positioning solutions. For the example on the left, map-matched solution 3400 may be derived from sensor-only solution 3402 by selecting hypothesis 3406. The score of map-matched segment 3400 may be relatively high, as there is high similarity between the sensor-only solution 3402 and the map-matched solution 3400, especially because the turn of the sensor-only solution is 90 degrees, closely corresponding to the map-matching solution. For comparison, on the right example, map-matched solution 3408 may be derived from sensor-only solution 3410 by selecting hypothesis 3412. The score of the segment of map-matched solution 3408 may be relatively low, as the turning of the sensor-only solution 3410 is obtuse, and there is a high ambiguity whether the true solution continued to move forward or turned to the right, so that the associated uncertainty is higher.

Next, with regard to the contribution of anchor point uncertainty, $\sigma_{AP}$, in the overall uncertainty of the enhanced navigation solution, it will be appreciated that map-matching the sensor-only solution may be challenging due to the high error rates of the sensor-only solution, as may be experienced in an indoor venue. To help address this problem, anchor points may be identified from point of sale information for use in map-matching for a retail venue as discussed above. Notably, when the position, order and/or time-tag (from the sensor-only solution) of an anchor point are known, the map-matching engine may use this information to reset the errors in the sensor-only solution, as well as using anchor points to generate new hypotheses or evaluate existing hypotheses, such as by increasing the weight of paths that pass by anchor points in the correct order relative to other paths that do not pass by anchor points or pass in the wrong order. Since offline map-matching generates many possible paths on the grid that match sensor-only solution, constraining a path to pass by all anchor points in a specific order may help narrow the number of valid solutions. Although many examples are discussed in the context of anchor points derived from point of sale information, anchor points may also be identified from a source of absolute navigation information, including WiFi access points, RFID tags, Bluetooth beacon, visual light communication-based positioning and the like.

Correspondingly, the existence of anchor points may reduce the uncertainty in the overall positioning solution, given that the certainty of the positioning solution may be positively related to how close the anchor point is to the positioning solution, as may be assessed by employing a component reflecting anchor point proximity. Further, characteristics such as whether a positioning solution has passed through an anchor point, when it passed the anchor point, and its order relative to other anchor points may all have uncertain aspects. As noted above, the process of determining whether a positioning solution passes an anchor point and the anchor point order may be referred to as the ordering process, the output of which may be a set of ordered anchor points to be used in the map-matching process and may also have a uncertainty to be assessed.

Ordering anchor points may utilize a strategy similar to generation and management of multiple hypotheses during the map-matching process, and may involve the generation of alternative candidates along the trajectory each time the probability of turn detection is above a certain threshold. Furthermore, knowing the time tag of the epoch in which the solution passed through an anchor point may reduce the uncertainty of the positioning solution during that epoch. Therefore, the accuracy associated with the time tag of a given anchor point may also be used in assessing uncertainty for the anchor points.

With respect to the contribution of anchor point proximity to the uncertainty estimation, in one embodiment anchor point uncertainty at epoch u, $\sigma_{AP}[u]$, may be the product of an anchor point proximity component and the anchor point uncertainty for all the anchor points in the trajectory as indicated in Equation (23):

$$\sigma_{AP}[u] = \Pi_{\forall m} \frac{1}{prox(d_{APm}[u])} \times \left(\frac{1}{c^m}\right) \quad (23)$$

where $d_{AP}{}^m[u]$ may represent the absolute distance of the final positioning solution at epoch u from the $m^{th}$ anchor point, prox( ) may be a function that converts the distance of the solution from an anchor point to an anchor point proximity factor as discussed below, and $$\left(\frac{1}{c^m}\right)$$

may be the uncertainty factor of the $m^{th}$ anchor point, and may be the reciprocal of the certainty factor of the $m^{th}$ anchor point, $c^m$, that may be calculated as discussed below.

With regard to proximity for a given anchor point, the overall associated uncertainty may take the value of the anchor point uncertainty at the epoch corresponding to the time tag, so that the anchor point is used as a position update. Similarly, at epochs which are closer to the time tag of a given anchor point, the positioning uncertainty may be less than at epochs further away from the anchor point. Further, at epochs more removed in time than a certain threshold, the uncertainty factor may no longer be affected by the distance from the anchor point. Reflecting these considerations, an anchor point proximity subfactor regarding the $m^{th}$ anchor point may be calculated using Equation (24):

$$prox(d_{AP}{}^m[u]) = sigmoid(d_{AP}{}^m[u] - Th_d + 4)$$

where sigmoid $$(x) = \frac{1}{1 + e^{-x}}$$

may represent a sigmoid function characterized by saturating at 1 if x>>0 and at 0 if x>>0, $Th_d$ may represent the threshold distance for whether anchor point certainty is used. If $d_{AP}m[u]<Th_d$, $0<prox(d_{AP}m[u])<1$, otherwise if $d_{AP}m[u]>Th_d$, $prox(d_{AP}m[u])\approx 1$, and $d_{AP}m[u]$ may be the absolute distance of the final positioning solution at epoch u from the re anchor point A schematic depiction of one exemplary implementation of assessing anchor point confidence is shown in FIG. 19, such as may be performed by uncertainty estimator 143. Navigation solutions representing a trajectory from a first position to a second position output by navigation module 120 may be fed to turn detector 3500. With respect to a given trajectory, the first and second positions may represent the boundary points of the trajectory, such as the starting position and the ending position. The navigation solutions may include position, velocity or attitude determinations, in any desired combination, such as position, velocity and attitude, or position and attitude only, attitude and velocity only, or even attitude or position only. As described above, any suitable turn identification technique or combination of techniques may be employed, including heading-based and position-based techniques. The main function of the turn detectors is to compute an array containing the start and the end epochs of all detected turns in the trajectory determined from the sensor readings. For example, heading-based turn detection may identify turns based on an empirically preset threshold for the rate of change of the moving platform's heading and position-based turn detection may identify turns based on an empirically preset threshold for the rate of change of the heading detected by the change in position in the forward direction of the moving platform. Turn identification segments the trajectory into a series of time-tagged segments and turns. Further, map information may be fed to grid generator 3502 to produce a grid map representing traversable regions of the venue encompassing the trajectory following the discussion above. Outputs from turn detector 3500 and grid generator 3502 may be fed to candidate generator 3504 to produce candidate links of the grid map, also following the discussion above, to allow matching the segmented trajectory to all possible routes on the grid map.

The candidate links from candidate generator 3504 are used by ordering algorithm 3506 to represent all the possible paths from the first position to the second position of the trajectory, each of which may be scored and assessed to determine the anchor point order. The estimated anchor point order produced by ordering algorithm 3506 may then be evaluated for certainty. As indicated, the order certainty may be computed for every anchor point using a weighted sum of local certainty estimator 3508, intermediate certainty estimator 3510 and global certainty estimator 3512. Every ordered anchor point may be assigned a local, intermediate and global order certainty measures and a weighting function may be used by anchor point order certainty estimator 3514 to compute one value for the order certainty. The certainty measure may guide map matching 3516, for example by ignoring anchor points with insufficient certainty measures and thus providing a more accurate map-matched solution.

Additionally, the ordered anchor points may be provided to time-tag estimator 3518 to assign a time to the anchor points corresponding to the sensor readings for the epoch of the trajectory passing by access point. Time-tag certainty estimator 3520 may assess the confidence of the time assignments and provide the information to the map matching operation 3516. As will be appreciated, map matching may be enhanced by estimating the times of the anchor points relative to the trajectory. To reduce the chance of an incorrectly time-tagged anchor point from disrupting the chosen solution, the certainty of the estimated time-tag is of significant importance. The combination of time-tag estimator 3518 and time-tag certainty estimator 3520 correspondingly provides the time-tag of each ordered anchor point along with a confidence in the computed time-tag. Map matching may then generate new hypothesis using only those anchor points with sufficient certainty measures. As an illustration, the time-tag of an ordered anchor point may be estimated by identifying portions of the trajectory with little or no change in position that may occur when the user is selecting an item for purchase, resulting in a dwell as described above. By comparing the length and position of the dwell periods to the positions of the anchor points on the candidate link, a time may be assigned to each anchor point. Time-tag certainty estimator 3520 may then utilize a weighting function based on the anchor point order certainty and the position of anchor point from the dwell periods to estimate the time-tag certainty.

Accordingly, once the order of the anchor points has been estimated, the degree of confidence in that order may be assessed. The order certainty, $c^m$, may be computed for every anchor point using a weighted sum of three different estimators, local certainty estimator 3508, intermediate certainty estimator 3510 and global certainty estimator 3512, as indicated by Equation (25):

$$c^m = w_{AP_{local}} * lc^m + w_{AP_{intermediate}} * ic^m + w_{AP_{global}} * gc^m \quad (25)$$

where $lc^m$ may represent a component derived from local certainty estimator 3508 that probes the segment assigned to every anchor point by studying different features like zero-step length percentage, the number of the candidates representing the segment, the spread of the candidates and other local factors, $ic^m$ may represent a component derived from intermediate certainty estimator 3510 that computes the certainty of each anchor point order depending on the mean-square distance of the anchor point from the path and the vicinity of the anchor point from other links on the same path, and $gc^m$ may be a component derived from global certainty estimator 3512 that uses the order from a forward and backward trajectory to estimate a global certainty measure for the order of each anchor point to analyze areas where the forward and backward orders agree or contradict, each of which are described in more detail below. As discussed above, a weighting function, $w_{Ap}$, may be used to compute one value for the order certainty for every ordered anchor point using the computed certainty measures. Further, the variable window$_u$ derived from Equation (18) as discussed above may be the set of epochs of window length N which constitute the chosen window around each epoch u and the variable $u_{AP_m}$ may be used to represent the time epoch estimated at which the solution passed through the $m^{th}$ anchor point and may be time-tag matched to the projected distance of the anchor point from the grid to the assigned segment.

With regard to local certainty estimator 3508, the estimation for the $m^{th}$ anchor point, $lc^m[u]$, may be a combination of several local factors as noted. The effect of each factor may depend on how the candidates are initially matched and also on the accuracy of the sensor-only solution. In one embodiment, the estimation may be a weighted combination of factors as indicated by Equation (26):

$$lc^m = \min((w_{zero} * lc_{zero}^m + w_{num} * lc_{num}^m + w_{SF} * lc_{SF}^m + w_{tt} * lc_{tt}^m), 1) \quad (26)$$

where $lc_{zero}^m$ represents a zero-step length percentage factor, $lc_{num}^m$ represents a number of anchor points factor, $lc_{SF}^m$ represents a candidate spread factor, $lc_{tt}^m$ represents a time tag certainty factor, and a $w_{zero}$, $w_{num}$, $w_{SF}$ and $w_{tt}$ each respectively denote the individual weights for these factors.

The anchor point zero-step length percentage factor of the $m^{th}$ anchor point, $lc_{zero}^m \in [0,1]$, may be defined as the number of zero steps within a tunable window around the position of the anchor point. The position of the anchor point on the grid may be determined and projected on the assigned segment. Then, variable window$_u$ may be defined around the projected position of the anchor point and the number of zero-steps within the defined window may be compared to the size of the window as given by Equation (27):

$$lc_{zero}^m = \frac{\Sigma_{\forall u_n \in window_{u_{APm}}} I\{is\_step[u_n]\}}{(u_{APm} + N/2) - (u_{APm} - N/2)} \quad (27)$$

where the function is_step [u] returns 1 if a step is detected at epoch u, and 0 otherwise.

Next, there may be a set of candidates that were not chosen as part of the optimal path for every candidate that was chosen during the ordering process. Each segment of the sensor-only solution may be matched to a set of candidates, where the number of candidates C is controlled by several factors, including the grid layout. Therefore, as the number of candidates increase, the possibility of an anchor point being assigned to the correct segment may decrease. Correspondingly, the number of candidates matching a sensor-only solution segment for the re anchor point, $lc_{num}^m$, may reflect this contribution to the local certainty estimation, as indicated by Equation (28):

$$lc_{num}^m = \min\left(\frac{a^m}{c^m}, 1\right) \quad (28)$$

where $a^m$ represents the number of acceptable aisles in error around the $m^{th}$ anchor point or other suitable distance threshold and $C^m$ represents the number of candidates around the m' anchor point. By using a min function, it may be ensured that the measure $lc_{num\_cand}^m$ does not exceed 1.

Another local factor in assessing anchor point certainty is the spread factor of the matched candidates. A candidate selected from a set of matched candidates with a high spread factor may suffer from low local certainty as a relatively large spread of candidates exposes the ordering process to errors, given that the possibility of assigning an anchor point to the wrong segment may be increased. In one embodiment, the candidate spread factor, $lc_{SF}^m$, may be derived using Equation (29):

$$lc_{SF}^m = \frac{(a^m * width_{a^m})}{\max\left(dist\left(\frac{c_{midpoint}^m}{2}\right)\right)} \quad (29)$$

The function dist $$\begin{pmatrix} c^m_{midpoint} \\ 2 \end{pmatrix}$$

may be used to compute the distance between all combinations of the midpoint of all candidates. The number of acceptable aisles in error may be multiplied by the width of an aisle and divided by the maximum distance between the midpoint of the two candidates or any other suitable distance threshold may be employed.

Other factors or measures may be incorporated into the local certainty estimation as warranted. For example, the accuracy of the anchor point positions on the grid may also be used to influence the certainty estimation. As will be appreciated, different retailers or third parties may employ databases of product locations that have varying resolution. Similar accuracy determinations may be made for other types of anchor points.

Next, the time tag certainty factor, $lc_{tt}^m$, provided by time-tag certainty estimator 3520, may represents confidence in the estimation of which epoch the sensor-only solution passed by the anchor point. Since the time tag may be used during the map-matching process, for example by using an anchor point to generate a new hypothesis, the anchor point time tag certainty influences the positioning solution certainty. Since the anchor point might be assigned to the wrong sensor-only solution segment during the ordering process, the estimated time-tag may not be accurate and may lead to negative effects on the map-matching solution, and hence the final positioning solution. In one embodiment, the time-tag of the ordered anchor point may be estimated by finding all the dwells within the assigned sensor-only solution segment and comparing the length and position of the dwells to the position of the anchor point on the candidate link. Time-tag certainty estimator 3520 may utilize a weighting function which assesses the anchor point order certainty estimation and the position of anchor point from the dwells to estimate the time-tag certainty.

Figure 36:
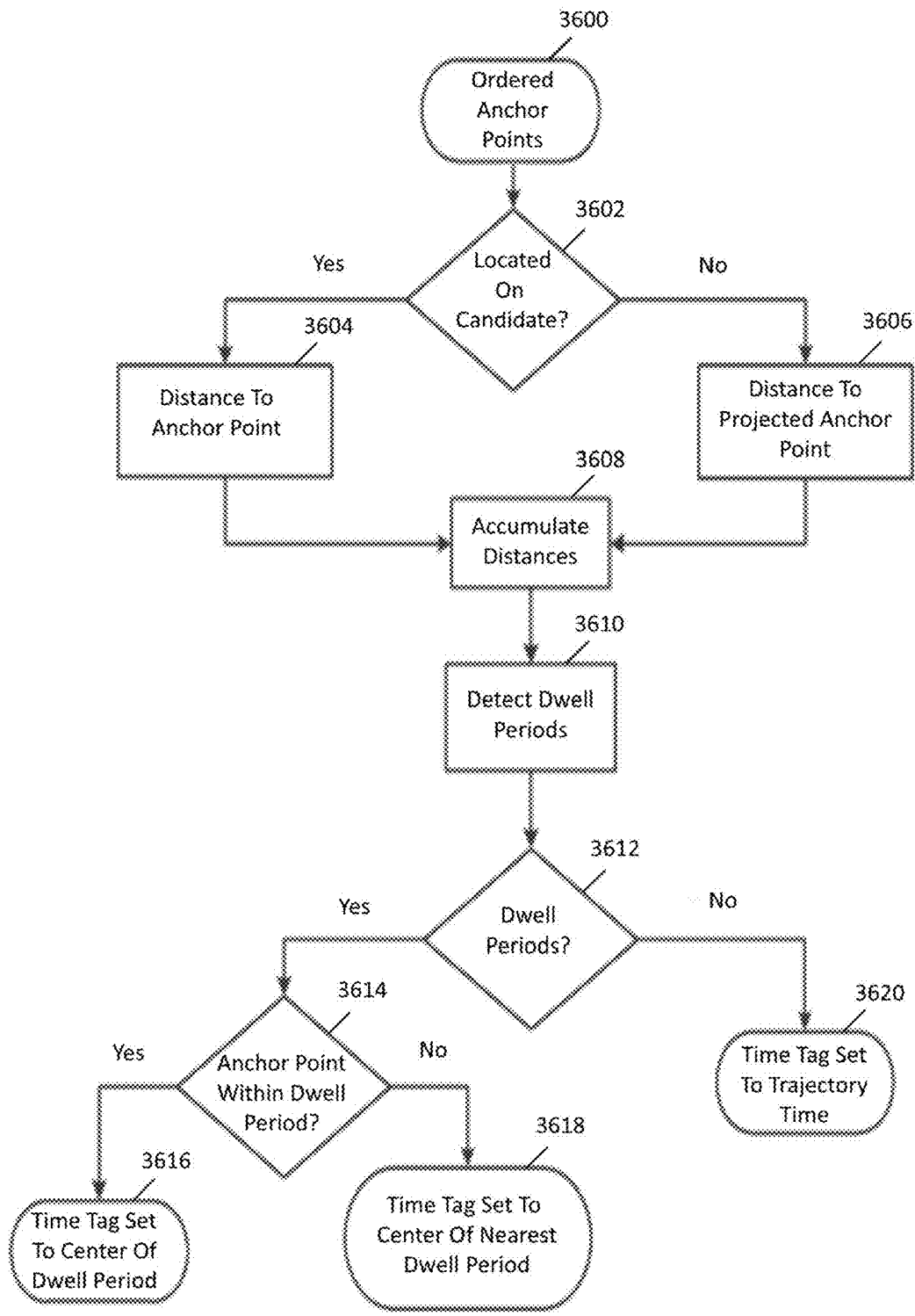
FIG. 36 is a schematic representation of a routine for assigning time-tags to ordered anchor points according to an embodiment.

One suitable routine for assigning time-tags to ordered anchor points is schematically depicted by the flowchart of FIG. 36. Beginning with 3600, the anchor points may be ordered as described above. In 3602, each anchor points is evaluated to determine whether it falls on a candidate link of the selected path. The distance from the start of the assigned candidate to the anchor point falling on the assigned candidate is determined in 3604. Alternatively, the anchor point is projected onto the assigned candidate for each anchor point that does not fall on a candidate link, so that the distance from the start of the assigned candidate to the projected position of the anchor point on the assigned candidate may be determined in 3606. The time-tag corresponding to the mth anchor point on the trajectory segment may be denoted $u_{AP_{sensor}}^m$. The distances determined in 3604 and 3606 are accumulated along the appropriate trajectory segment in 3608. In 3610, the starting and ending epochs of a dwell are detected to establish the dwell periods. In 3612, the routine branches depending on whether any dwell periods are detected. When dwell periods are identified, a determination is made whether the $u_{AP_{sensor}}^m$ for a given anchor point is within one of the dwell periods in 3614. If so, the anchor point is given a refined time-tag, denoted by $u_{AP}m$ is shifted to the center of the dwell period in 3616. Otherwise, the time-tag $u_{AP}m$ is assigned to the time-tag of the center of the closest dwell period in 3618. When no dwell periods are identified in 3612, the time-tag $u_{AP}m$ is set to equal $u_{AP_{sensor}}^m$ in 3620.

Figure 37:
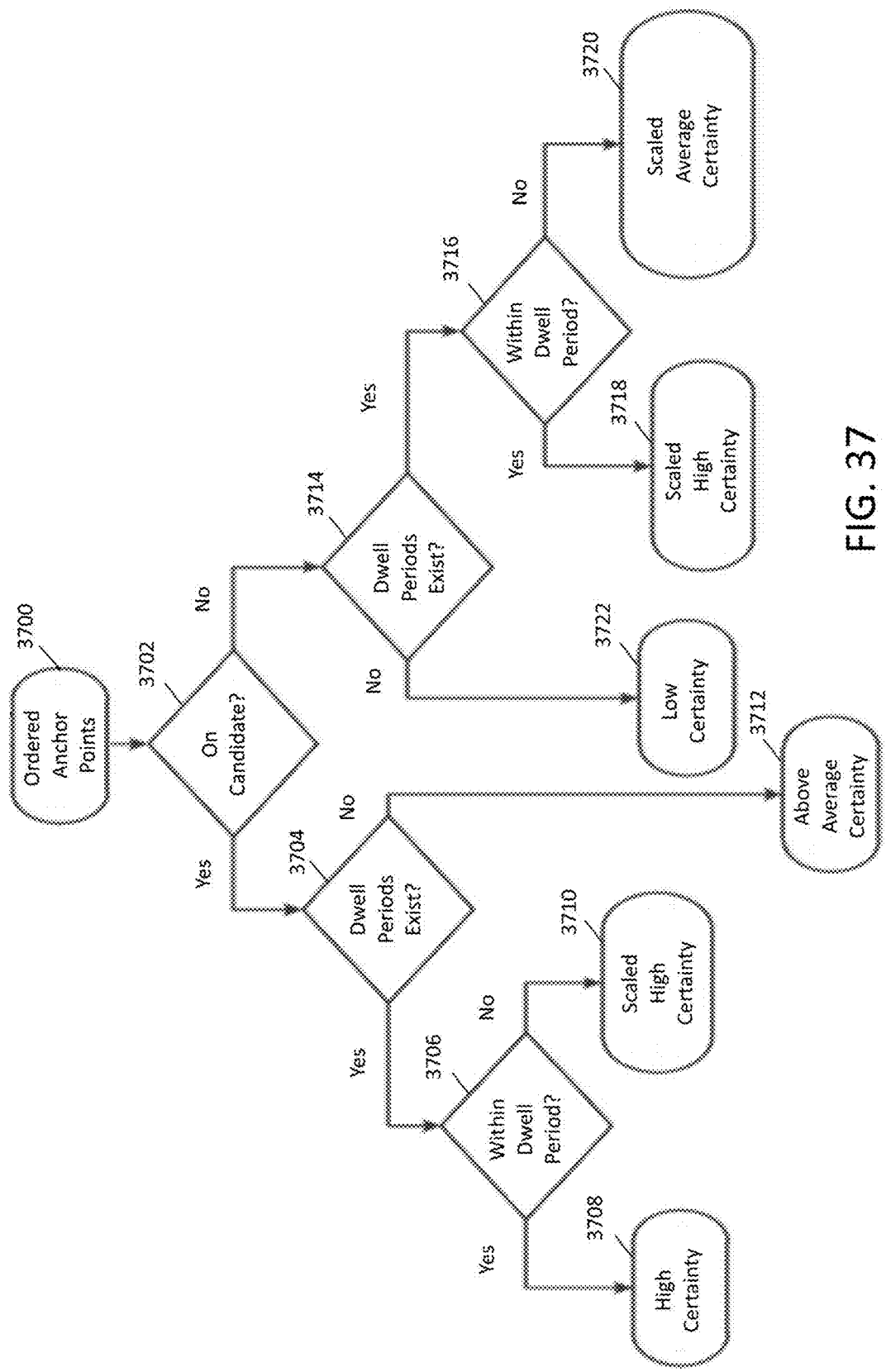
FIG. 37 is a schematic representation of a routine for estimating certainty for time-tags assigned to ordered anchor points according to an embodiment.

Following this routine, every anchor point may be assigned to a candidate which is matched to a sensor-only solution. Next, the certainty of the estimated time-tag, $lc_{tt}^m$, may be computed. One suitable routine for determining time-tag certainty is schematically depicted in the flowchart of FIG. 37. Beginning with 3700, the anchor points may be ordered as described above. In 3702, each anchor points is evaluated to determine whether it falls on a candidate link of the selected path. For candidates falling on a candidate, the routine branches to 3704 for a determination of whether any dwell periods have been identified. If dwell periods exist, a determination is made whether the time-tag of the anchor point occurs within an identified dwell period in 3706. If so, the time-tag for the anchor point may be accorded a relatively high certainty in 3708. If the anchor point does not occur within an identified dwell period, it may be accorded a relatively high certainty that is scaled down depending on the difference in time from the time-tag to the nearest detected dwell period in 3710. If no dwell periods are detected in 3704, the corresponding anchor point may be accorded an above average certainty in 3712. For anchor points that do not fall on a candidate link, a similar determination regarding the existence of dwell periods is made in 3714. If dwell periods exist, a determination is made whether the time-tag of the anchor point occurs within an identified dwell period in 3716. If so, the time-tag for the anchor point may be accorded a relatively high certainty in 3718 that is scaled down depending on the perpendicular distance of the anchor point to the candidate link. If the anchor point does not occur within an identified dwell period, it may be accorded an average certainty that is scaled down depending on depending on the perpendicular distance of the anchor point to the candidate link and on the relative time to the time-tag of the nearest detected dwell period in 3720. If no dwell periods are detected in 3704, the corresponding anchor point may be accorded an above average certainty in 3712. When the anchor point is not on a candidate and no dwell periods exist in 3714, the routine flows to 3722 to accord the anchor point a relatively low certainty. As discussed above, anchor points having time-tags with relatively high certainties may be used during map matching to create new forward or backward hypotheses, or used as absolute updates, while anchor points with relatively low certainties may be used to weight existing hypotheses.

From the above, it will be appreciated that one aspect of local certainty estimator 3508 may be to compute the certainty of whether an anchor point may be identified corresponding to a product purchased by the user within the duration of the assigned segment. As such, the local certainty estimation may not provide insight into the accuracy of how the anchor points are ordered. Correspondingly, intermediate certainty estimator 3510 may be employed to assess the path with a broader view. To this end, one component of the intermediate certainty estimation may be a distance to path measure that represents the distance of the mth anchor point, denoted by $dist^m$, from the assigned candidate of the selected path. As will be appreciated, an anchor point associated with a path may fall on the path or within a sufficient distance from the path. Further, another component of the intermediate certainty estimation may be a nearest segment ratio representing the closeness of the anchor point from the second closest candidate denoted by $dist_{closet}^m$. The $ic^m$ is inversely proportional to the distance of the anchor point from the second closest candidate of the selected path. In one embodiment, a weighted average of these measures may be used as indicated by Equation (30):

$$ic^m = \min\left(\frac{width_a}{2*\max(dist^m, width_a)}, \frac{1}{2}\right) + \min\left(\frac{dist^m_{closest}}{2*width_a}, \frac{1}{2}\right) \quad (30)$$

The intermediate certainty estimation may also employ an adjacent segments measure. Accordingly, this measure may evaluate the distribution of segments around an anchor point assigned to a link on a candidate path.

Figure 38:
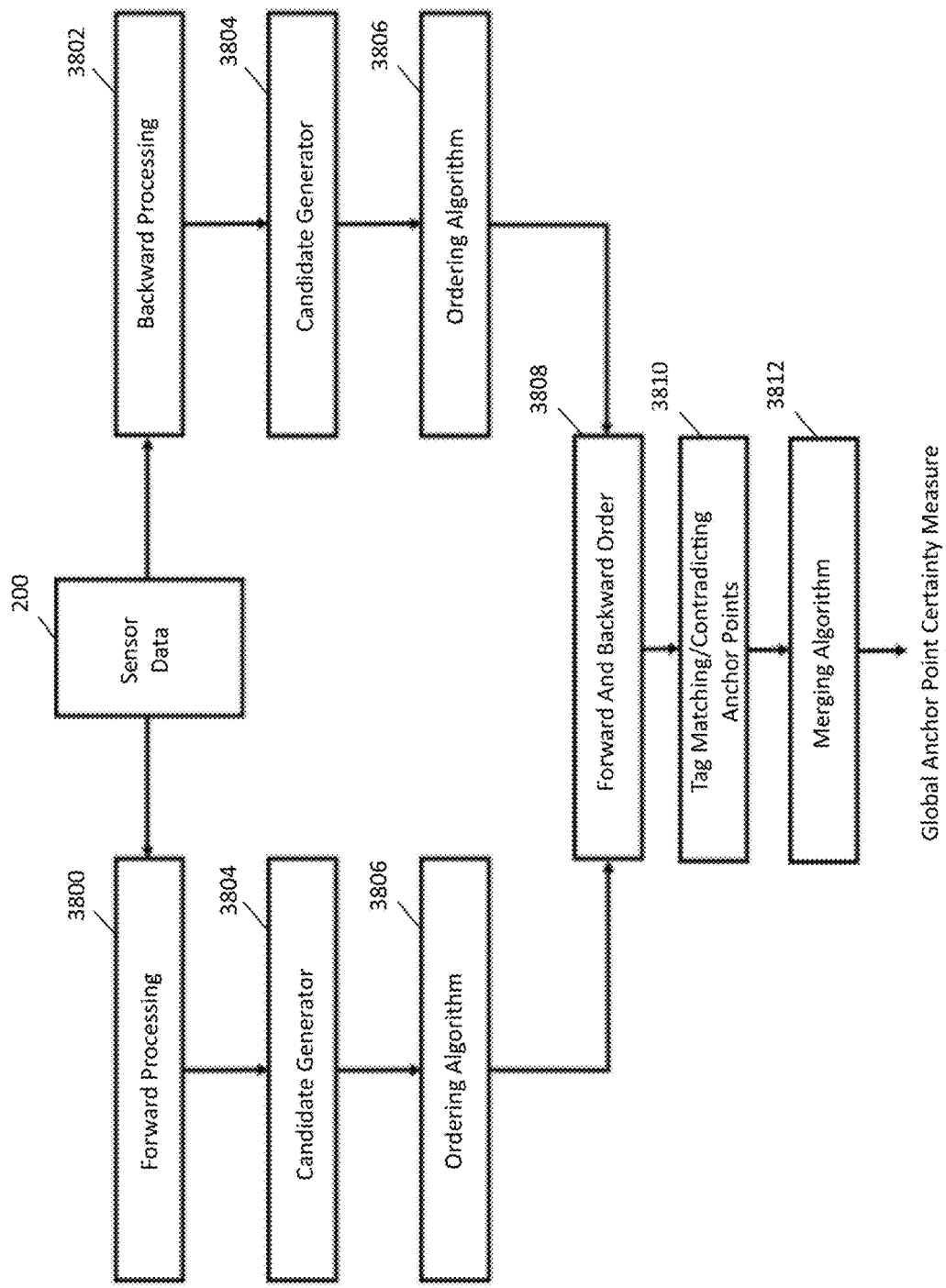
FIG. 38 is a schematic representation of global anchor point certainty estimation according to an embodiment.

In addition to the estimation of local and intermediate certainties regarding the anchor points, global certainty estimator 3512 may estimate the correctness of the overall order of the anchor points by processing the trajectory in the forward and backward direction 454. As will be appreciated, forward processing and backward processing of the sensor data may result in two distinct trajectories and global certainty estimator 3512 may take advantage of these different sources of information. Further details regarding one exemplary architecture of global certainty estimator 3512 is schematically depicted in FIG. 38. Sensor data may be obtained (corresponding to 200 of FIG. 2) and forward processed in 3800 and backward processed in 3802. The resulting outputs are fed to candidate generator 3804 for use by ordering algorithm 3806, as described above, to select a path for each and order the anchor points. Thus, the outputs of ordering algorithm 3806 are the anchor points as ordered using the forward processing and backward processing. The forward and backward ordered anchor points may then be compared in 3808, such as by analyzing the areas where the order from the forward and backward trajectories concur and/or contradict in 3810 to provide one subset of anchor points that have the same order in both the forward and backward paths. Another subset of anchor points may also be provided that exist in both the forward path and backward path, but have different orders. Yet another subset may contain those anchor points that are either on the forward path or backward path but not both. In turn, a merging algorithm 3812 may be used to estimate the global certainty for every ordered anchor point by increasing the certainty of the anchor points correctly ordered by both forward and backward paths, while decreasing the certainty of those anchor points that have different order or exist only on one of the paths. The amount of decrease in certainty for anchor points having different orders may depend on the amount of shift between the forward and backward paths. Merging algorithm 3812 may also consider the degree to which assigned time tags for the ordered anchor points agree or disagree to adjust the determined time tag certainty accordingly.

The principles regarding determination of certainty for anchor points derived from point of sale information may be extended to other types of anchor points as desired. In one embodiment, a source of absolute navigation information may provide one or more position updates that are not correlated. Such updates may be one time occurrences or may be multiple unrelated updates. For example, a position determination made using RFID tags or Bluetooth beacons may be obtained at different location within the venue, notably when the portable device is sufficiently proximate. Further, the user may scan a product, such as by using an application provided by the retailer, to obtain additional information. This operation may generate an identifiable anchor point with the benefit of having an established time tag determined by when the user conducts the scan. Under these or similar techniques, the information may provide an absolute update to the positioning solution. Hence, factors of proximity to such anchor points and factors of the certainty of the time tag of such anchor points may be derived in a similar manner to the techniques described above.

Alternatively or in addition, a source of absolute navigation information may be available that provides relatively continuous absolute positioning updates. The following materials discuss specific examples that use of RFID, WiFi, Bluetooth and magnetic field measurements, but other technologies may be accommodated as appropriate. For example, GPS position determinations may also be available, particularly in outdoor venues where signal reception may be improved as compared to indoor environments. A number of strategies may be employed, and each may have corresponding methods for assessing confidence in the accuracy of the positioning information. For example, fingerprinting may refer to the recognition of a characteristic pattern of wireless signal that has been correlated with a known location, such as by measuring WiFi, Bluetooth, and/or magnetic fields. As another example, active RFID tags may be used in known positioning systems. Still further, trilateration and/or triangulation techniques may be applied to WiFi signals to determine the location of a receiving device. Depending on the technique used, different factors may be evaluated when estimating uncertainty.

Positioning using fingerprinting may be performed using Wi-Fi, Bluetooth beacons, or magnetic field measurements. Since magnetic field mapping exploits anomalies of the Earth's magnetic field, such techniques do not require the specific infrastructure used for Wi-Fi or Bluetooth systems. As will be appreciated, fingerprinting may include a site survey (or training) phase, following which a location lookup phase may occur. Fingerprinting may have sources of errors which contribute to the uncertainty of the fingerprinting positioning solution, $\sigma_{FP}[u]$. For example, measurement noise or artifacts may affect either the training phase or the lookup phase, given that the measurements during training and lookup phases may not be identical. Correspondingly, likelihood, regression, or machine learning techniques may be used when positioning through fingerprinting and each may have uncertainty that may be estimated. With regard to magnetic field mapping, different areas in the same indoor venue may exhibit similar fingerprints. Integration with the sensor-based navigation solution may help mitigate, but the uncertainty may still be assessed.

In another example, known positioning techniques utilize RFID technologies. Typically, the infrastructure may include a set of active RF tags, K, distributed across a venue, which may be used as references or targets. Likewise, the infrastructure may also include a similar set of RF readers, R. The positions of both RF readers and RF reference tags may be known, so that when a user with the portable device is at epoch u, a given RF reader in the positioning system, r, may obtain received signal strength (RSS) measurements from both RF reference tags ($\theta_{kr}$) and from the portable device ($S_r[u]$). Thus, the solution position of may be estimated using a weighted sum of positions from reference tags, by comparing the similarity between signal vectors from the portable navigation device and the reference tags. In one embodiment, the weight of the readings of RFID tag k at epoch u may be determined according to Equation (31):

$$w_k[u] = \frac{1/D_k^2[u]}{\sum_{i=1}^{K} 1/D_i^2[u]} \quad (31)$$

where $D_k$ may be derived from Equation (32):

$$D_k^2[u]=\Sigma_{r=1}^{R}(\theta_{kr}-S_r[u])^2 \qquad (32)$$

Although the RF RSS measurements may not be constant, they may be fixed with respect to the readers and this may constitute a source of RFID positioning error. As such, $w_k$ may be expressed as a normal probability distribution function with mean $\mu_{w_k[u]}$ and variance $\sigma_{w_k[u]}^2$. Accordingly, the positioning uncertainty may be equivalent to the root mean square error as indicated in Equation (33):

$$\sigma_{RFID}[u] = \qquad (33)$$
$$\sqrt{\Sigma_{k=1}^{K}\left[x_{RFID_k}^2 \operatorname{var}(w_k[u])\right] + \left[(\Sigma_{k=1}^{K} x_{RFID_k} E(w_k[u])) - x[u]\right]^2}$$

where K may represent the number of RFID tags, $x_{RFID_k}$ may be the location of the $k^{th}$ RFID tag, $x_{RFID}[u]$ may be the estimated location of the moving platform using the RFID solution, $\operatorname{var}(w_k[u])$ may be set to $$\left(e^{\sigma_{w_k}^2[u]} - 1\right)e^{2\mu_{w_k}[u]+\sigma_{w_k}^2[u]} \text{ and } E(w_k[u]) = e^{\mu_{w_k}[u]+\sigma_{w_k}^2[u]}.$$

Trilateration and triangulation techniques involve the determination of the location of the portable device by measurement of distances and angles, respectively, from known reference points using geometry. Either technique or a combination may be used in Wi-Fi positioning. The distances at a certain epoch from the Wi-Fi access points may be obtained methods including angle of arrival (AOA), time of arrival (TOA), time difference of arrival (TDOA) or received signal strength (RSS), each of which may have a corresponding error modelling. To illustrate in the context of an RSS method, the trilateration error, $\sigma_{trilateration}[u]$ may be modelled using Equation (34) and used in computing the overall uncertainty:

$$\sigma_{trilateration}[u] = \sqrt{\left(\frac{\sigma_{RSS}[u]}{\sqrt{M}} \cdot t\right)^2 + A^2} \qquad (34)$$

where M may represent the number of RSS measurements made at epoch u, $\sigma_{RSS}$ may be the standard deviation of the RSS measurements, t may be the quantile function of the t-distribution, and A may be the observational error of the portable device.

Figure 39:
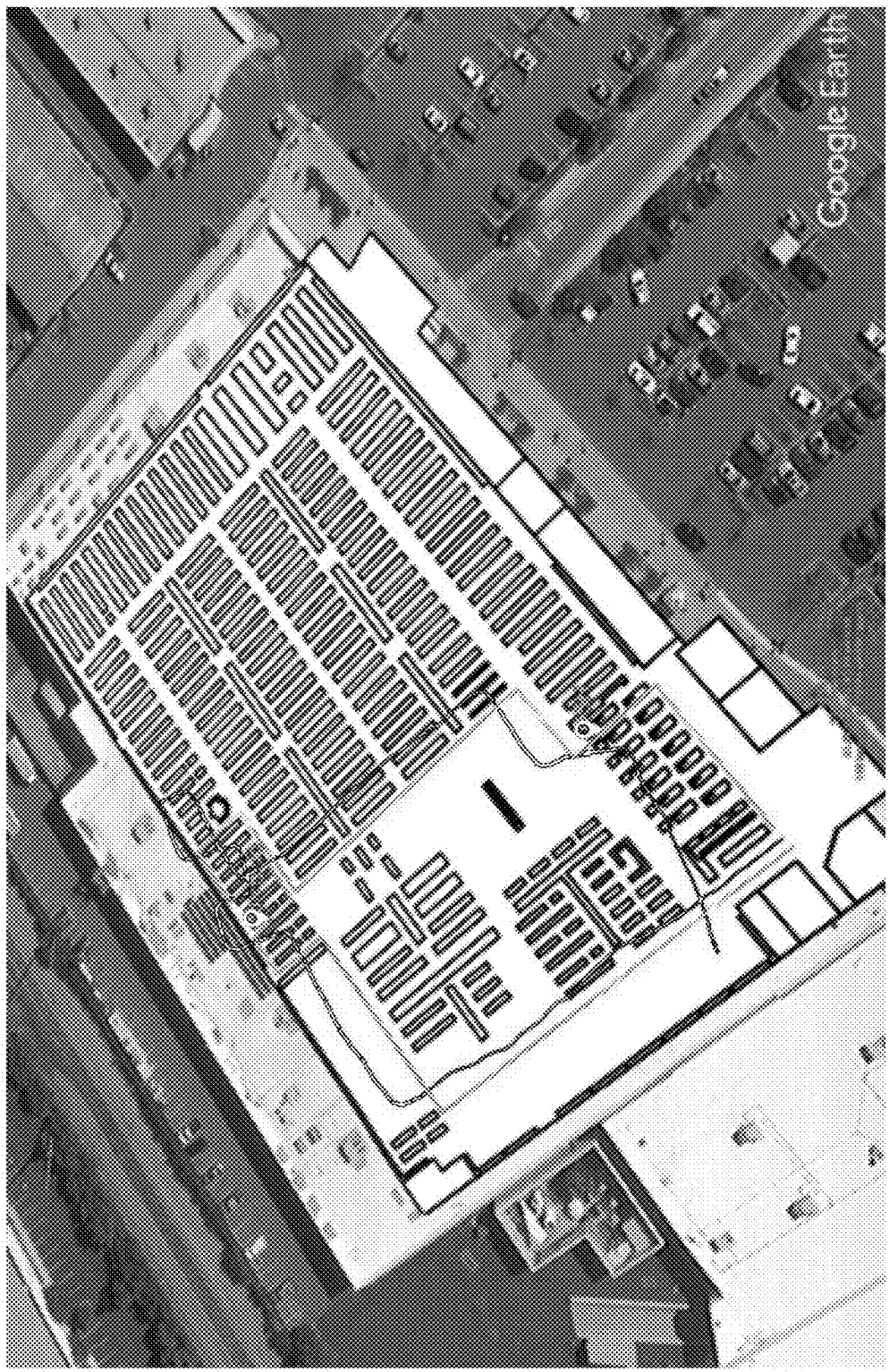
FIG. 39 is a schematic diagram of a retail venue comparing map-matched enhanced navigation solutions to a reference trajectory according to an embodiment.
Figure 40:
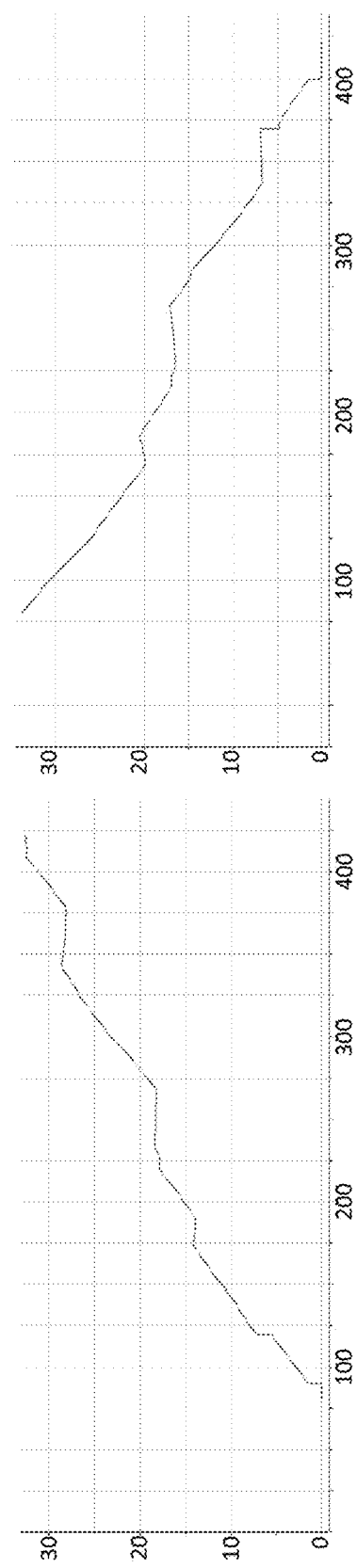
FIG. 40 graphically represents sensor-only positioning uncertainty of forward and backward solutions according to an embodiment.
Figure 41:
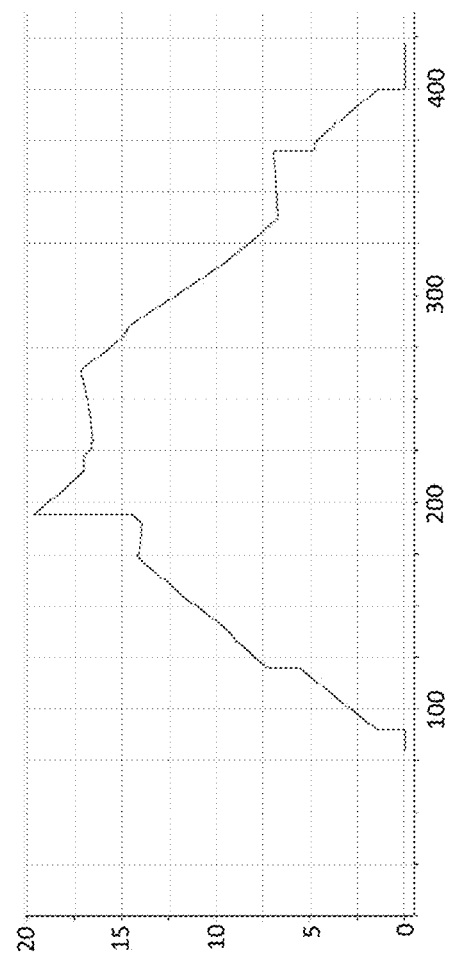
FIG. 41 graphically represents positioning uncertainty of combined forward and backward solutions according to an embodiment.

To help illustrate the estimation of uncertainty for an enhanced navigation solution, a test trajectory was traversed in an indoor venue with two point of sale anchor points as schematically depicted in FIG. 39. The reference trajectory is represented using the cross hatched trace, the map matched solution using only the sensor data is represented with the outline trace and the anchor points designated with location pins. According to the techniques above, the uncertainty in the map matched solution may be estimated. For example, FIG. 40 depicts the sensor-only positioning uncertainty of the forward solution on the left and the sensor-only positioning uncertainty of the backward solution on the right. As shown, positioning uncertainty typically may increase steadily with time as sensor errors drift. To help compensate, the merging algorithm may select the forward solution up to an intermediate epoch and the backward solution from that epoch on as indicated in FIG. 41. However, other merging algorithms may be used as desired. which the map-matching combination algorithm chose the forward solution, and is equivalent to that of the backward solution in epochs which the map-matching combination algorithm chose the backward solution.

Figure 42:
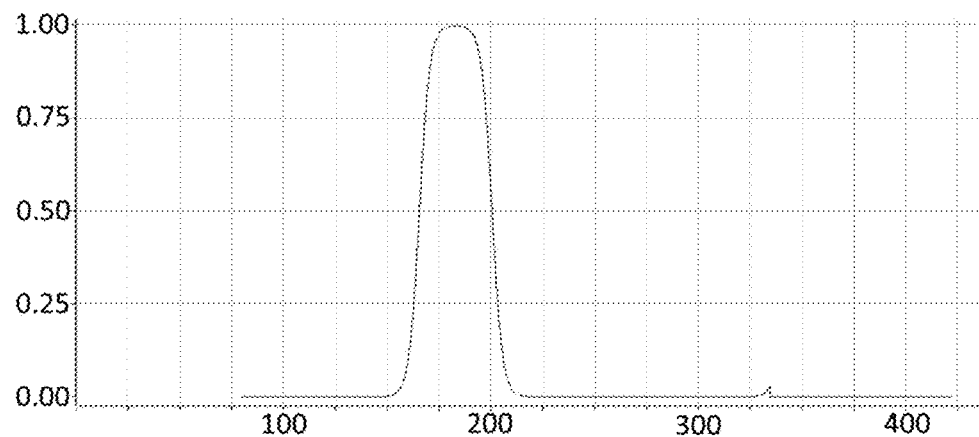
FIG. 42 graphically represents an anchor point proximity certainty factor according to an embodiment.
Figure 43:
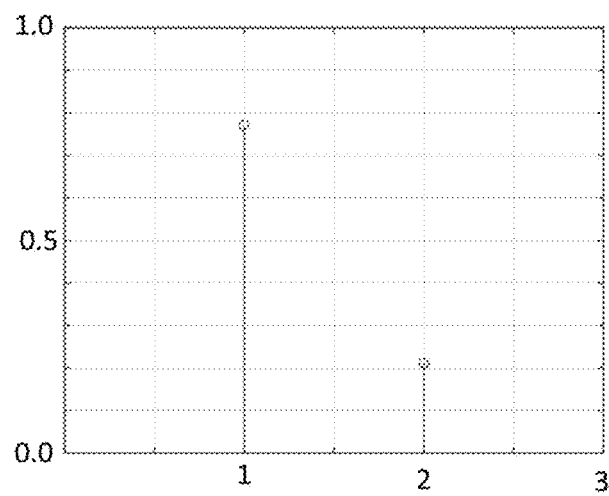
FIG. 43 graphically represents the overall certainty for each anchor point according to an embodiment.

The effect of the anchor point proximity certainty factor is schematically depicted in FIG. 42. As noted, this trajectory had two anchor points, with time tags estimated as 182.9 s and 360.7 s, corresponding to when the ordering process estimated the solution to pass by each anchor point. Thus, the value of the proximity certainty factor may increase as the trajectory approaches each anchor point as shown. Next, FIG. 43 graphically depicts the certainty factor of each anchor point. In this test, the certainty of the anchor point time tagged at 182.9 s is higher than the anchor point time tagged at 360.7 s. The uncertainty of the position is inversely proportional to both the anchor point proximity factor and the anchor point certainty according to Equation (23).

Figure 44:
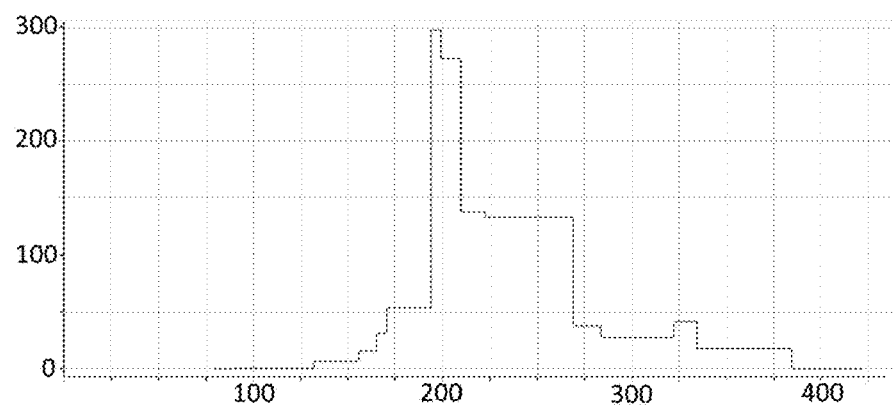
FIG. 44 graphically represents the number of map-matching hypotheses according to an embodiment.
Figure 45:
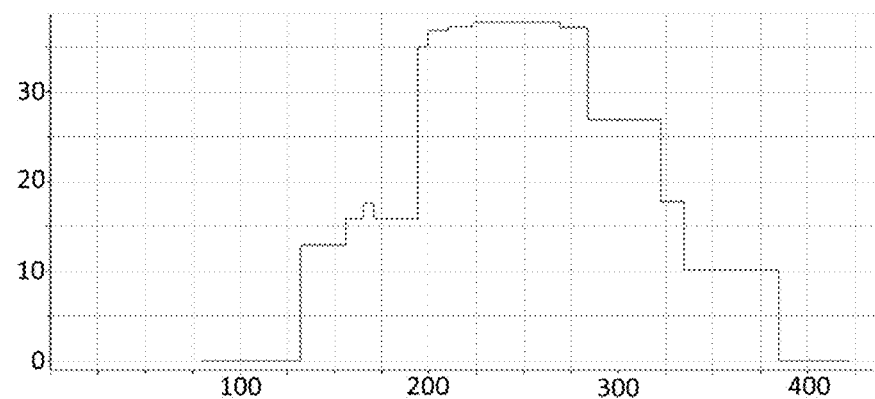
FIG. 45 graphically represents the spatial dispersion of hypotheses according to an embodiment.
Figure 46:
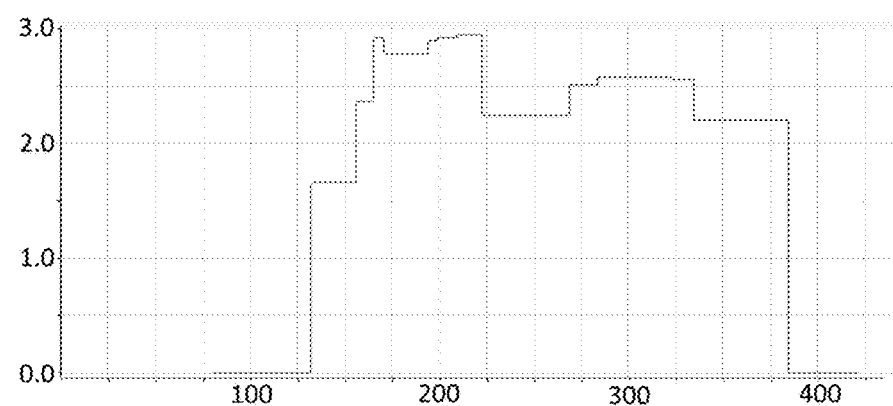
FIG. 46 graphically represents the score of the map-matched segment according to an embodiment.

Next, uncertainty factors related to the map-matching process are plotted in FIGS. 44-46. Specifically, FIG. 44 shows the number of map-matching hypotheses at time t, $n_{hypos}[t]$, FIG. 45 shows the spatial dispersion of hypotheses at time t, $\sigma_{mm_{dhypos}}[t]$, and FIG. 46 shows the score of the map-matched segment at time t, score[t].

Figure 47:
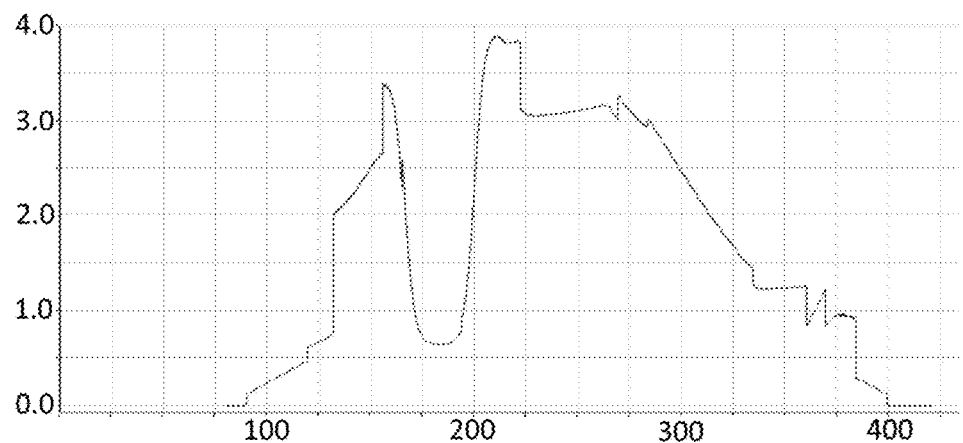
FIG. 47 graphically represents the overall uncertainty according to an embodiment.
Figure 48:
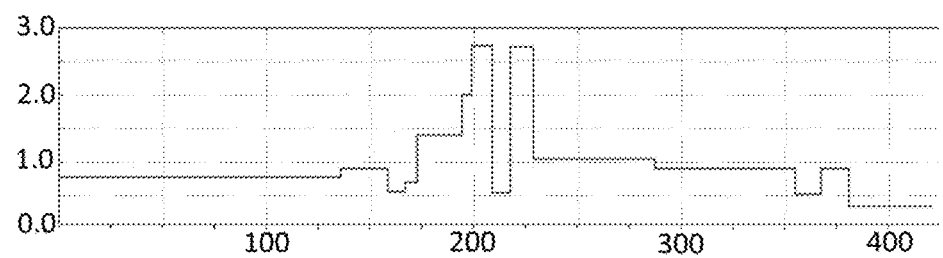
FIG. 48 graphically represents the actual error in position according to an embodiment.

Each of these components may be weighted and combined, such as indicated in Equation (10). The overall uncertainty in meters, $\sigma_{final}$, is plotted against time in FIG. 47. For comparison, the actual error as obtained by subtracting the enhanced navigation solution from the reference trajectory is plotted in FIG. 48. As may be seen, the estimated positioning uncertainty was between half and twice the actual error of the solution for about 70% of the epochs, demonstrating that the techniques of this disclosure may be used to accurately estimate the positioning uncertainty.

It will further be appreciated that the estimation of uncertainty in the enhanced navigation solution may be used in any number of applications. For example, the motion sensor data collected from the mobile devices of shoppers in a retail store or a shopping mall may be used to derive solution paths representing their trajectories and provide analytics about their shopping behavior. In one aspect, the analytics may be aggregate analytics obtained from a plurality of users and may be used for any purpose including generating heat maps that indicate areas of the retail store or other environment exhibiting increased attention, determining the wait times associated with checkout lane queues, or any other suitable purpose. The analytics may be aggregated for multiple users for a specific store, for a category of stores or any other suitable grouping. In another aspect, the analytics may be specific to a given user, to be used for retargeting with advertisement or offers, identification of brand preference, or any other characteristic of shopping behavior. Thus, user analytics may be for a single user or may be aggregated analytics for multiples users, as derived from distinct sets of sensor data.

As one illustration, the enhanced navigation solution provides information regarding the route traversed by a portable device, and by extension, the user, representing a valuable source of information for marketing, product placement and other uses. For example, it may be desirable to obtain information about the products a user looks at, but does not buy, which are so-called missed conversions or unconverted interactions. A notable indicator of consumer interest is the amount of time spent by the user in association with a product, a class of products, a brand or the like. As the user navigates along a trajectory in a retail venue, interest may be inferred when the user stops moving along the trajectory and dwells at one point or region. Further, even though a user may spend a period of time considering a given product, that user may not purchase the product at that time for any variety of reasons, resulting in an unconverted interaction. Those of skill in the art appreciate that an unconverted interaction represents a significant opportunity to increase sales. In recognition of the evident consumer interest, it may be desirable for a retailer to tailor advertising or sales offers to the user when an unconverted interaction is identified, a technique which may be known as retargeting. In some embodiments, determination of unconverted interactions may be based, at least in part, on one or more dwell periods occurring within a trajectory of the portable device, which may be generated from motion sensor data. Moreover, each dwell period may be correlated with product information for the location where the dwell occurred. By excluding dwell periods corresponding to products that were actually bought, one or more unconverted interactions may be declared and used, for example, to convey an offer or other advertising to the user. Greater accuracy may be achieved when declaring such unconverted interactions using the estimations of position uncertainty of this disclosure.

Further, enhanced navigation solutions and the estimated uncertainty may be used in a variety of crowdsourcing applications by leveraging information obtained from the plurality of users to achieve any suitable goal, such as acquiring more accurate location information. As an illustration only, WiFi, Bluetooth®, Bluetooth Low Energy (BLE), and/or magnetic fingerprinting may be used for real time indoor positioning by correlating signatures recorded by sensors with locations. Under the techniques of this disclosure, a wireless communication device, such as a WiFi or Bluetooth transceiver, may be considered a sensor for these purposes, as characteristics of the wireless communication signal may be detected and measured. For example, the received signal strength indicator (RSSI) may be considered a sensor measurement that may be recorded by the portable device for use in determining a sensor fingerprint. Conventionally, such methods require surveying the navigation environment beforehand to provide adequate correlation of the fingerprints to the indoor locations, involving significant expenditures of time and equipment. Such surveys may be replaced or reduced by crowdsourcing. Since the enhanced navigation solutions represent relatively accurate position information, sensor measurements taken while each user traverses the trajectory may be stored and correlated with the determined locations. By collecting such measurements from a wide variety of users at different times, suitable signal fingerprint maps may be generated and used for subsequent indoor position determinations.

For any of the above analytics and crowdsourcing applications or others, the position uncertainty may be determined and used to help weight the analytics, crowdsourcing or other application.

Depending on the architecture of device 100, sensor processor 108 and inertial sensor 112 may be formed on different chips, or as shown, may reside on the same chip. A sensor fusion algorithm employed to calculate the orientation of device 100 may be performed externally to sensor processor 108 and SPU 106, such as by host processor 104, or may be performed by SPU 106. A chip may be defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits.

One or more sensors may be incorporated into the package if desired using any suitable technique. In some embodiments, a sensor may be MEMS-based, such that a MEMS cap provides mechanical support for the MEMS structure. The MEMS structural layer is attached to the MEMS cap. The MEMS cap is also referred to as handle substrate or handle wafer. In some embodiments, the first substrate may be vertically stacked, attached and electrically connected to the second substrate in a single semiconductor chip, while in other embodiments, the first substrate may be disposed laterally and electrically connected to the second substrate in a single semiconductor package. In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

The techniques of this disclosure may be combined with any navigation solution independent of the type of the state estimation or filtering technique used in this navigation solution. The state estimation technique can be linear, non-linear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems. The state estimation technique used in the navigation solution can use any type of system and/or measurement models. The navigation solution may follow any scheme for integrating the different sensors and systems, such as for example loosely coupled integration scheme or tightly coupled integration scheme among others. The navigation solution may utilize modeling (whether with linear or nonlinear, short memory length or long memory length) and/or automatic calibration for the errors of inertial sensors and/or the other sensors used.

Contemplated Embodiments

The present disclosure describes the body frame to be x forward, y positive towards right side of the body and z axis positive downwards. It is contemplated that any body-frame definition can be used for the application of the method and apparatus described herein.

It is contemplated that the techniques of this disclosure can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that techniques of this disclosure can also be used with a mode of conveyance technique or a motion mode detection technique to establish the mode of conveyance. This enables the detection of pedestrian mode among other modes such as for example driving mode. When pedestrian mode is detected, the method presented in this disclosure can be made operational to determine the misalignment between the device and the pedestrian.

It is further contemplated that techniques of this disclosure can also be used with a navigation solution that is further programmed to run, in the background, a routine to simulate artificial outages in the absolute navigation information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigation information (e.g. GNSS); the forward integrated navigation solution in the device integrating the available sensors with the absolute navigation information (e.g. GNSS) and possibly with the optional speed or velocity readings; or a backward smoothed integrated navigation solution integrating the available sensors with the absolute navigation information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the techniques of this disclosure can also be used with a navigation solution that is further integrated with maps (such as street maps, indoor maps or models, or any other environment map or model in cases of applications that have such maps or models available), and a map aided or model aided routine. Map aided or model aided can further enhance the navigation solution during the absolute navigation information (such as GNSS) degradation or interruption. In the case of model aided, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the techniques of this disclosure can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements; such enhancement is the carrier-smoothed pseudorange.

It is further contemplated that the techniques of this disclosure can also be used with a navigation solution that relies on an ultra-tight integration scheme between GNSS receiver and the other sensors' readings.

It is further contemplated that the techniques of this disclosure can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or WiMax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but is not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the techniques of this disclosure can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processer enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for estimating uncertainty for an enhanced navigation solution of a portable device and a platform using map information, wherein the mobility of the portable device is constrained or unconstrained within the platform and wherein the portable device may be tilted to any orientation, the method comprising:
   a) obtaining sensor data for the portable device from at least one sensor integrated with the portable device from at least one sensor integrated with the portable device representing motion of the portable device at a plurality of epochs over a first period of time;
   b) deriving navigation solutions for the epochs based at least in part on the sensor data;
   c) implementing the enhanced navigation solution by:
      i) estimating position information for the portable device based at least in part on the derived navigation solutions at a time subsequent to the first period of time;
      ii) obtaining map information for an area encompassing locations of the portable device during the first period of time;
      iii) generating multiple hypotheses regarding possible positions of the portable device for at least one epoch during the first period of time based at least in part on the estimated position information and the map information;
      iv) managing the multiple hypotheses based at least in part on the estimated position information and the map information, wherein managing hypotheses comprises at least one of adding, eliminating, electing and combining at least some hypotheses; and
      v) processing the managed hypotheses to update the estimated position information for the portable device;
   d) outputting the enhanced navigation solution for the at least one epoch using the updated estimated position information; and
   e) deriving an uncertainty measure for the enhanced navigation solution.

2. The method of claim 1, where deriving the uncertainty measure for the enhanced navigation solution comprises estimating a standard deviation for a value of the enhanced navigation solution.

3. The method of claim 1, further comprising obtaining absolute navigation information for the portable device, wherein the navigation solution derived for at least one epoch is based at least in part on the absolute navigation information.

4. The method of claim 3, wherein the absolute navigation information is obtained from any one or any combination of the following: (i) a global navigation satellite system (GNSS); (ii) cell-based positioning; (iii) WiFi-based positioning; (iv) Bluetooth-based positioning; (v) other wireless-based positioning; or (vi) visual light communication based positioning.

5. The method of claim 1, wherein at least one of deriving navigation solutions for the epochs and estimating position information based at least in part on the plurality of navigation solutions comprises one or more of the following:
   (i) performing a forward processing operation on the obtained sensor data over the first period of time;
   (ii) performing a backward processing operation on the obtained sensor data over the first period of time;
   (iii) performing a forward processing operation on the obtained sensor data over the first period of time and performing a backward processing operation on the obtained sensor data over the first period of time;
   (iv) performing a forward processing operation on the obtained sensor data over the first period of time, performing a backward processing operation on the obtained sensor data over the first period of time, and combining outputs of the forward processing operation and the backward processing operation;
   (v) performing a smoothing operation over the first period of time;
   (vi) performing a backward smoothing operation over the first period of time; and
   (vii) performing a multiple pass processing operation over the first period of time.

6. The method of claim 1, wherein the uncertainty measure for the enhanced navigation solution comprises a sensor-based navigation uncertainty.

7. The method of claim 6, wherein the sensor-based navigation uncertainty is derived from any one or any combination of the following: (i) state estimation quality; (ii) misalignment quality; (iii) step-length quality; or (iv) stepdetection quality; (v) fidgeting ratio.

8. The method of claim 1, wherein the uncertainty measure for the enhanced navigation solution comprises a map-matching positioning uncertainty.

9. The method of claim 8, wherein the map-matching positioning uncertainty is derived from any one or any combination of the following: (i) a scoring measure for a map-matched segment; (ii) number of the generated multiple hypotheses; or (iii) spatial dispersion of the generated multiple hypotheses.

10. The method of claim 1, wherein at least one of managing the multiple hypotheses and processing the managed hypotheses to update the estimated position information further comprises utilizing an anchor point.

11. The method of claim 10, wherein the anchor point is derived from a source of absolute navigation information for the portable device and wherein the absolute navigation information is obtained from any one or any combination of the following: (i) a global navigation satellite system (GNSS); (ii) cell-based positioning; (iii) WiFi-based positioning; (iv) Bluetooth-based positioning; (v) other wireless-based positioning; and (vi) visual light communication-based positioning.

12. The method of claim 10, wherein the anchor point is derived from point of sale information.

13. The method of claim 10, wherein the anchor point is derived from an interaction between the portable device and an item having a known location.

14. The method of claim 10, further comprising utilizing a plurality of ordered anchor points.

15. The method of claim 10, wherein the uncertainty measure for the enhanced navigation solution further comprises utilizing a plurality of ordered anchor points.

16. The method of claim 14, wherein the uncertainty measure for the enhanced navigation solution comprises an anchor point uncertainty for each anchor point of the ordered plurality of anchor points.

17. The method of claim 16, wherein the anchor point uncertainty is based at least in part on performing a local estimation based on at least one of: (i) zero-step length percentage, (ii) candidates spread factor, (iii) candidate density and (iv) time-tag uncertainty.

18. The method of claim 16, wherein the anchor point uncertainty is based at least in part on performing an intermediate estimation based on at least one of (i) distances between anchor points associated with a solution path from candidates and the solution path from candidates, (ii) nearest segment ratio, and (iii) adjacent segments.

19. The method of claim 16, wherein the anchor point uncertainty is based at least in part on performing a global estimation based on at least one of (i) forward and backward order, (ii) anchor point time-tags, and (iii) merging of forward and backward order.

20. The method of claim 16, wherein the anchor point uncertainty is based at least in part performing a local estimation, an intermediate estimation and a global estimation.

21. The method of claim 15, further comprising assigning a time-tag for at least one of the ordered plurality of anchor points and wherein the uncertainty measure for the enhanced navigation solution comprises a time-tag uncertainty.

22. The method of claim 21, wherein the time-tag uncertainty is based at least in part on a factor selected from the group consisting of: (i) whether an anchor point falls on a candidate link and (ii) a relationship of an anchor point to a dwell period.

23. The method of claim 10, wherein the uncertainty measure for the enhanced navigation solution is based at least in part on proximity to the anchor point.

24. The method of claim 3, wherein the uncertainty measure for the enhanced navigation solution comprises an absolute navigation information uncertainty.

25. The method of claim 24, wherein the absolute navigation information uncertainty is based at least on one or any combination of the following: (i) a fingerprinting uncertainty; (ii) a radio frequency identification (RFID) uncertainty; or (iii) trilateration/triangulation uncertainty.

26. The method of claim 1, further comprising one of: (i) deriving user analytics based at least in part on the enhanced navigation solution and the uncertainty measure; and (ii) deriving aggregate user analytics based at least in part on aggregating enhanced navigation solutions and respective uncertainty measures for each for a plurality of enhanced navigation solutions within the environment for the users, wherein each enhanced navigation solution is based at least in part on a distinct set of sensor data.

27. The method of claim 26, wherein at least one of managing the multiple hypotheses, processing the managed hypotheses to update the estimated position information, outputting the enhanced navigation solution, and deriving an uncertainty measure for the enhanced navigation solution further comprises utilizing an anchor point derived from point of sale information, the method further comprising declaring at least one unconverted interaction based at least in part on a dwell period correlated with product information and the anchor point derived from point of sale information, wherein the user analytics comprises the unconverted interaction.

28. The method of claim 1, further comprising utilizing an anchor point derived from point of sale information, wherein the method further comprises declaring at least one unconverted interaction based at least in part on: (i) the enhanced navigation solution, (ii) a detection of dwell period correlated with product information, (iii) the uncertainty measure of the enhanced navigation solution at the detected dwell, and (iv) the anchor point derived from point of sale information, wherein the method relates the at least one unconverted interaction to a dwell period that does not correspond to the anchor point derived from point of sale information.

29. The method of any one of claim 27 or 28, further comprising conveying an offer to the a user based at least in part on the unconverted interaction.

30. The method of claim 1, further comprising crowdsourcing by aggregating enhanced navigation solutions and respective uncertainty measures for the aggregated enhanced navigation solutions for a plurality of enhanced navigation solutions within the environment, wherein each enhanced navigation solution is based at least in part on a distinct set of sensor data.

31. The method of claim 30, further comprising recording sensor measurements with the portable device and correlating the sensor measurements with at least one location determined from the enhanced navigation solution.

32. The method of claim 31, further comprising building a fingerprint map with the recorded sensor measurements.

33. A portable device for estimating uncertainty for an enhanced navigation solution of the portable device and a platform using map information, wherein the mobility of the portable device is constrained or unconstrained within the platform and wherein the portable device may be tilted to any orientation, the portable device comprising:
  a) an integrated sensor assembly, configured to output sensor data representing motion of the portable device for the portable device at a plurality of epochs over a first period of time;
  b) a navigation module configured to derive navigation solutions based at least in part on the sensor data at a plurality of sensor epochs; and
  c) a processor configured to implement:
    i) a position estimator for providing estimated position information for the portable device based at least in part on the plurality of derived navigation solutions at a time subsequent to the first period of time;

ii) a map handler for obtaining map information for an area encompassing locations of the portable device during the first period of time; and iii) a hypothesis analyzer for:
A) generating multiple hypotheses regarding possible positions of the portable device for at least one epoch during the first period of time based at least in part on the estimated position information and the map information; and
B) managing the multiple hypotheses based at least in part on the estimated position information and the map information, wherein managing hypotheses comprises at least one of adding, eliminating, electing and combining at least some hypotheses;
iv) updating the estimated position information for the portable device based at least in part on the managed hypotheses to output the enhanced navigation solution for the at least one epoch using the updated estimated position information; and
v) an uncertainty estimator for deriving an uncertainty measure for the enhanced navigation solution.

34. The portable device of claim 33, further comprising a source of absolute navigation information for the portable device, wherein the navigation solution derived for at least one epoch is based at least in part on the absolute navigation information.

35. The portable device of claim 34, wherein the absolute navigation information is obtained from any one or any combination of the following: (i) a global navigation satellite system (GNSS); (ii) cell-based positioning; (iii) WiFi-based positioning; (iv) Bluetooth-based positioning; (v) other wireless-based positioning; or (vi) visual light communication based positioning.

36. The portable device of claim 33, wherein the sensor assembly includes an accelerometer and a gyroscope.

37. The portable device of claim 33, wherein the sensor assembly comprises an inertial sensor implemented as a Micro Electro Mechanical System (MEMS).

38. A remote processing resource for estimating uncertainty for an enhanced navigation solution of a portable device and a platform using map information, wherein the mobility of the portable device is constrained or unconstrained within the platform and wherein the portable device may be tilted to any orientation, the remote processing resource comprising:
a) a communications module for receiving information provided by the portable device, wherein the information corresponds to a plurality of epochs over a first period of time of sensor data representing motion of the portable device; and
b) a processor configured to implement:
i) a position estimator for providing estimated position information for the portable device based at least in part on a plurality of navigation solutions derived for the epochs at a time subsequent to the first period of time;
ii) a map handler for obtaining map information for an area encompassing locations of the portable device during the first period of time; and
iii) a hypothesis analyzer for:
A) generating multiple hypotheses regarding possible positions of the portable device for at least one epoch during the first period of time based at least in part on the estimated position information and the map information; and
B) managing the multiple hypotheses based at least in part on the estimated position information and the map information, wherein managing hypotheses comprises at least one of adding, eliminating, electing and combining at least some hypotheses;
iv) updating the estimated position information for the portable device based at least in part on the managed hypotheses to output the enhanced navigation solution for the at least one epoch using the updated estimated position information; and
v) an uncertainty estimator for deriving an uncertainty measure for the enhanced navigation solution.

39. The remote processing resource of claim 38, wherein the information received by the communications module comprises sensor data for the portable device representing motion of the portable device at the epochs and wherein the processor is further configured to derive navigation solutions for the epochs based at least in part on the sensor data.

40. The remote processing resource of claim 38, wherein the information received by the communications module comprises navigation solutions derived for the epochs by the portable device.

41. The remote processing resource of claim 38, wherein the communications module is configured to transmit the enhanced navigation solution and the uncertainty measure to the portable device.

42. A system for estimating uncertainty for an enhanced navigation solution of a portable device and a platform using map information comprising:
a) a portable device comprising an integrated sensor assembly, configured to output sensor data representing motion of the portable device for the portable device at a plurality of epochs over a first period of time and a communications module for transmitting information corresponding to the epochs; and
b) remote processing resources configured to receive the information from the portable device and having a processor configured to implement:
i) a position estimator for providing estimated position information for the portable device based at least in part on a plurality of navigation solutions derived for the epochs at a time subsequent to the first period of time;
ii) a map handler for obtaining map information for an environment area encompassing locations of the portable device during the first period of time; and
iii) a hypothesis analyzer for:
A) generating multiple hypotheses regarding possible positions of the portable device for at least one epoch during the first period of time based at least in part on the estimated position information and the map information; and
B) managing the multiple hypotheses based at least in part on the estimated position information and the map information, wherein managing hypotheses comprises at least one of adding, eliminating, electing and combining at least some hypotheses;
iv) updating the estimated position information for the portable device based at least in part on the managed hypotheses to output the enhanced navigation solution for the at least one epoch using the updated estimated position information; and
v) an uncertainty estimator for deriving an uncertainty measure for the enhanced navigation solution.

43. The system of claim 42, wherein the information received by the remote processing resources comprises sensor data for the portable device and wherein the remote processing resources are further configured to derive navigation solutions for the epochs based at least in part on the sensor data.

44. The system of claim 42, wherein the portable device further comprises a navigation module configured to derive navigation solutions based at least in part on the sensor data at the plurality of epochs and wherein the communications module transmits the navigation solutions.

45. The system of claim 44, wherein the remote processing resources are further configured to transmit the enhanced navigation solution and the uncertainty measure to the portable device.

* * * * *